(12) United States Patent  
Riddiford et al.

(10) Patent No.: US 9,953,363 B2  
(45) Date of Patent: Apr. 24, 2018

(54) MULTI-USER FOOD AND DRINK ORDERING SYSTEM

(71) Applicant: COMPURANTS LIMITED, London (GB)

(72) Inventors: Martin Riddiford, London (GB); Julia Allwright, London (GB); Sam Broadbent, Amsterdam (NL); Jim Reeves, Berkshire (GB); Daniel Potter, London (GB); Noel Hunwick, London (GB)

(73) Assignee: ORDAMO LIMITED, London (GB)

(*) Notice: Subject to any disclaimer, the term of this patent is extended or adjusted under 35 U.S.C. 154(b) by 327 days.

(21) Appl. No.: 14/621,603

(22) Filed: Feb. 13, 2015

(65) Prior Publication Data

US 2015/0161716 A1 Jun. 11, 2015

Related U.S. Application Data

(63) Continuation of application No. 13/512,117, filed as application No. PCT/GB2010/051982 on Nov. 29, 2010, now abandoned.

(30) Foreign Application Priority Data

Nov. 27, 2009 (GB) .................................. 0920754.9  
Jan. 28, 2010 (GB) .................................. 1001395.1

(51) Int. Cl.  
*G06Q 30/00* (2012.01)  
*G06Q 30/06* (2012.01)  
(Continued)

(52) U.S. Cl.  
CPC ....... *G06Q 30/0641* (2013.01); *G03B 21/142* (2013.01); *G06Q 30/06* (2013.01); *G06Q 30/0633* (2013.01); *G06Q 50/12* (2013.01)

(58) Field of Classification Search  
USPC .......................................................... 705/15  
See application file for complete search history.

(56) References Cited

U.S. PATENT DOCUMENTS 5,861,075 A * 1/1999 Crabtree .............. A47B 13/086  
 156/277  
6,710,920 B1 * 3/2004 Mashitani .......... G02B 27/2214  
 353/7

(Continued)

FOREIGN PATENT DOCUMENTS

| WO | 2004/003656 A2 | 1/2004 |
| WO | 2008/056180 A2 | 5/2008 |
| WO | 2008/071979 A1 | 6/2008 |

OTHER PUBLICATIONS

International Search Report, dated May 9, 2011, issued in priority International Application No. PCT/GB2010/051982.

(Continued)

*Primary Examiner* — Ashford S Hayles  
(74) *Attorney, Agent, or Firm* — Saul Ewing Arnstein & Lehr LLP

(57) ABSTRACT

An interactive food and/or drink ordering system is provided comprising a computer controlled projector apparatus and a horizontal surface, wherein images from the computer controlled projector apparatus are projected onto some or all of the surface, the images including a menu of food and/or drink selection options, the selection options being selectable by a first user operating an interface device operable to provide input to the computer and also by a second user operating an interface device operable to provide input to the computer, wherein the menu of food and/or drink selection options is projected into a zone on the surface that is shared by the first and second users.

15 Claims, 54 Drawing Sheets

(51) Int. Cl.
*G06Q 50/12* (2012.01)
*G03B 21/14* (2006.01)
*G09G 5/00* (2006.01)

(56) References Cited

U.S. PATENT DOCUMENTS

| | | | | |
|---|---|---|---|---|
| 6,965,381 B2 * | 11/2005 | Kitamura | ............. | G02B 27/017 345/473 |
| 7,327,376 B2 * | 2/2008 | Shen | ............. | G06F 3/048 345/418 |
| 7,552,402 B2 * | 6/2009 | Bilow | ............. | G06F 3/0488 345/173 |
| 8,072,439 B2 * | 12/2011 | Hillis | ............. | G06F 3/04883 178/18.01 |
| 2006/0267952 A1 * | 11/2006 | Alcorn | ............. | A47B 21/007 345/173 |
| 2008/0022328 A1 * | 1/2008 | Miller | ............. | H04N 21/41415 725/86 |
| 2009/0076920 A1 * | 3/2009 | Feldman | ............. | E04H 3/04 705/15 |
| 2009/0310088 A1 * | 12/2009 | Jung | ............. | H04N 9/3147 353/69 |
| 2010/0194677 A1 * | 8/2010 | Fiebrink | ............. | G06F 3/04847 345/156 |
| 2010/0315418 A1 * | 12/2010 | Woo | ............. | G06F 3/011 345/419 |
| 2011/0187664 A1 * | 8/2011 | Rinehart | ............. | G06F 3/041 345/173 |

OTHER PUBLICATIONS

Search Report, dated Mar. 23, 2011, issued in corresponding UK Application No. GB1020183.8.
International Preliminary Report on Patentability, dated May 30, 2012, issued in priority International Application No. PCT/GB2010/051982.

* cited by examiner 7m x 7m

16:10 aspect ratio
14 tables (2 square)
52 touch pads
14 projectors
52 people 5m x 10m
4:3 aspect ratio
16 tables
64 touch pads
16 projectors
64 people 5m x 10m
16:10 aspect ratio
12 tables
48 touch pads
12 projectors
58 people 5m x 10m
16:10 aspect ratio
12 tables
48 touch pads
12 projectors
64 people 16:9 aspect ratio (ar)　　16:10 ar　　4:3 ar　　1:1 ar

MULTI-USER FOOD AND DRINK ORDERING SYSTEM

CROSS REFERENCE TO RELATED APPLICATIONS

This application is a continuation of U.S. application Ser. No. 13/512,117, filed Jan. 9, 2013, which claims the priority of PCT/GB2010/051982, filed on Nov. 29, 2010, which claims priority to Great Britain Application No. 0920754.9, filed on Nov. 27, 2009, and Great Britain Application No. 1001395.1, filed on Jan. 28, 2010, the entire contents of which are hereby incorporated in total by reference.

BACKGROUND OF THE INVENTION

1. Field of the Invention

The invention relates to an interactive food and/or drink ordering system and method; customers directly input their orders into an electronic point of sale system. The system eliminates the need for a waiter to take an order. The invention can be used in restaurants and other locations where food and/or drinks are served.

2. Technical Background

There is considerable pressure on restaurants to increase the speed and reliability with which orders are taken and also the speed at which a bill ("check" in US English) is presented to a customer after requesting. One approach to addressing this problem is to provide a large touch screen monitor plus PC embedded into each table top. The monitors are connected to the menu point of sale system that provides orders to the kitchen. But the tables are very costly and the combined screens/tables can be damaged if the table is knocked. The glass (or acrylic) tops of these tables also have to be thick, making the tables very heavy and hence difficult to move—a problem in many restaurant environments, especially for cleaning.

Another problem with touch screen displays with very thick glass is that the actual display surface can be several mm away from the top surface—introducing a barrier and related parallax effects, which can make the process of using them seem unnatural. A further problem is that providing power and data cabling to tables in a restaurant can be very costly.

3. Discussion of Related Art

A prior art system is described in patent application WO 2008/071979 (the contents of which are incorporated by reference). WO 2008/071979 describes an interactive food and/or drink ordering system, in which a computer controlled projector is mounted above a surface such that a menu of food and/or drink selection options is projected onto some or all of the surface. The selection options are selectable by a user operating an interface device connected to the computer, such as a wireless track pad.

In prior art FIG. 1, two projected menu zones are shown as the circles with dashed lines; each person has their own menu zone, with text and images generated by a single overhead projector facing them appropriately. Each person has their own Bluetooth wireless trackpad, each shown as the small circle with a solid line. In FIG. 1, the two projected menu zones are on a table surface. The table has next to it a first seat and a second seat, for use by respective first and second persons.

The approach in prior art FIG. 1 makes menu selection and menu interaction a self-centered process—i.e. it is not an experience that is shared by the various diners sitting at the table. Also, the location of the projected menu zone may be fixed and defined, and hence relatively inflexible.

SUMMARY OF THE INVENTION

According to a first aspect of the invention, there is provided an interactive food and/or drink ordering system comprising a computer controlled projector apparatus and a horizontal surface, wherein images from the computer controlled projector apparatus are projected onto some or all of the surface, the images including a menu of food and/or drink selection options, the selection options being selectable by a first user operating an interface device operable to provide input to the computer and also by a second user operating an interface device operable to provide input to the computer, wherein the menu of food and/or drink selection options is projected into a zone on the surface that is shared by the first and second users.

The ordering system may be one in which the first user and the second user each operate their own interface device operable to provide input to the computer.

The ordering system may be one in which one or more interface devices are connected to the computer.

The ordering system may be one in which each interface device is operable to select an option from the zone on the surface that is shared by the first and second users.

The ordering system may be one in which the orientation of the menu of food and/or drink selection options projected onto the surface is selected to be correct for each user.

The ordering system may be one in which projector apparatus projects a single image that is oriented so that both users can read the menu items the right way up.

The ordering system may be one in which the zone on the surface is circular.

The ordering system may be one in which the projector apparatus projects an image that is divided into a menu zone for the first user, and a different menu zone for the second user.

The ordering system may be one in which the menu zones have text and images appropriately oriented for each user.

The ordering system may be one in which choices are recorded as those of the first and second users as a group.

The ordering system may be one in which the first user and second user are seated opposite each other.

The ordering system may be one in which the selection options are selectable by a third user operating an interface device operable to provide input to the computer, wherein the menu of food and/or drink selection options is projected into a zone on the surface that is shared by the first, second and third users.

The ordering system may be one in which the third user is seated opposite neither the first user nor the second user.

The ordering system may be one in which the projector apparatus comprises a single projector.

The ordering system may be one in which the projector apparatus comprises multiple projectors.

The ordering system may be one which comprises power and data cables routed through the floor.

The ordering system may be one which includes an input palette system comprising an input palette, a camera and a tracking computer, wherein a menu of food and/or drink selection options is projected onto the input palette situated on the surface, the selection options being selectable by the first user and also by the second user, the position of the menu of food and/or drink selection options projected onto the surface being selectable by a user according to user positioning of the input palette, wherein the tracking computer is operable to determine the position of the palette through image processing of an image of the palette obtained by the camera, and the computer controlled projector apparatus is operable to change the positioning of the menu in response to the input palette position determined by the tracking computer.

The ordering system may be one which includes an input pointer system comprising an input pointer, a camera and a tracking computer, wherein a menu of food and/or drink selection options is projected onto the surface, the selection options being selectable by the first user when holding the input pointer, wherein the tracking computer is operable to determine the position of the pointer through image processing of an image of the surface obtained by the camera, and the computer controlled projector apparatus is operable to provide selection of a menu option in response to the input pointer position determined by the tracking computer.

According to a second aspect of the invention, there is provided a method of ordering food and/or drink in an interactive food and/or drink ordering system, the system comprising a computer controlled projector apparatus and a horizontal surface, wherein images from the computer controlled projector apparatus are projected onto some or all of the surface, the images including a menu of food and/or drink selection options, the selection options being selectable by a first user operating an interface device operable to provide input to the computer and also by a second user operating an interface device operable to provide input to the computer, wherein the menu of food and/or drink selection options is projected into a zone on the surface that is shared by the first and second users, comprising the steps of:

(i) the first user or the second user operating an interface device to select an item of food or drink from the menu projected on the surface, and (ii) a record of the selection being made in an order record corresponding to the first and second users.

According to a third aspect of the invention, there is provided an interactive food and/or drink ordering system comprising a computer controlled projector apparatus and a horizontal surface, wherein images from the computer controlled projector apparatus are projected onto a first zone on the surface that is shared by first and second users in a first group of users, the images in the first zone including a menu of food and/or drink selection options, the selection options in the first zone being selectable by the first user operating an interface device operable to provide input to the computer and also by the second user operating an interface device operable to provide input to the computer, and wherein images from the computer controlled projector apparatus are projected onto a second zone on the surface that is shared by third and fourth users in a second group of users, the images in the second zone including a menu of food and/or drink selection options, the selection options in the second zone being selectable by the third user operating an interface device operable to provide input to the computer and also by the fourth user operating an interface device operable to provide input to the computer.

The ordering system may be one in which the first, second, third and fourth users each operate their own interface device operable to provide input to the computer.

The ordering system may be one in which one or more interface devices are connected to the computer.

The ordering system may be one in which each interface device is operable to select an option from the zone on the surface that is shared by its respective user.

The ordering system may be one in which the orientation of the menu of food and/or drink selection options projected onto the surface are selected to be correct for each user.

The ordering system may be one in which for each zone, the projector apparatus projects a single image that is oriented so that the respective users can read the menu items the right way up.

The ordering system may be one in which the zones on the surface are circular.

The ordering system may be one in which for each zone, the projector apparatus projects an image that is divided into a respective menu zone for each respective user.

The ordering system may be one in which the menu zones have text and images appropriately oriented for each user.

The ordering system may be one in which respective choices are those of the group of users for each respective zone.

The ordering system may be one in which the first user and second user are seated opposite each other; the third user and fourth user are seated opposite each other.

The ordering system may be one in which the selection options are selectable by a fifth user operating an interface device operable to provide input to the computer, wherein the menu of food and/or drink selection options is projected into the first zone on the surface that is shared by the first, second and fifth users.

The ordering system may be one in which the fifth user seated opposite neither the first user nor the second user.

The ordering system may be one in which the zones are adjustable in response to the addition of one or more users to a group of users.

The ordering system may be one wherein images from the computer controlled projector apparatus are projected onto a third zone on the surface that is shared by two users in a third group of users, the images in the third zone including a menu of food and/or drink selection options, the selection options in the third zone being selectable by the first of the two users in the third group of users operating an interface device operable to provide input to the computer and also by the second of the two users in the third group of users operating an interface device operable to provide input to the computer.

The ordering system may be one in which the zones are adjustable in response to the addition of one or more users to a group of users.

The ordering system may be one in which bench seating is provided for some users.

The ordering system may be one in which the projector apparatus comprises a single projector.

The ordering system may be one in which the projector apparatus comprises multiple projectors.

The ordering system may be one comprising power and data cables routed through the floor.

The ordering system may be one in which the surface is a table surface, and table division is provided for by movable physical dividers, the system including an image recognition system operable to recognize the table dividers.

The ordering system may be one in which the table is circular or rectangular.

The ordering system may be one which includes an input palette system comprising a first input palette and a second input palette, a camera and a tracking computer, wherein a respective menu of food and/or drink selection options is projected onto a respective input palette situated on the surface, the respective selection options being selectable by a respective user and also by one or more respective additional users, a position of the respective menu of food and/or drink selection options projected onto the surface being selectable by a respective user according to user positioning of a respective input palette, wherein the tracking computer is operable to determine a respective position of a respective input palette through image processing of an image of the respective palette obtained by the camera, and the computer controlled projector apparatus is operable to change the position of the respective menu in response to the respective input palette position determined by the tracking computer.

The ordering system may be one in which input palettes are provided in correspondence with groups of users, and when the palettes corresponding to a group of users are moved, the zone boundary corresponding to the group of users moves accordingly.

The ordering system may be one which includes an input pointer system comprising an input pointer, a camera and a tracking computer, wherein a menu of food and/or drink selection options is projected onto the surface, the selection options being selectable by a user holding the input pointer, wherein the tracking computer is operable to determine the position of the pointer through image processing of an image of the surface obtained by the camera, and the computer controlled projector apparatus is operable to provide selection of a menu option in response to the input pointer position determined by the tracking computer.

The ordering system may be one wherein each input palette of the input palette system has a corresponding input pointer of the input pointer system.

According to a fourth aspect of the invention, there is provided a method of ordering food and/or drink in an interactive food and/or drink ordering system, the system comprising a computer controlled projector apparatus and a horizontal surface, wherein images from the computer controlled projector apparatus are projected onto a first zone on the surface that is shared by first and second users in a first group of users, the images in the first zone including a menu of food and/or drink selection options, the selection options in the first zone being selectable by the first user operating an interface device operable to provide input to the computer and also by the second user operating an interface device operable to provide input to the computer, and wherein images from the computer controlled projector apparatus are projected onto a second zone on the surface that is shared by third and fourth users in a second group of users, the images in the second zone including a menu of food and/or drink selection options, the selection options in the second zone being selectable by the third user operating an interface device operable to provide input to the computer and also by the fourth user operating an interface device operable to provide input to the computer, the method comprising the steps of:
  (i) the first user, the second user, the third user or the fourth user operating an interface device to select an item of food or drink from the menu projected on the surface in a menu zone corresponding to the user's group,
  (ii) a record of the selection being made in an order record corresponding to the user's group.

The computer controlling the projector apparatus may be connected to an EPOS (electronic point of sale system) and provides information to kitchen and/or bar staff to determine what food and/or beverages will be prepared. The invention will be implemented in a London based restaurant called 'Inamo™'. At Inamo, control over the dining experience is placed firmly in the hands of the customer through interactive customer ordering. A concept of the Inamo restaurants is to provide dining theatre through a projector, possibly mounted above each table. This projector projects a user interface for bespoke software called 'WES' onto the table surface. An EPOS (electronic point of sale) system is the back end to the WES system. The front end of this WES system may be controlled through a rechargeable Bluetooth track pad interface device built into the table. The user interface may include simple lists of food/beverage items with related icons and buttons that a user can select using the track pad; a pointer controlled by the track pad may also be projected onto the table surface. In addition to ordering food and drink, the customer can customise the ambience of the table lighting using WES. Any image including streamed films, coloured lighting, and images of what the customer could order can be shown using projector apparatus. The WES system therefore provides malleable décor through the unique table lighting and customisable ambience.

In principle, the tables need not be specially designed for the system since any table with a white table cloth will do. This is a major advantage over prior art systems with touch panels and PCs embedded into the table itself. No power need be supplied to the table at all; for example, the track pads can be powered by a rechargeable battery, with a power cable pulled down from the projector housing perhaps once per week to recharge each track pad. In some environments it is far better to have power and data cabling running to a ceiling mounted housing (the housing then includes the LCD projector and client PC computer) because restaurants often either have false ceilings or they make a feature of having exposed cabling. In any event, in some environments it is far simpler to provide data and power to ceiling mounted devices than to tables.

Some strengths include: Customers are in total control of the dining experience. Service is highly efficient, with the average order-delivery delay being under ten minutes and the bill payment process taking under five minutes for a group of four. Customers are not put off Inamo by negligent service. There are also lower operating costs through increased efficiency; faster ordering, fewer customer inhibitions about ordering, faster service for customers; further, less work for waiters, so reducing staff costs. Appendix I lists possible enhanced operating aspects delivered by some implementations of the present invention. Appendix II provides a Hardware System Overview of an example system.

BRIEF DESCRIPTION OF THE DRAWINGS

In FIG. 19, the seating arrangement is for two groups of customers, separated by the dashed line 190 which corresponds to the coincident edges of rectangles defined by dotted lines 180 and 181 in FIG. 18.

DETAILED DESCRIPTION

Figure 1:
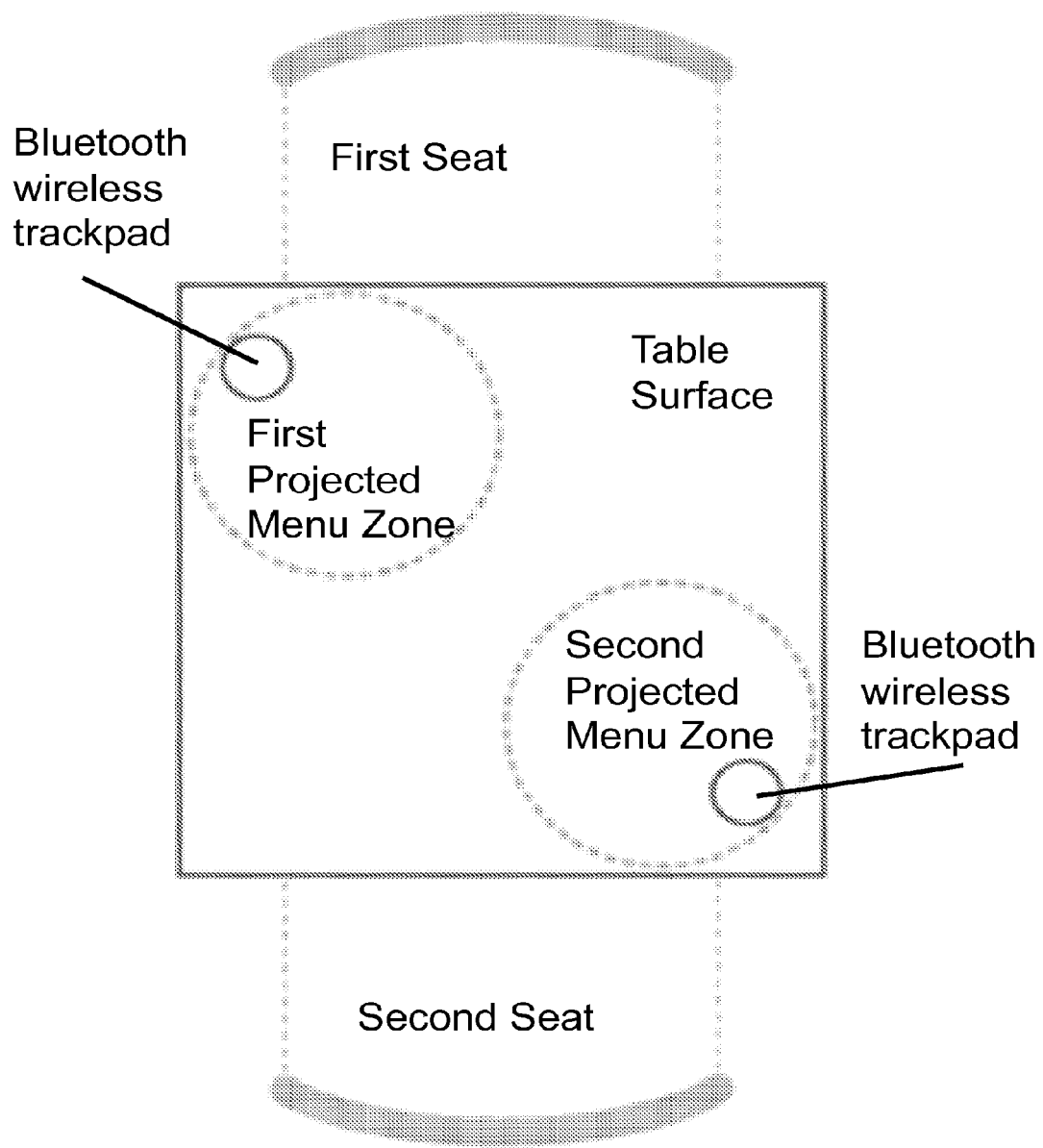
FIG. 1 shows two projected menu zones on a table surface, according to the prior art.
Figure 2:
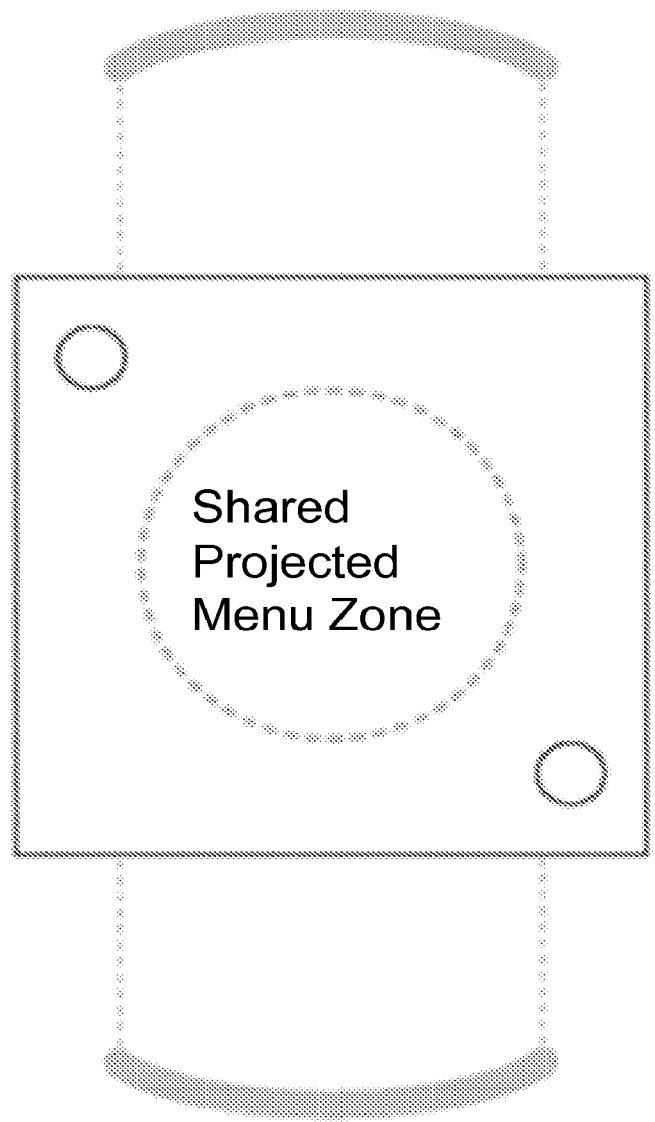
FIG. 2 shows use of a single, shared projected menu zone on a table surface.

A different approach to that exemplified in FIG. 1 is to use a single, shared menu zone. The overhead projector can, for example, project a single image that is oriented so that both diners can read the menu items and can easily select their choices; the choices will be those of the table, rather than individual diners. Alternatively, the projector could project an image that is divided into a menu zone for one diner, and a different menu zone for the other (or each other) diner; the menu zones could have text and images appropriately oriented for each diner—e.g. one half could be oriented upside down relative to the other half. An example is shown in FIG. 2. This approach gives a shared experience.

Figure 3:
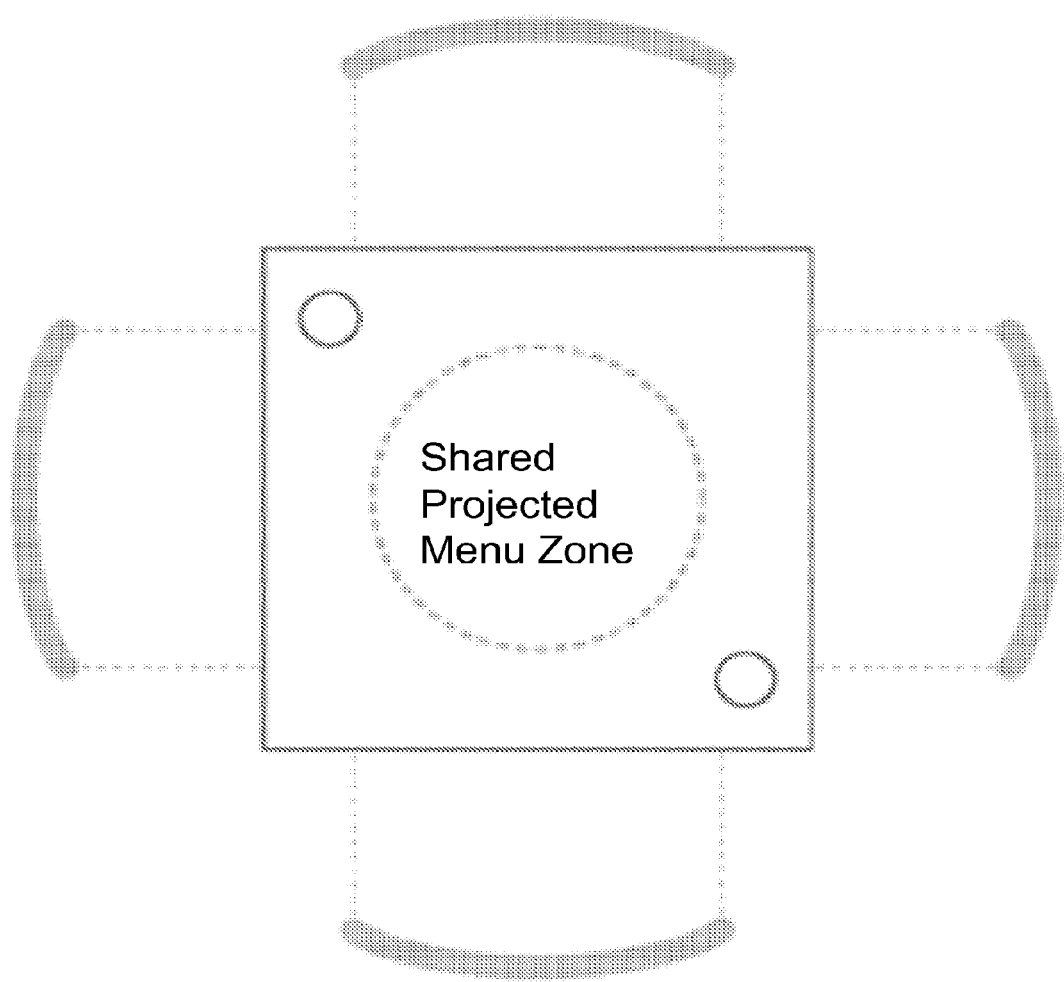
FIG. 3 shows use of a single, shared projected menu zone on a table surface, for a four seat table.

A single, shared menu zone also allows for more flexible use of a given table area—for example, the two seat table described with reference to FIG. 2 can now readily be used as a four seat table. An example is shown in FIG. 3.

Figure 4:
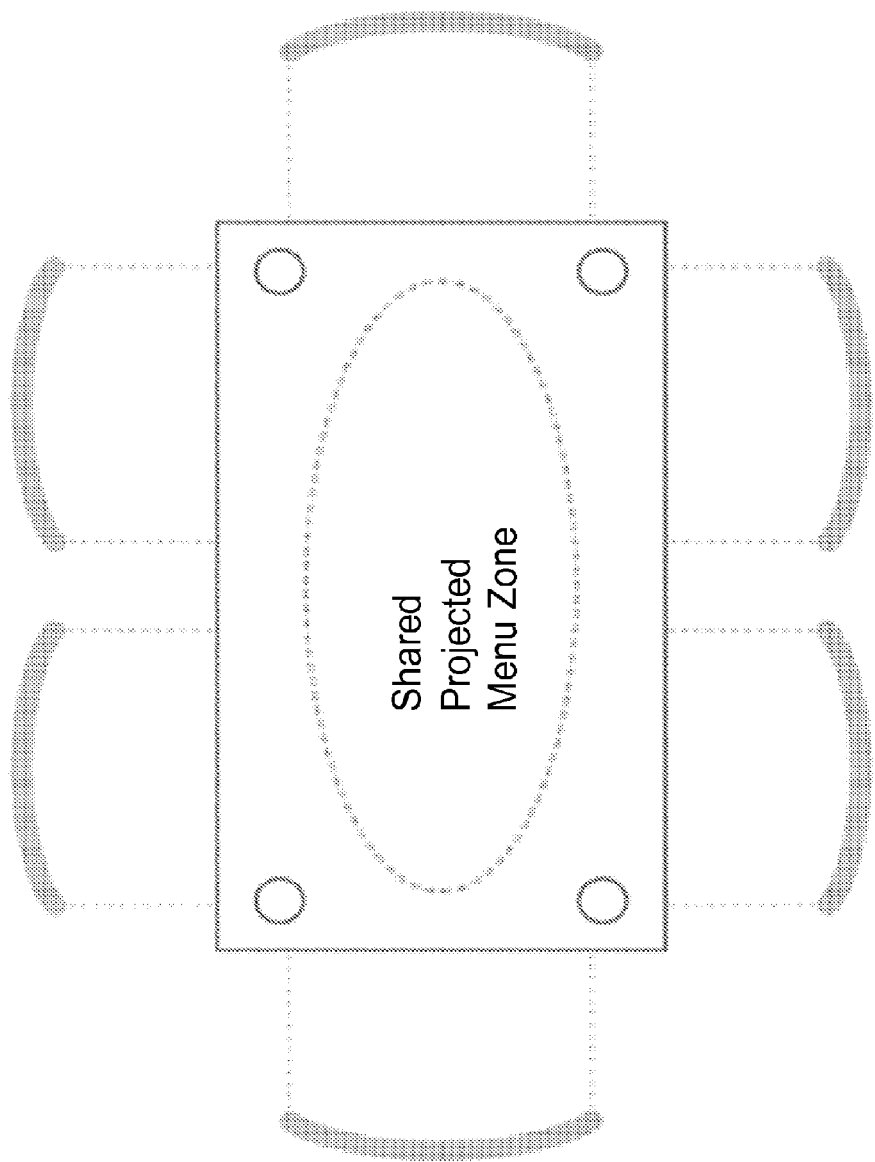
FIG. 4 shows use of a single, shared projected menu zone on a table surface, wherein the projected menu zone is elliptical in shape.

A single, shared menu zone can be of any shape, allowing for more flexible use of a given table area, and a shared dining experience. An example is shown in FIG. 4, wherein the projected menu zone is elliptical in shape.

Figure 5:
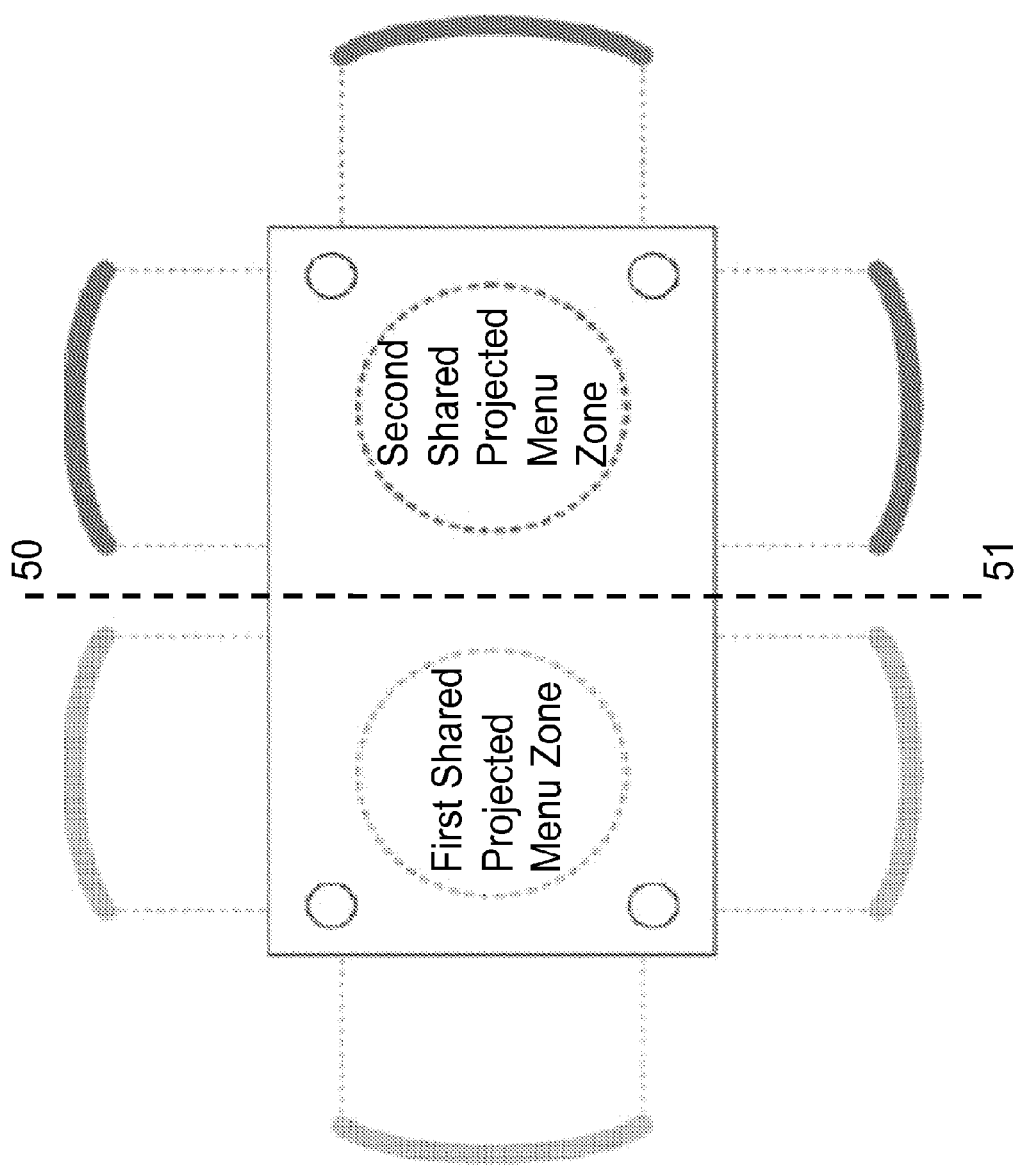
FIG. 5 shows how in a table for six people, the projector may generate two separate menu zones.

Different groupings of diners at a table can be defined by each group having its own menu zone; this gives even greater flexibility in arranging diners. For example, in a table for six people, the projector generates two separate menu zones, one for the group of three people at one half of the table, and a separate menu zone at the other half of the table. An example is shown in FIG. 5: a dashed line from 50 to 51 distinguishes the two halves of the table in the Figure.

Figure 6:
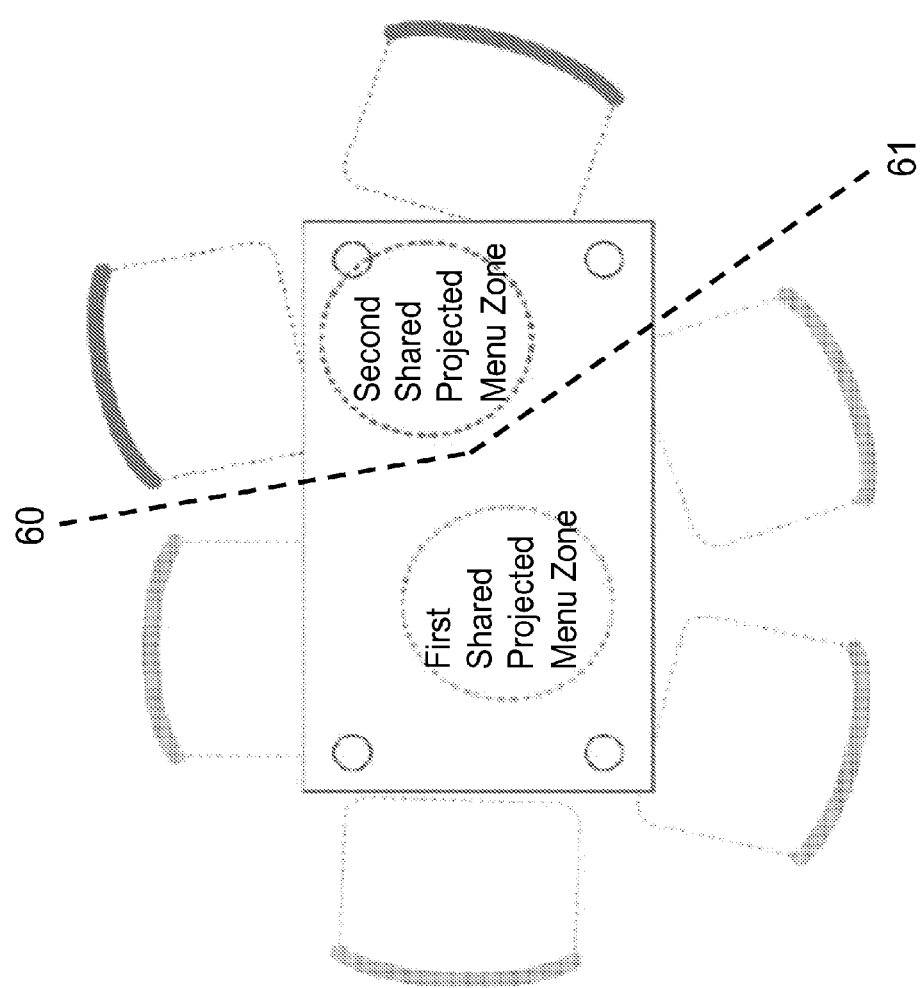
FIG. 6 shows how in a table for six people, the projector may generate two separate menu zones for a group of four people at the left and a group of two people on the right.

Flexible positioning of each shared menu zone allows for odd (i.e. various) group sizes and seating arrangements. So in a table for six people, we can have a group of four people at the left and a group of two people on the right. The group of four all share the same menu zone; the group of two share a different menu zone. An example is shown in FIG. 6: a dashed path from 60 to 61 distinguishes the two parts of the table in the Figure.

Figure 7:
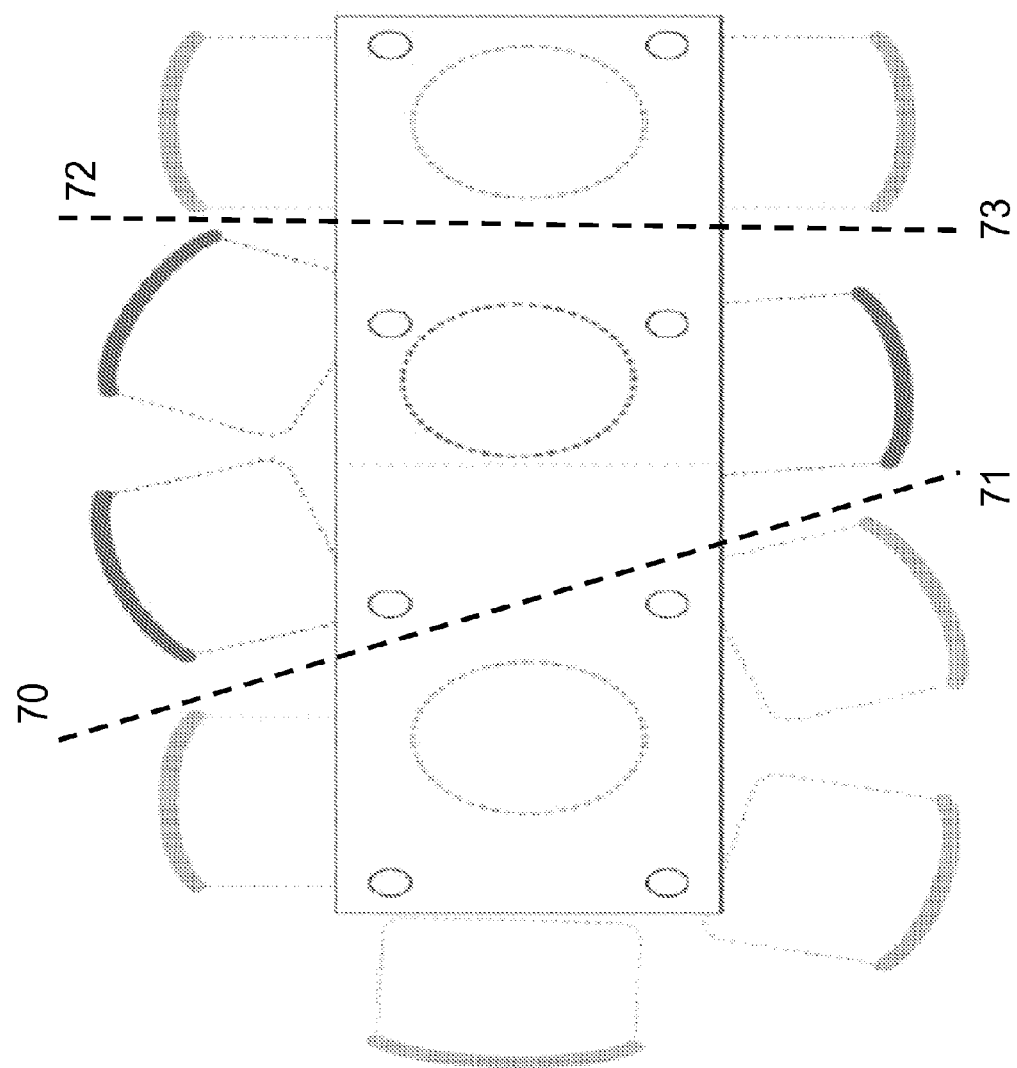
FIG. 7 shows how a table for ten people may be arranged so that there are three different shared menu zones.

Flexible positioning of the various shared menu zones allows for odd (i.e. various) group sizes and seating arrangements. For example, a table for ten people is arranged so that there are three different shared menu zones—one for a group of four on the left hand side; another for a group of three in the middle and finally a group of two on the right hand side. An example is shown in FIG. 7. In FIG. 7, a dashed path from 70 to 71 distinguishes first and second parts of the table in the Figure; a dashed path from 72 to 73 distinguishes second and third parts of the table in the Figure.

Figure 8:
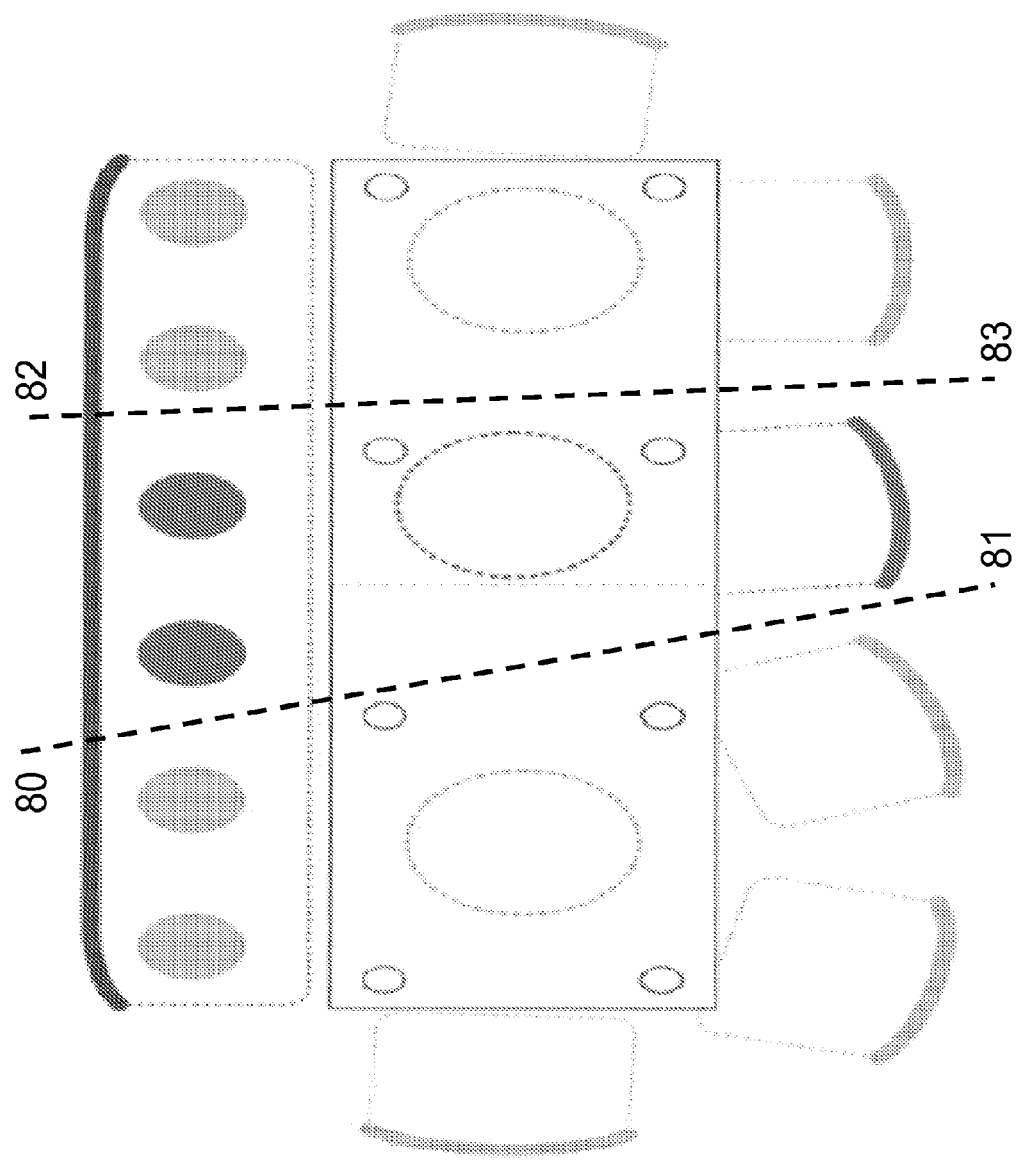
FIG. 8 shows how a table may be arranged so that there are three different shared menu zones.

Flexible positioning of multiple, shared menu zones allows for odd (i.e. various) group sizes and seating arrangements, including bench seating. An example is shown in FIG. 8. In FIG. 8, dashed lines 80 to 81, and 82 to 83, indicate the boundaries between the groups seated at the table.

Figure 9B:
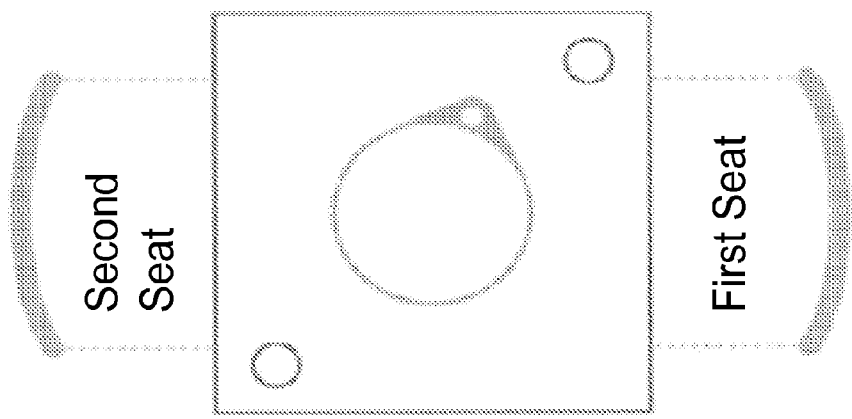
FIG. 9B shows provision of a flat, portable disc the approximate size of the shared menu zone.
Figure 9A:
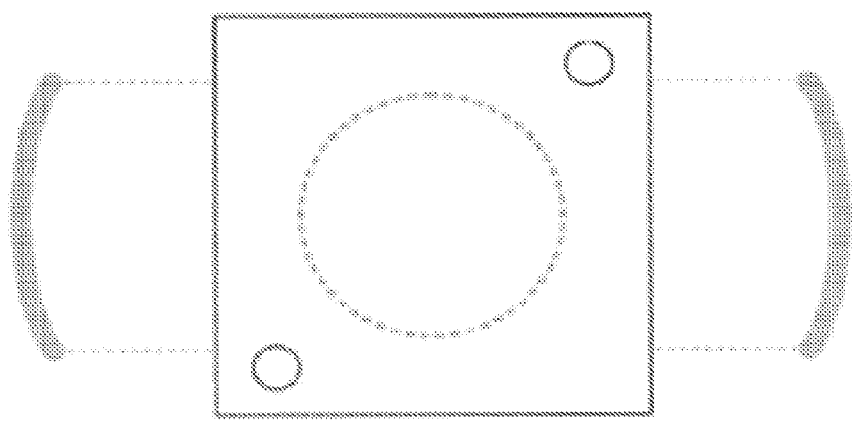
FIG. 9A shows use of a single, shared projected menu zone on a table surface.

Using a camera such as a web camera to detect and track a physical object provides a new approach to flexibility. For example, the shared menu zone is normally just projected by a projector onto the table top at a fixed location (albeit one that can be altered by the restaurant management to permit different seating arrangements to be used, different groups at a table to be provided with their own dedicated menu zone etc) as shown for example for the table in FIG. 9A. But with another table, such as the table shown for example in FIG. 9B, a flat, portable disc the approximate size of the shared menu zone is provided—the disc includes a small hole at one section, and resembles an oil painter's palette in shape. The palette is detected and tracked by a web camera; the position of the palette is then provided to control the position at which the menu zone is projected. To facilitate recognition of the palette, the palette can include images or other visual features with sharp, well delineated edges that can be readily recognized using image recognition systems; for example, the palette could include a 2D or 3D barcode. The image (e.g. barcode) does not have to be visible to a person, merely to the image recognition system. Hence, a barcode visible only in the IR (infra red) spectrum could be used. The palette should break azimuthal symmetry so that an image recognition system processing a camera image can determine the azimuthal orientation of the palette. If azimuthal symmetry is not broken in some way, such as with a featureless purely circular palette, one cannot determine the azimuthal orientation of the palette from an image of the palette.

Because the palette can be rapidly and reliably tracked, a diner can move the palette to any convenient position on the table and the shared menu zone will follow its movement, being continuously projected onto the palette and not elsewhere on the table. The projector may maintain a fixed background image on the table as the palette is moved.

The location of the handle can be tracked and identified as well—so that the shared menu zone orientation can vary as the palette is rotated. For example, with the palette in the position shown in FIG. 9B, the menu could be oriented by the overhead projector to present the menu correctly to the diner at the first seat; if a diner swivels the palette around, then the menu orientation can alter to face the other diner in the second seat.

Figure 10B:
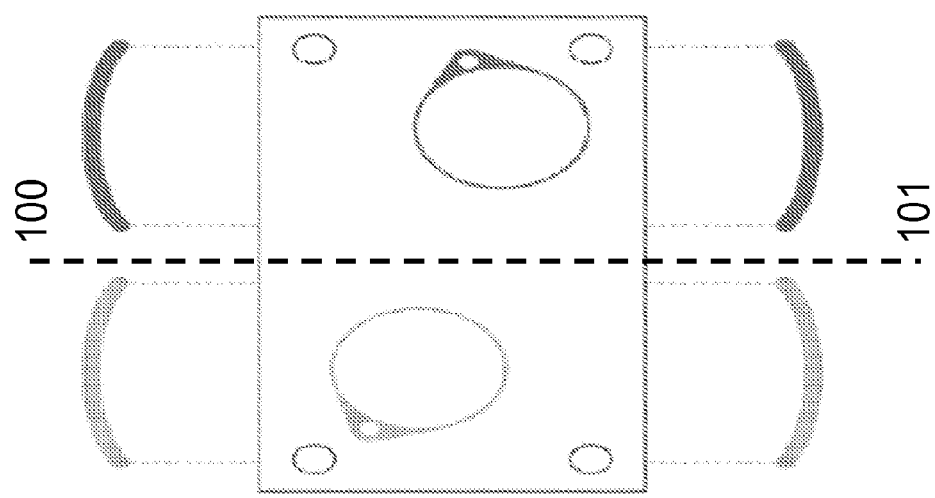
FIG. 10B shows there are two separate groups of two people; two separate palettes are tracked by a web camera.
Figure 10A:
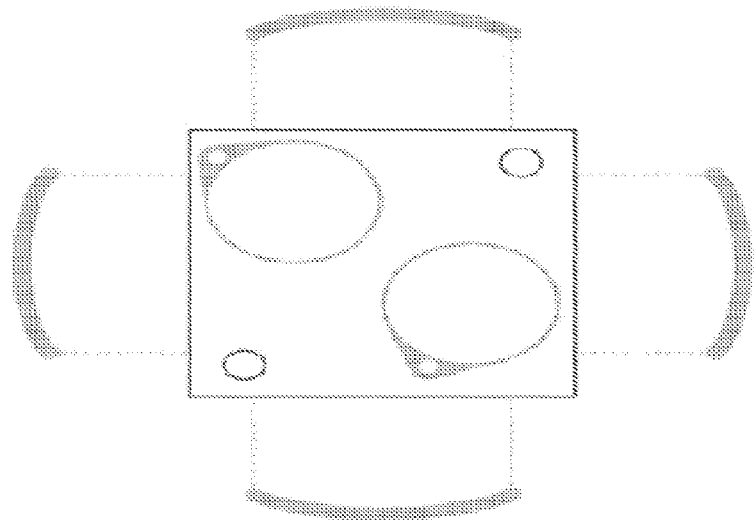
FIG. 10A shows how for a table made up of four people in a single group, both palettes control a single order for the entire table.

Using a web camera to detect and track a physical object allows for as many instances of a menu as there are physical objects to trigger one. For example, in the tables shown in FIG. 10A and FIG. 10B, we have two separate palettes on each table; for the table in FIG. 10A, made up of four people in a single group, both palettes control a single order for the entire table. But for the table in FIG. 10B, there are two separate groups of two people, indicated by the separating dashed line between 100 and 101. As shown for example in FIG. 10B, two separate palettes are tracked by a web camera (typically just one, but it would of course be possible to have more than one camera); separate menu zones are projected onto each palette.

By expanding the use of web-cam detection and tracking, other physical objects can be used to interact with the menu. This enables the replacement of expensive touch-detecting equipment with basic objects (such as a piece of wood) with nothing more than a graphic that the camera can track. For example, in the table in FIG. 11B, a small circular pointer 110, 111 with a short handle is placed on each palette; the position of the pointer can be detected and tracked using the web-cam. The diner can move this pointing device over images projected on the palette; when aligned over a specific image of say a button or icon, that can be interpreted as a selection action. Hence, the image projected onto the palette can include navigation functions as well as selection functions.

To aid detection and tracking of the pointer, the pointer can be equipped with a light source (e.g an infrared LED) that a user can activate using a small switch on the pointer. The LED faces upwards and its position can be readily detected and tracked using an IR camera (typically filtered to pick up only IR). Users can move their pointers over the table top menu items, selecting them by clicking the switch, which in turn activates the IR LED, with the IR camera detecting the IR; the x-y location on the table top of the pointer can then be inferred using software that analyses the location of the light source on each frame of the camera's video output. Multiple pointers can be detected and tracked simultaneously on the same table.

Multi-touch functionality is also possible—for example, users could select an item projected onto the tabletop, and then, by keeping the switch activated, and hence the LED emitting IR, multi-touch functions such as pinch, grab and zoom can be performed.

Benefits would be in the enhanced user experience: games (such as air hockey etc.), drawing, manipulation of backgrounds in pleasing and flowing ways, in essence all the things that you can do on a touch screen device, but on a shared table top, with no technology at the table surface level beyond a disposable LED pointer—therefore low cost. Entertainment along with the interactive ordering of food is hence provided.

Figure 11B:
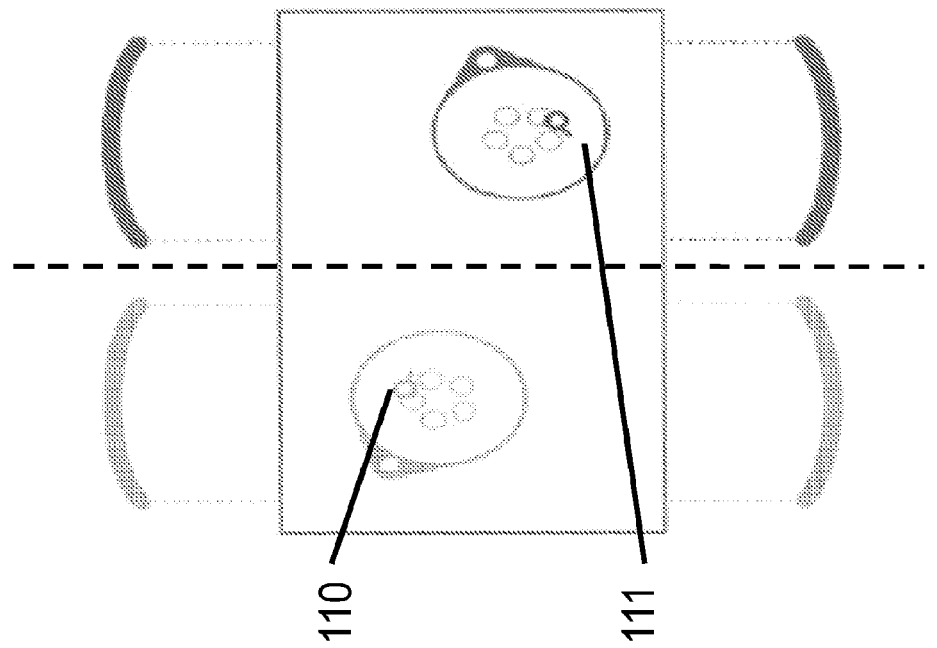
FIG. 11B shows a small circular pointer 110, 111 with a short handle placed on each palette; the position of the pointer can be detected and tracked using the web-cam.
Figure 11A:
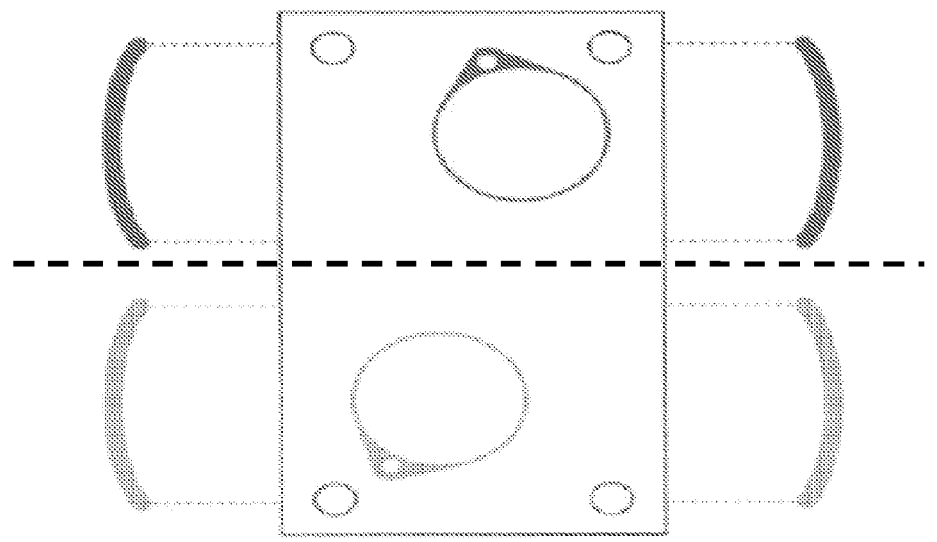
FIG. 11A shows there are two separate groups of two people; two separate palettes are tracked by a web camera.

Unlike the table in FIG. 11A, which still includes four separate trackpads at each corner (indicated by the four small circles in each corner), the table in FIG. 11B is an entirely conventional table on which are placed the palette and a pointing/selection device.

The dashed line in FIG. 11A and the dashed line in FIG. 11B each indicates a possible division of the diners at the table into two groups.

Relying only on a web cam for interaction allows for increased fluidity in the seating arrangements of people—the palettes can be tracked wherever they are on the table and different palettes associated with different groupings of diners. Furthermore, any surface may be used as an interaction surface.

Figure 12:
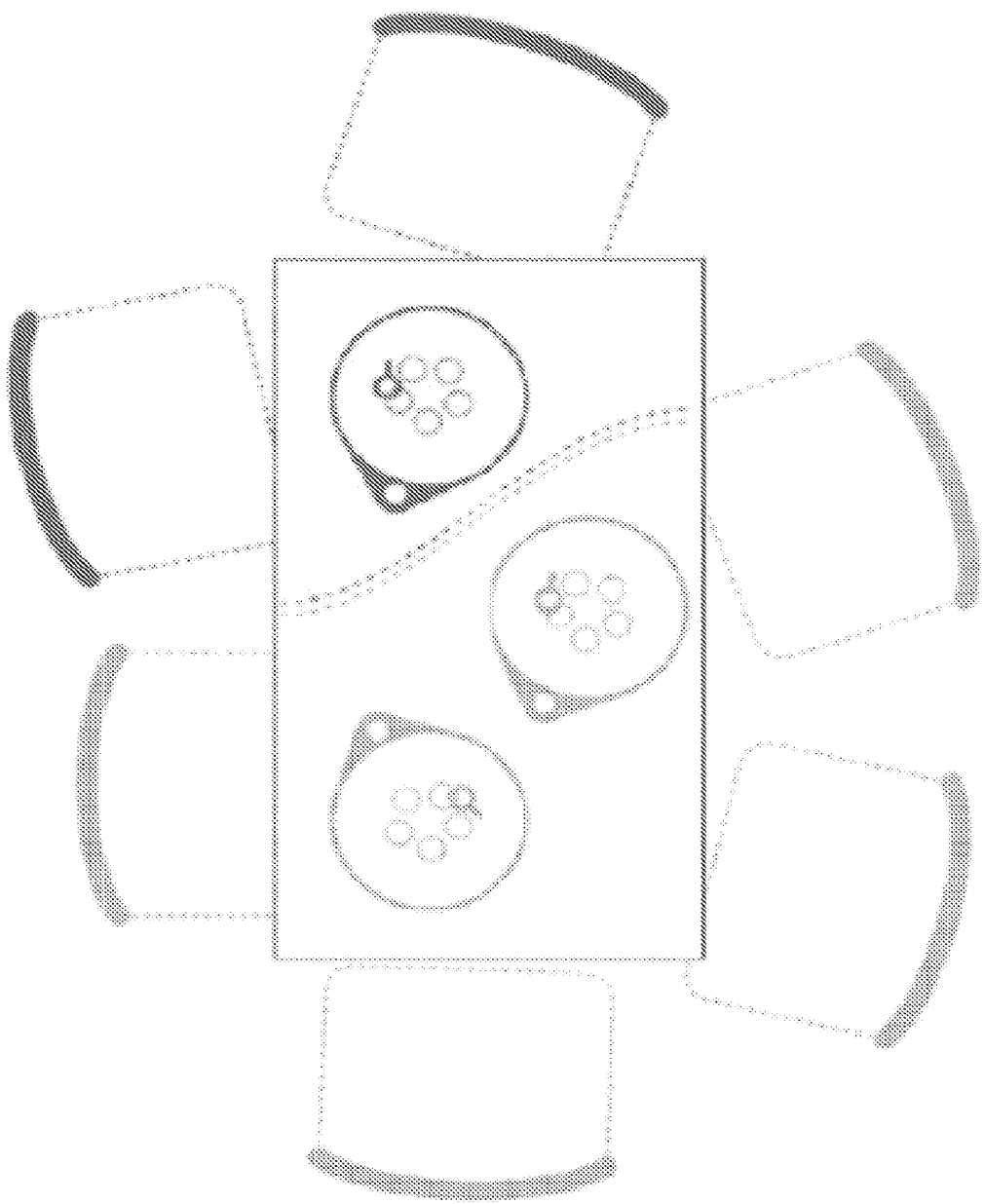
FIG. 12 shows a moveable boundary between the two groups of diners, indicated by the pair of equidistant line paths on the table surface.
Figure 13:
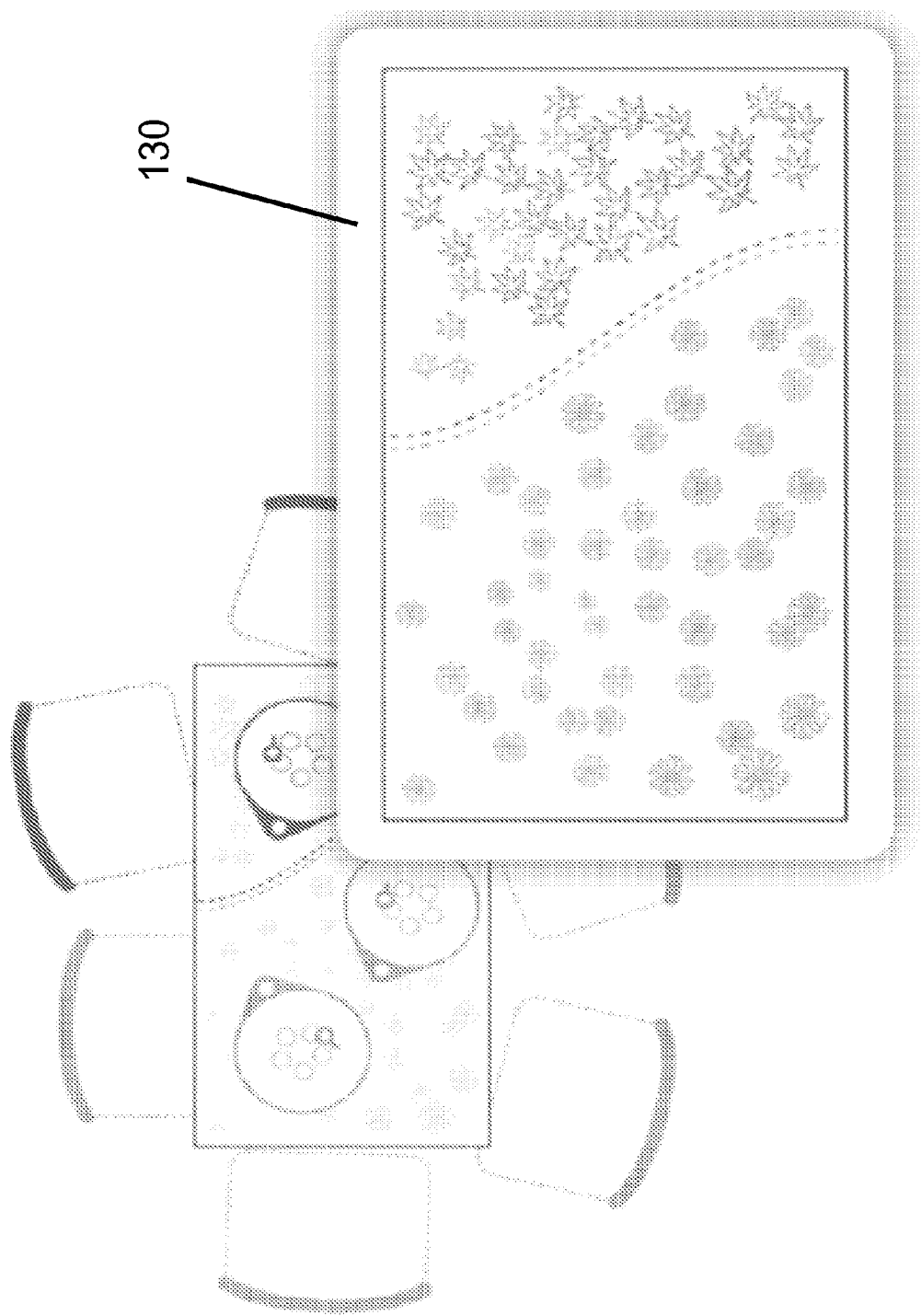
FIG. 13 shows a background can remain constant and still even as the menu zone is projected onto a moving palette.

The dining area belonging to each group of diners can have a unique background colour or image, set by those diners. As the palettes are moved, the boundary between these different areas can automatically change. An example is shown in FIG. 12. The boundary between the two groups of diners is indicated by the pair of equidistant line paths on the table surface.

Where a background image on the table surface is used (called a 'tablecloth'), each shared menu zone area defaults to a white area without the background image; the menu items and control areas can hence be clearly visible in the shared menu zone areas. The background can remain constant and still even as the menu zone is projected onto a moving palette. An example is shown in FIG. 13. In FIG. 13, the table surface 130 is shown in isolation in part of the Figure.

Figure 14:
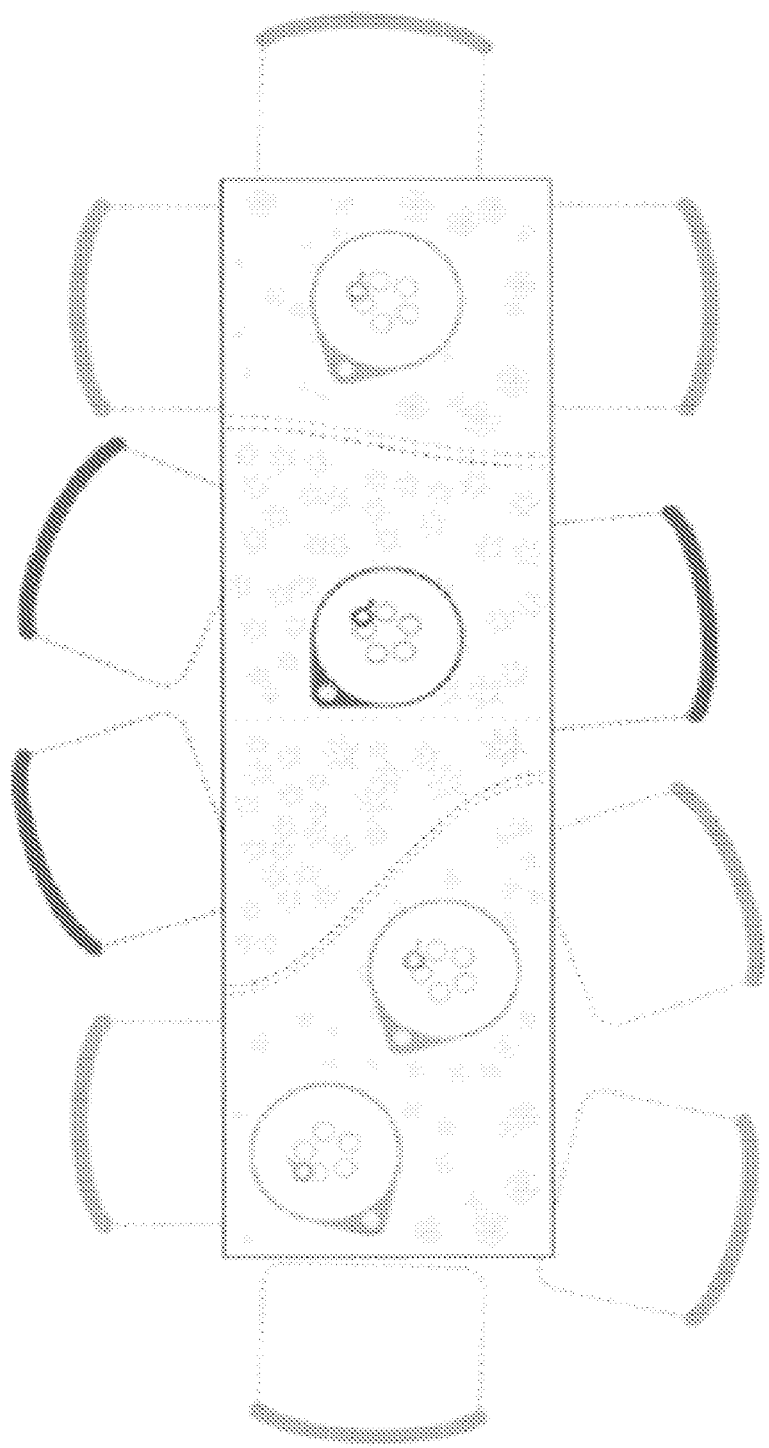
FIG. 14 is moveable boundaries between groups of diners, indicated by pairs of equidistant line paths on the table surface.

As more palettes are added to a table, and those palettes are associated by the system controlling the projector above each table (or the multiple projectors above each table), then appropriate and distinctive background images (called 'tablecloths) are projected onto the table surface. An example is shown in FIG. 14. The boundaries between groups of diners are indicated by pairs of equidistant line paths on the table surface.

Personal, portable touch screen devices, such as the Apple iPod Touch, are becoming very widespread. It is possible to use these devices as the touch screen interface to the interactive food and/or drink ordering system, removing the need for costly dedicated Bluetooth trackpads.

One configuration or design incorporates an iPod Touch (or similar consumer electronics device) into a puck-like object that sits safely on the table top; the casing around the device affords it some protection.

Figure 15:
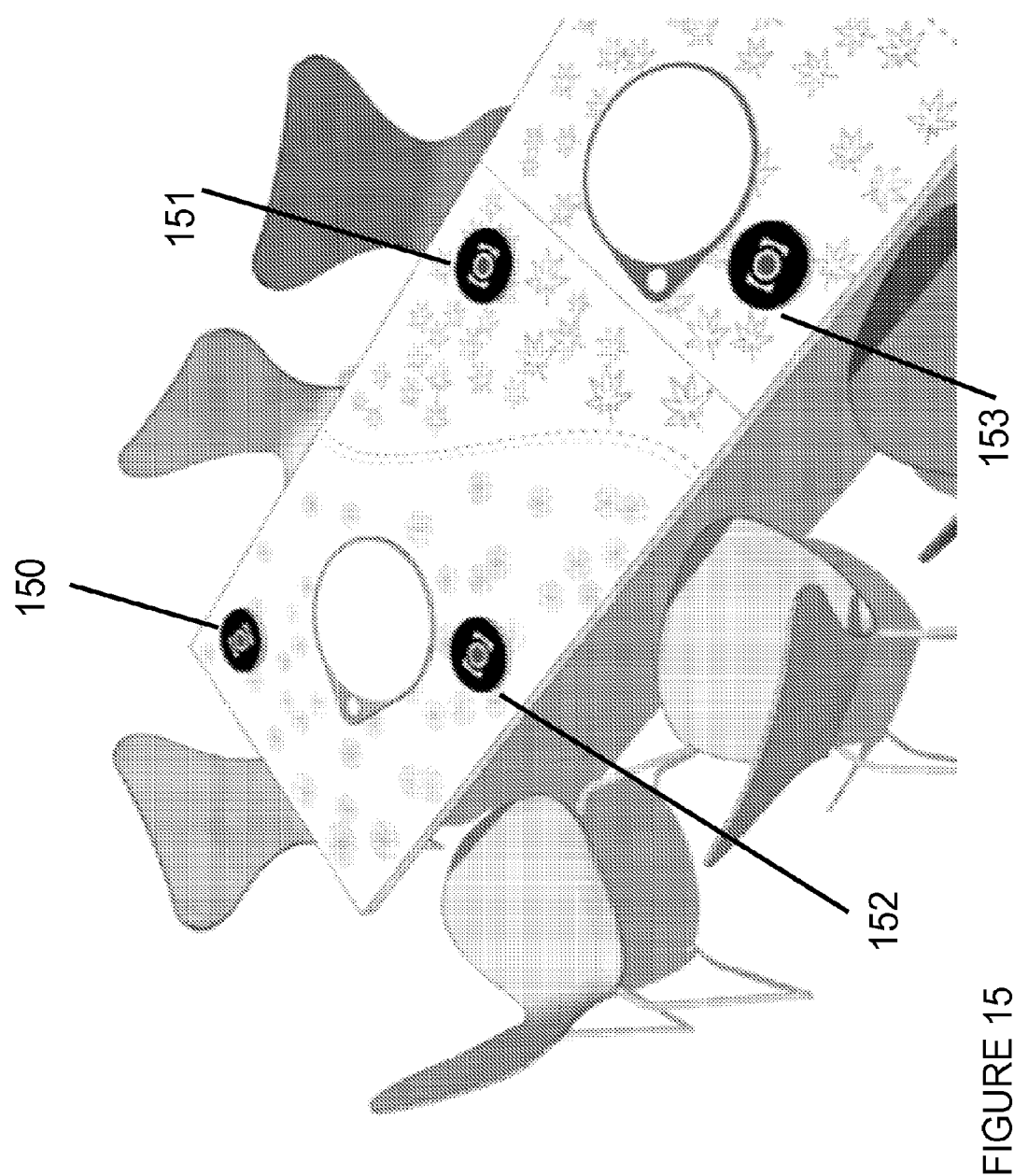
FIG. 15 shows how diners may be provided with a puck 150, 151, 152, 153. The puck can act solely as a pointing device using either its touch-detecting ability, or an image can be displayed on its screen (if using a web-cam based input system, the system may be configured so that no image is projected onto the puck), or a combination of both functions can be used.

In an example, diners are provided with a puck (they may have one each; there may be one or more per group). As shown for example in FIG. 15, diners are provided with a puck 150, 151, 152, 153. The puck can act solely as a pointing device using either its touch-detecting ability, or an image can be displayed on its screen (if using a web-cam based input system, the system may be configured so that no image is projected onto the puck), or a combination of both functions can be used.

The graphical system displayed on the puck screen can also be used as a control input to the interactive food and/or drink ordering system. For example, there could be an IR spectrum 2D barcode (or other image that is recognisable by the image recognition system) that codes for a specific customer—when a returning customer enters the restaurant, he is given a puck with his unique 2D barcode on it; this could be physically printed or displayed on a touch screen display. The image recognition system reads the 2D barcode and the projector then projects a welcome image at the customer's table, welcoming him by name, perhaps enabling him to order to his favourite drinks and dishes as determined automatically by the system from previous orders. The 2D barcode could also code for menu items, promotions, or indeed anything else that can be usefully deployed in controlling the system.

The iPod Touch includes an accelerometer; this generates movement data that can be combined with matching movement data generated from the image recognition camera: by combining these two independent data sets, it becomes possible to achieve greater accuracy and reliability in menu interactions. For example, the accelerometer data could be used to calibrate the data from the camera, or vice versa. Similarly, the accelerometer data can be used where the camera data is too noisy or ambiguous, and vice versa.

Any device with an integrated accelerometer can provide this accelerometer data (the device could be an iPhone, other mobile phone or gaming device).

Figure 16:
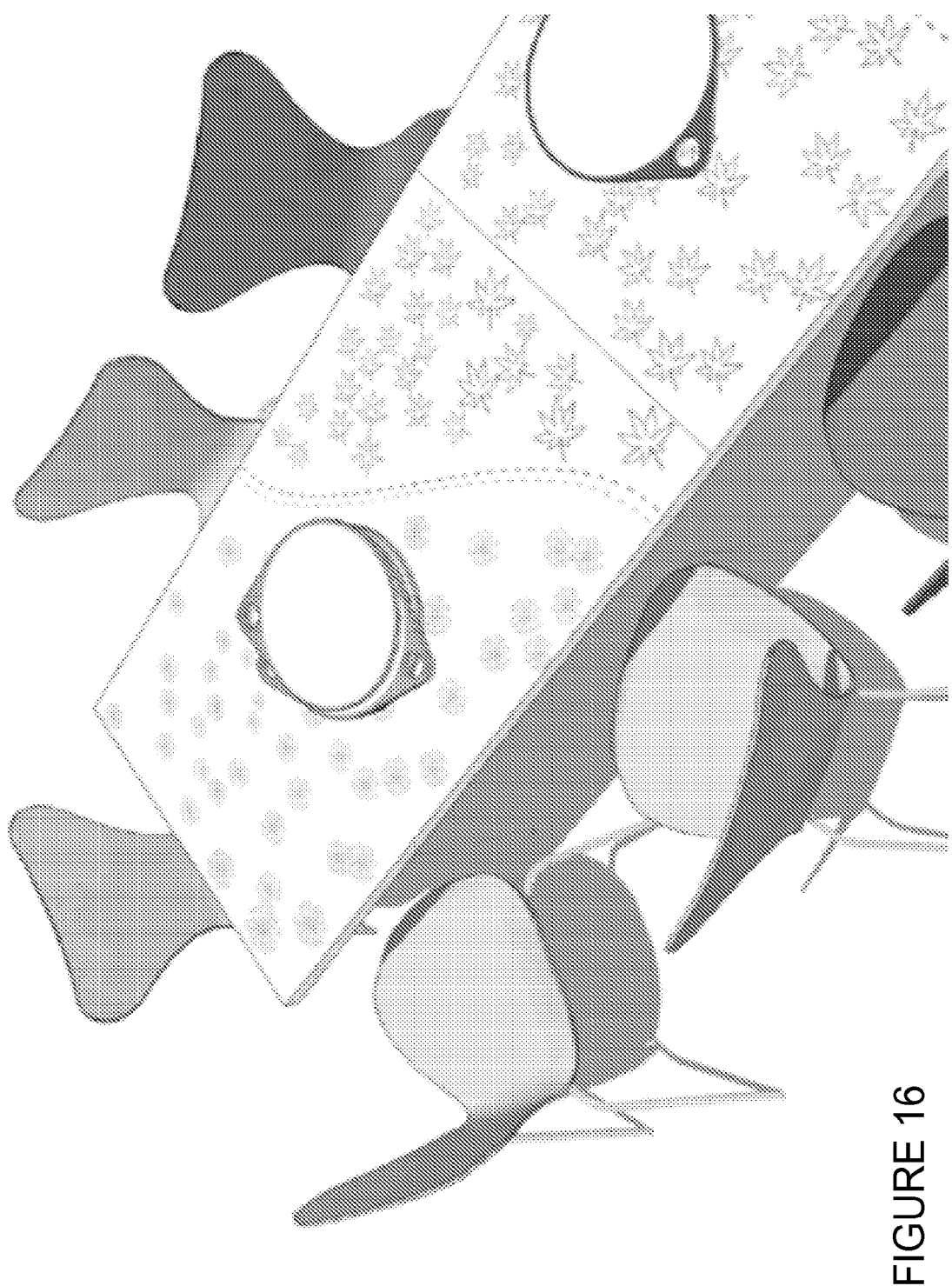
FIG. 16 shows how palettes can simply be stacked on top of one another so that just a single shared menu zone is projected onto the uppermost palette—giving users complete control over how the menu is displayed on the table.

The palettes can simply be stacked on top of one another so that just a single shared menu zone is projected onto the uppermost palette—giving users complete control over how the menu is displayed on the table. An example is shown in FIG. 16.

Figure 17:
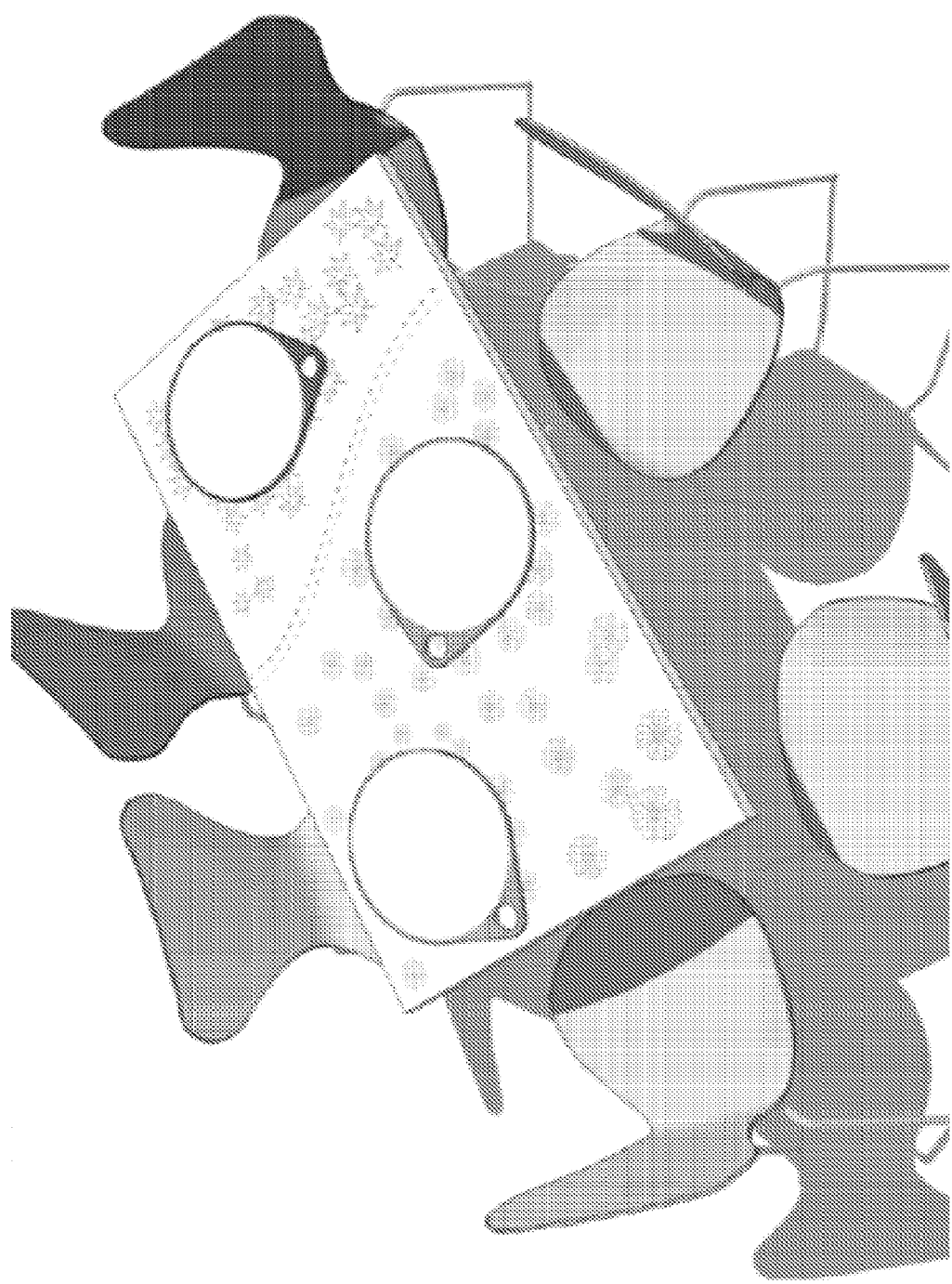
FIG. 17 shows how moving a palette off the stack to the table top in the left hand section of the table is immediately tracked by an overhead camera, triggering a new menu zone to be displayed on the second palette by the overhead projector.

Moving a palette off the stack to the table top into a particular section of the table is immediately tracked by an overhead camera, triggering a new menu zone to be displayed on the second palette by the overhead projector. In an example shown in FIG. 17, moving a palette off the stack to the table top in the left hand section of the table is immediately tracked by an overhead camera, triggering a new menu zone to be displayed on the second palette by the overhead projector.

Figure 18:
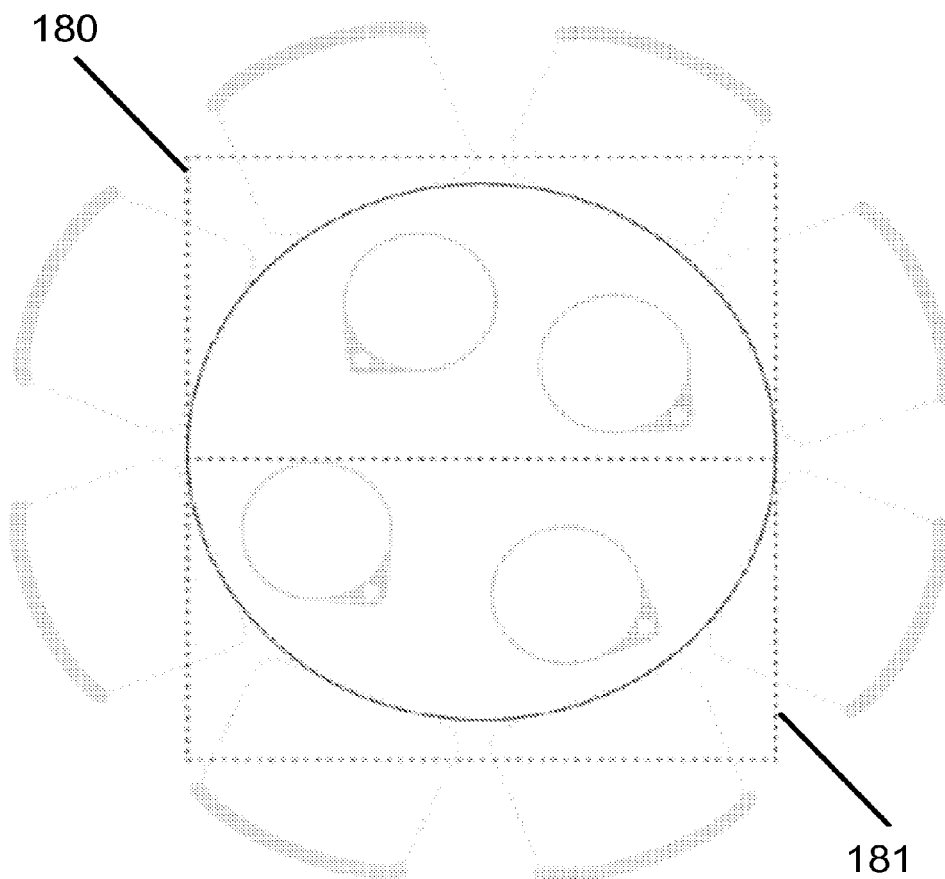
FIG. 18 shows an example of a large, circular table being covered using two 16:9 projections.

Large, circular tables can be covered using two rectangular projections, eg. 16:9 projections. An example of a large, circular table being covered using two 16:9 projections is shown in FIG. 18. The projection area for each projector is shown by the dotted lines 180 and 181, each of which defines a rectangle: palettes positioned anywhere on the table can be tracked and a menu zone projected onto them. A single PC can control both projectors; a single PC can be used to control multiple projectors that project onto a single table, or several joined tables, or several separate tables.

Figure 19:
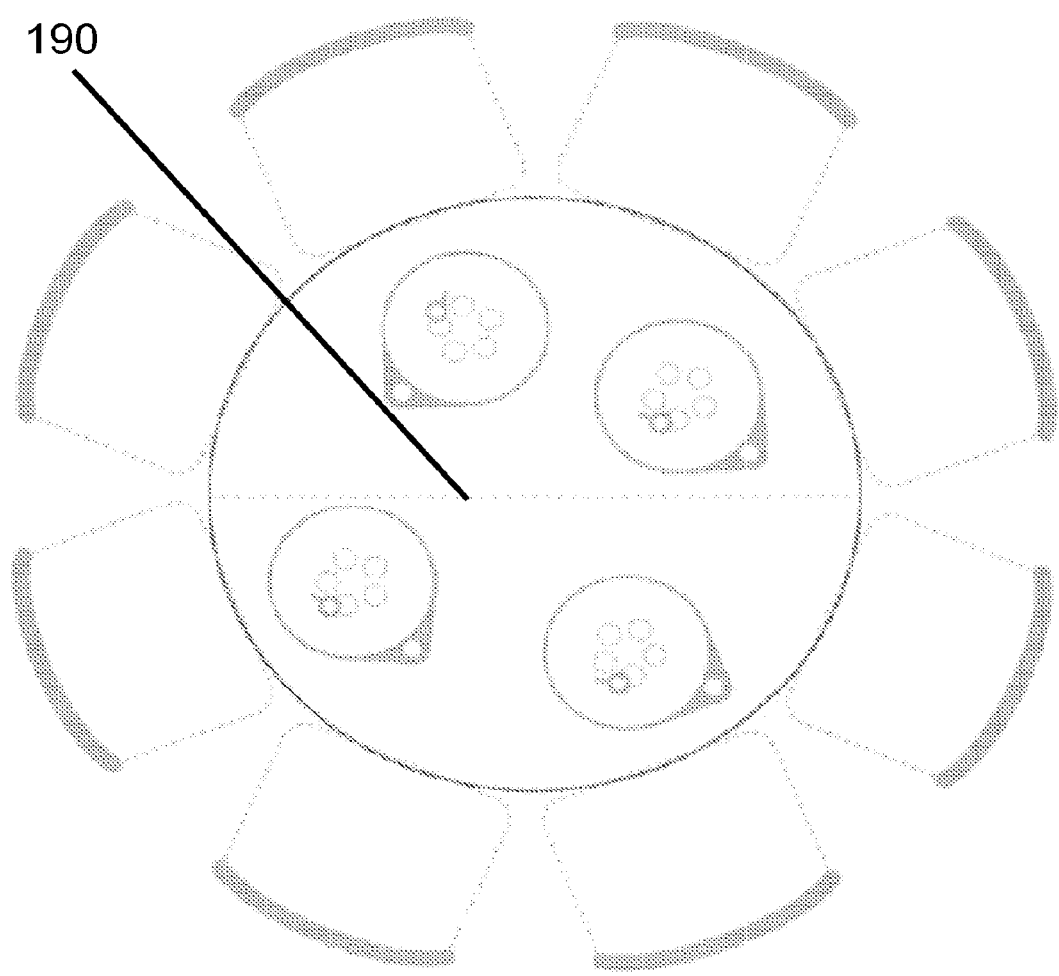
FIG. 19 shows an example corresponding to FIG. 18.

Using two 16:9 projectors provides for fully flexible positioning of the shared menu zones that are projected onto each palette. For example, this allows for odd (i.e. various) group sizes and seating arrangements. In FIG. 19, an example corresponding to FIG. 18 is shown. In FIG. 19, the seating arrangement is for two groups of customers, separated by the dashed line 190 which corresponds to the coincident edges of rectangles defined by dotted lines 180 and 181 in FIG. 18.

The combination of flexible menu zone placement and background table cloths that reflect grouping gives the restaurant manager complete flexibility in placing his diners to maximize the number of covers being served at any time, (i.e 'yield') fully utilizing all available space, irrespective of the size and shape of tables.

Figure 20:
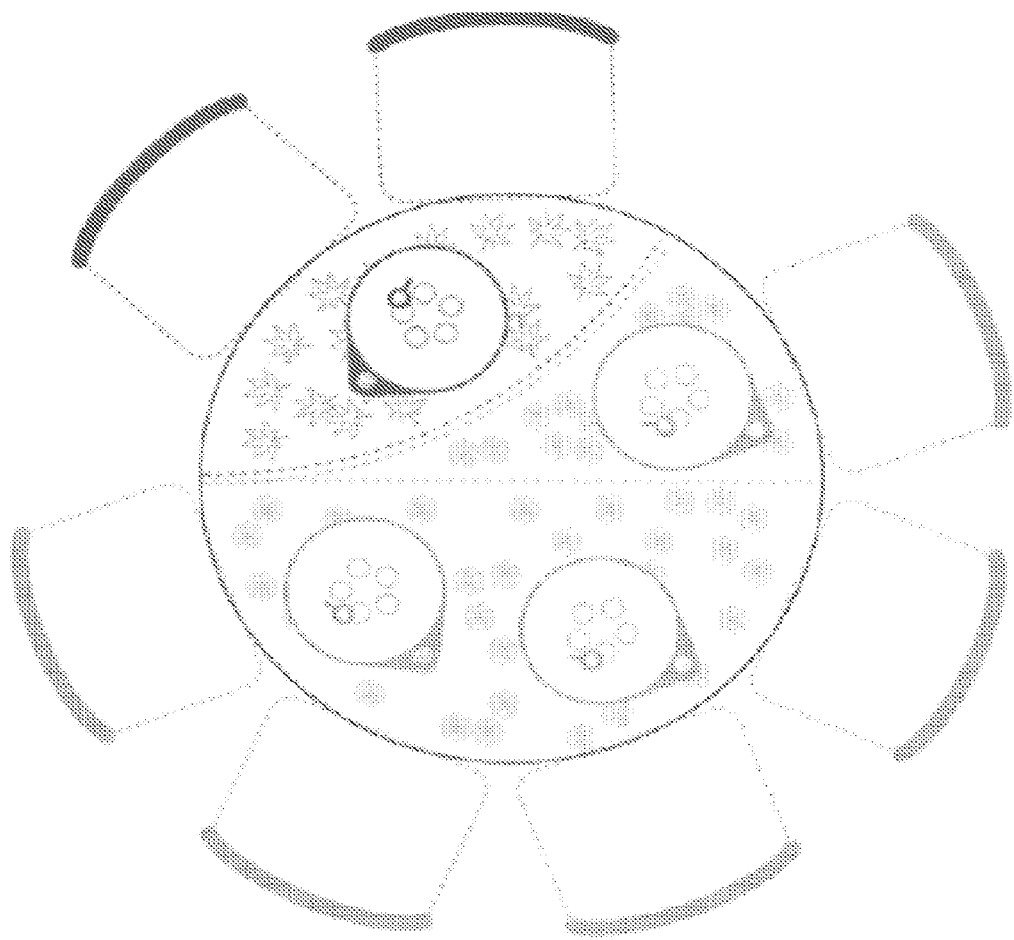
FIG. 20 shows how the projector may generate two separate menu zones.

The system also provides flexibility for bill sharing or dividing, and allows ordering to take place by multiple or single customers. An example is shown in FIG. 20.

Figure 21:
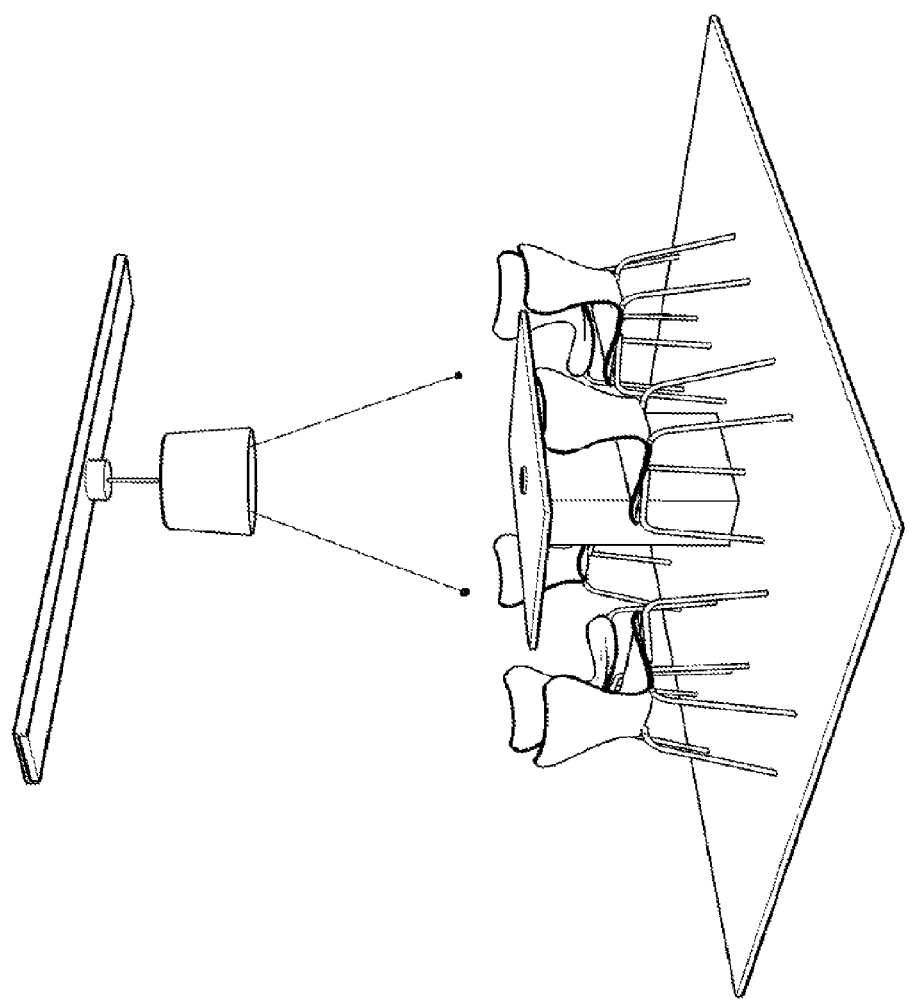
FIG. 21 shows how a projector may be mounted in the table, pointing upwards to a mirror suspended from the ceiling, that reflects the required images (e.g. menu zones, tablecloths etc.) onto the table surface.

Various novel projector systems are possible. In one example, a projector is mounted in the table, pointing upwards to a mirror suspended from the ceiling, that reflects the required images (e.g. menu zones, tablecloths etc.) onto the table surface. An example is shown in FIG. 21.

Figure 22:
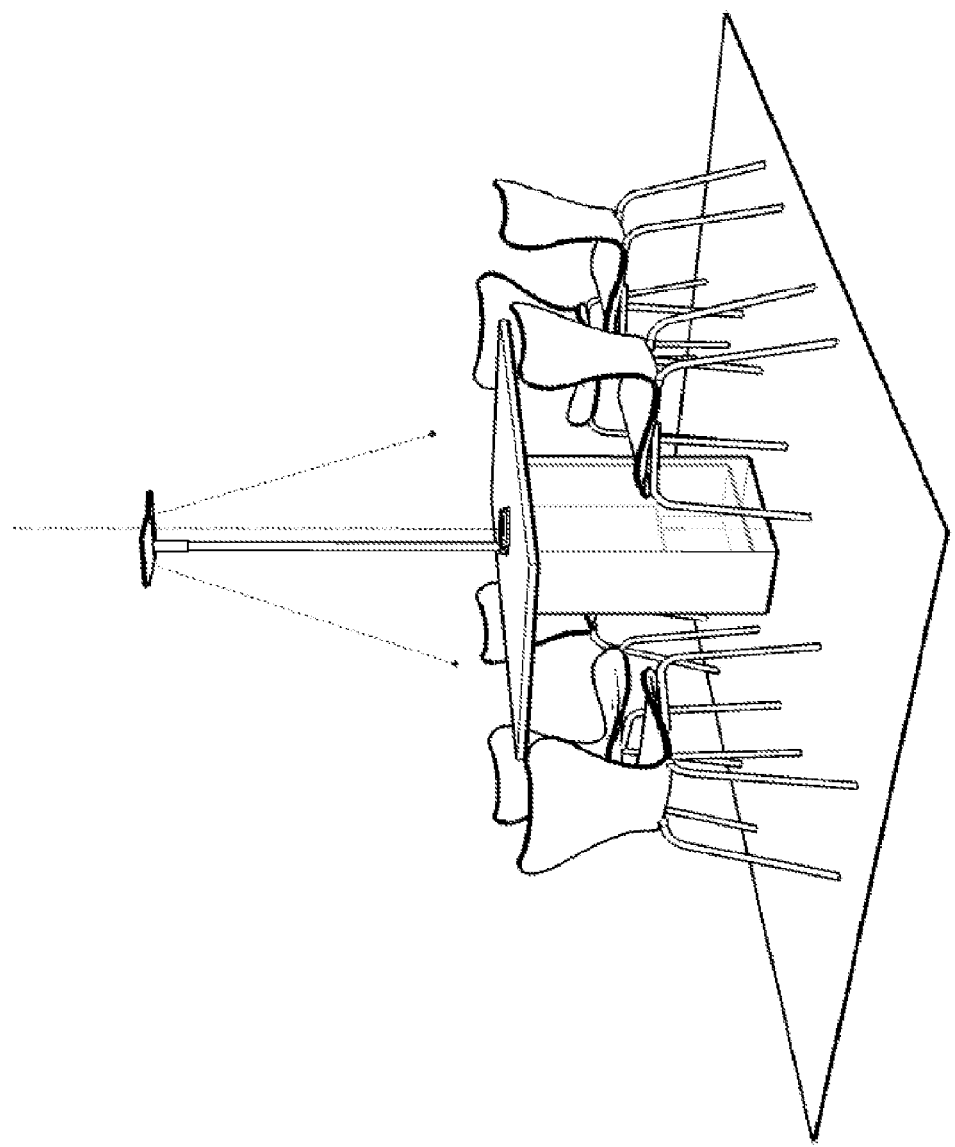
FIG. 22 shows how a mirror may be mounted on a stand rising from the table, so that the combination of projector and table is self contained and semi moveable.

Another configuration or design has a projector mounted in a table; the image is again projected upwards and reflected via a mirror onto table surface. In one example, the mirror is mounted on a stand rising from the table, so that the combination of projector and table is self contained and semi moveable. An example is shown in FIG. 22.

Figure 23:
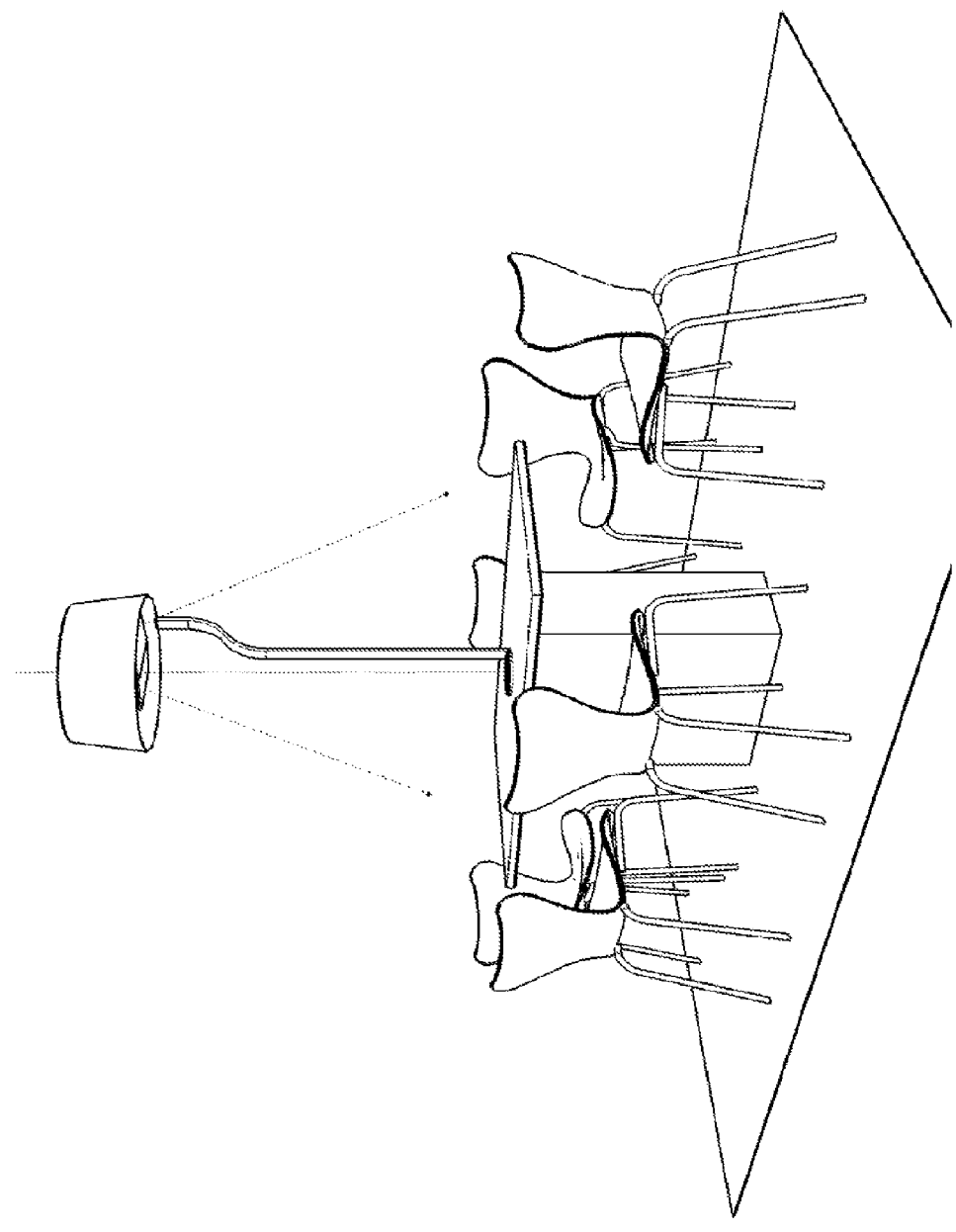
FIG. 23 shows how in the example of FIG. 22, a shade can be placed around the mirror.

In the semi-moveable configuration or design described with reference to FIG. 22, a shade can be placed around the mirror. An example is shown in FIG. 23.

Figure 24:
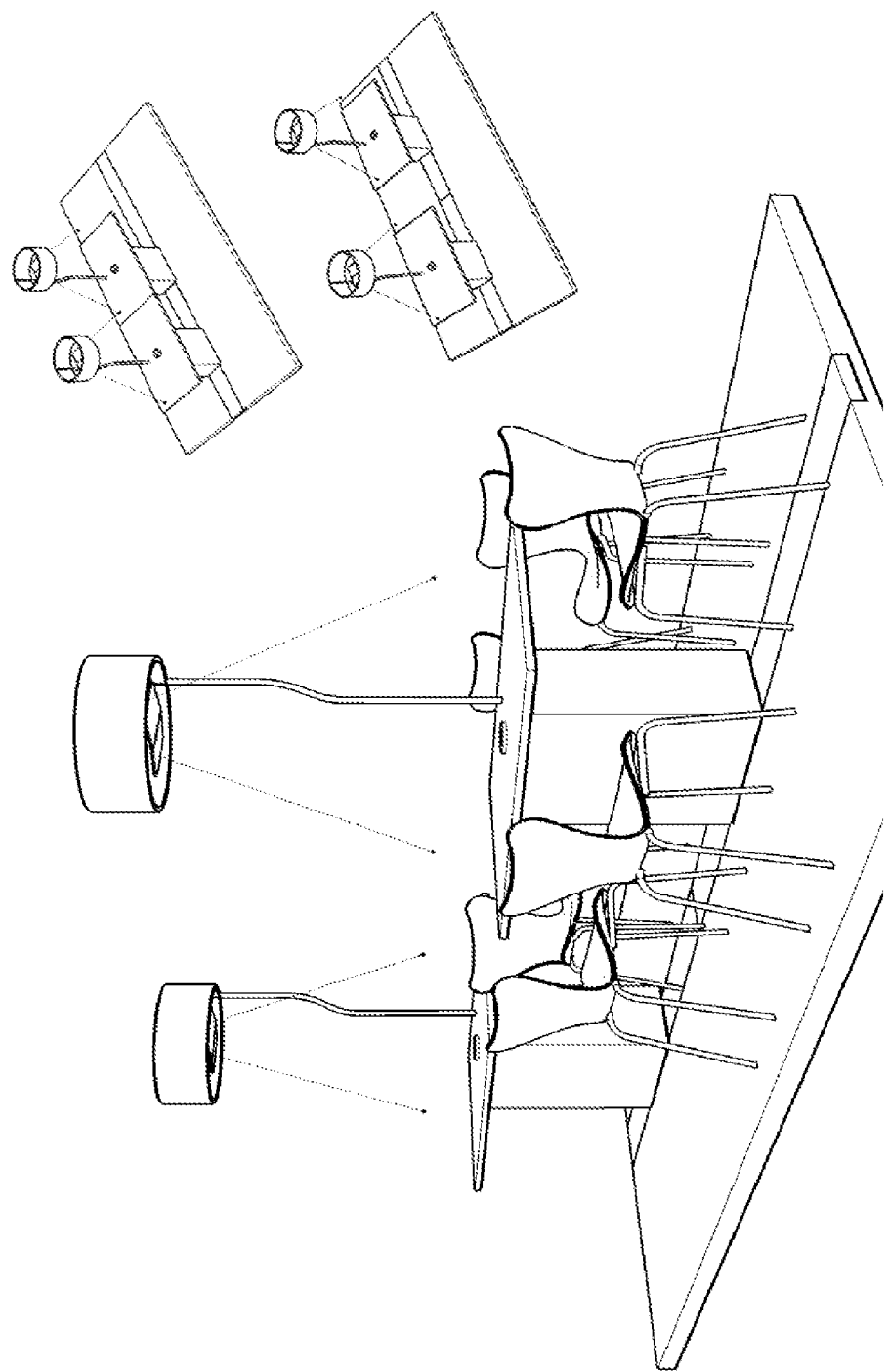
FIG. 24 shows how tables can be moved in a line, when power and data cables are routed through the floor.

Power and data cables can be routed through the floor—no need for any routing through the ceiling. Tables can be moved in a line or can be swivelled. An example is shown in FIG. 24.

Figure 25:
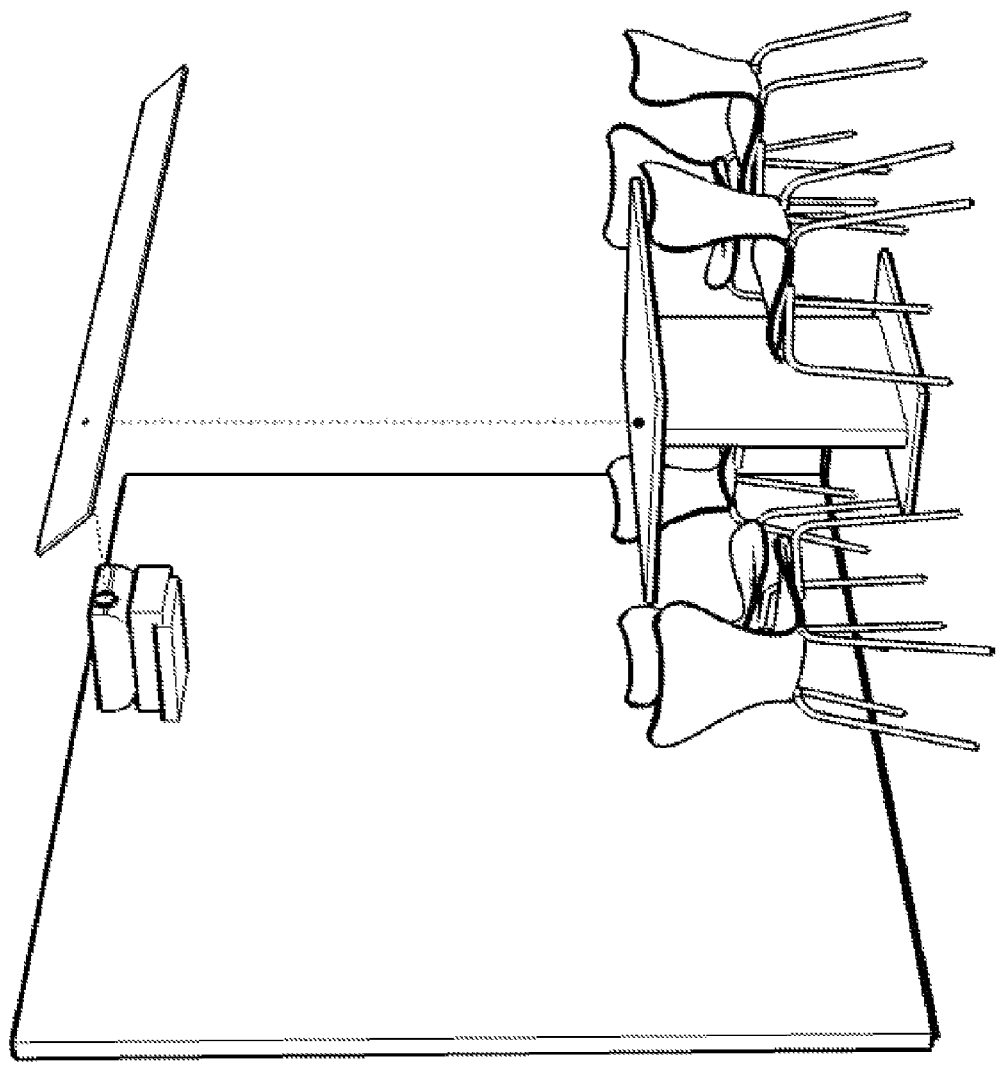
FIG. 25 shows how the projector can be wall mounted; the image is then reflected from the vertical through horizontal via an angled mirror, or series of mirrors, typically mounted or suspended from the ceiling.

The projector can also be wall mounted; the image is then reflected from the vertical through horizontal via an angled mirror, or series of mirrors, typically mounted or suspended from the ceiling. An example is shown in FIG. 25.

Figure 26:
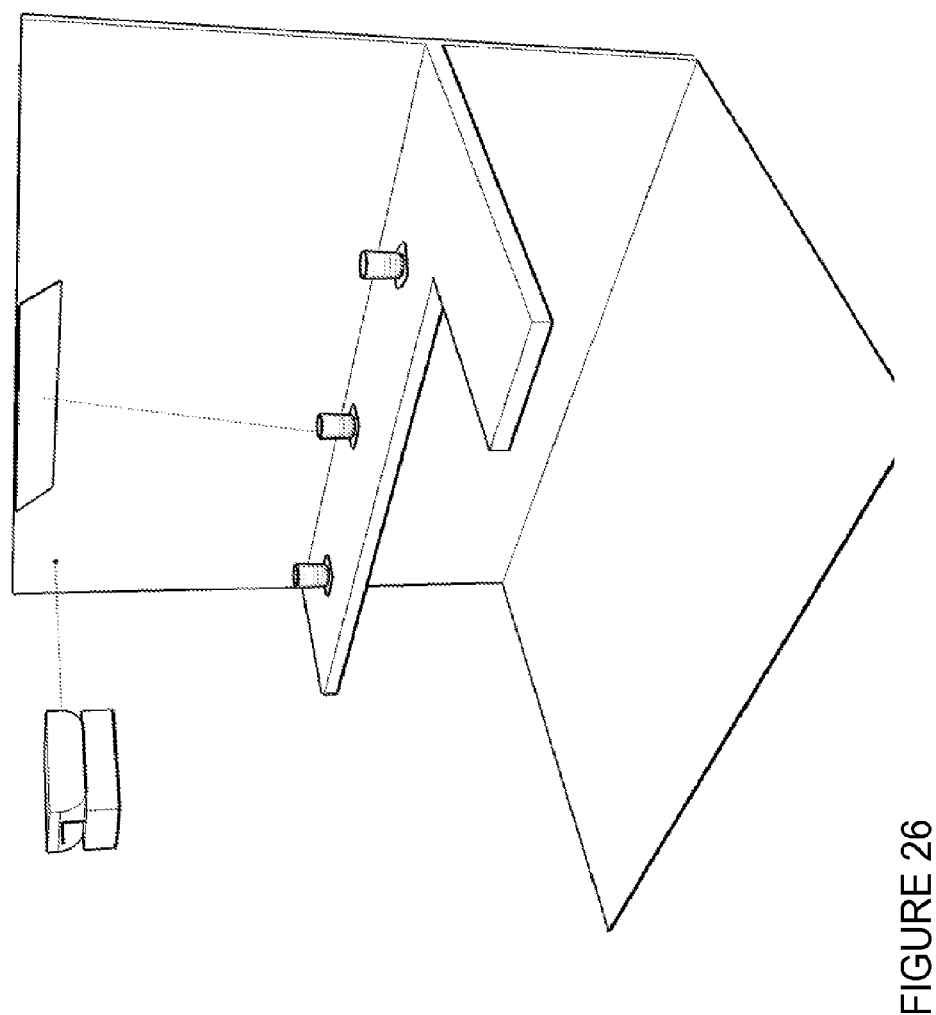
FIG. 26 shows how a wall or ceiling mounted projector can project an image onto a bar top via a mirror.

A wall or ceiling mounted projector can project an image onto a bar top via a mirror. An example is shown in FIG. 26.

Figure 27:
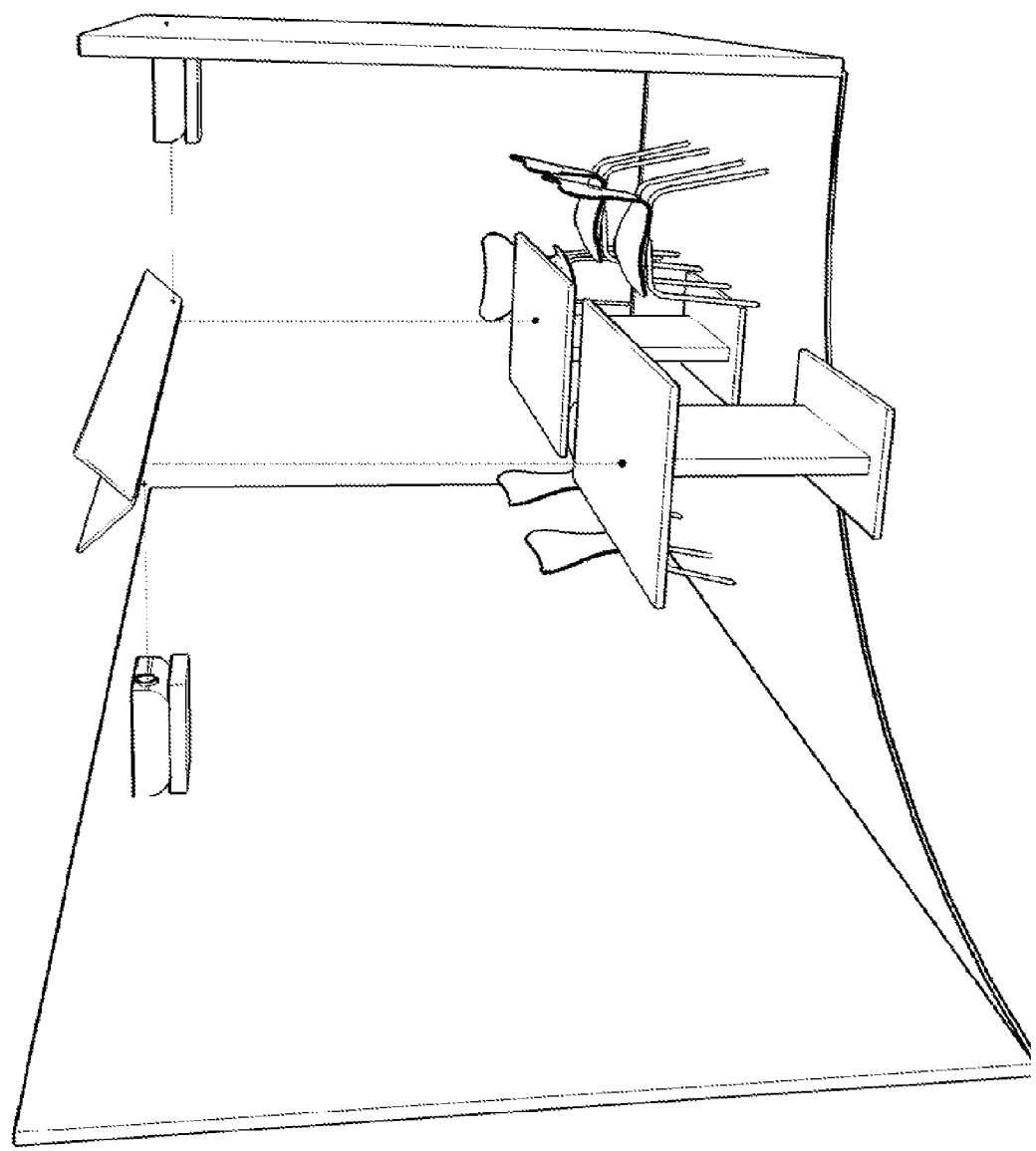
FIG. 27 shows a wall mounted projector system which employs two projectors, each projecting an image onto tables via a dual aspect mirror.

Another wall mounted projector system employs two projectors, each projecting an image onto tables via a dual aspect mirror. An example is shown in FIG. 27.

Figure 28:
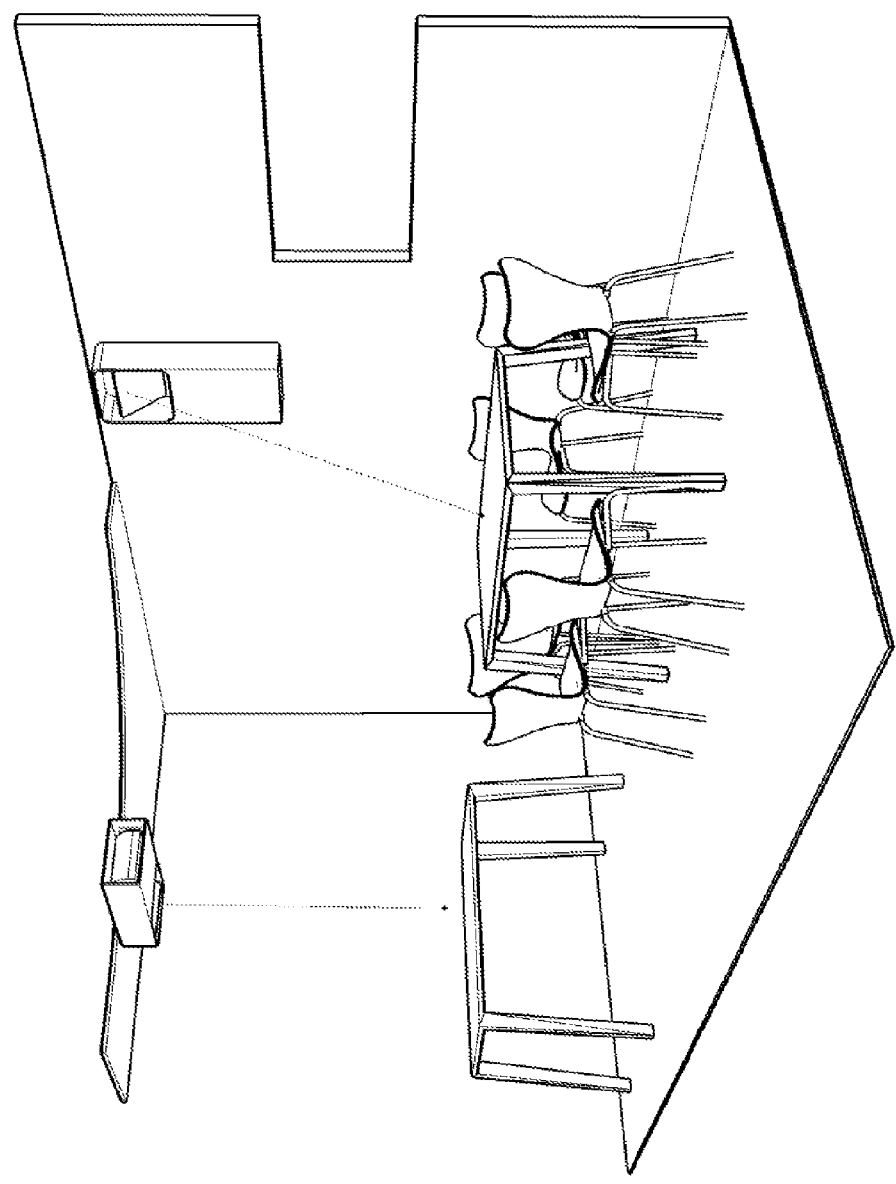
FIG. 28 shows a projector and 45 degree mirror, both combined into a single wall or ceiling mounted unit.

In one example there is provided a projector and 45 degree mirror, both combined into a single wall or ceiling mounted unit. The unit allows multi axis installation. The angle of the mirror can be adjusted to ensure accurate projection. An example is shown in FIG. 28.

Figure 29:
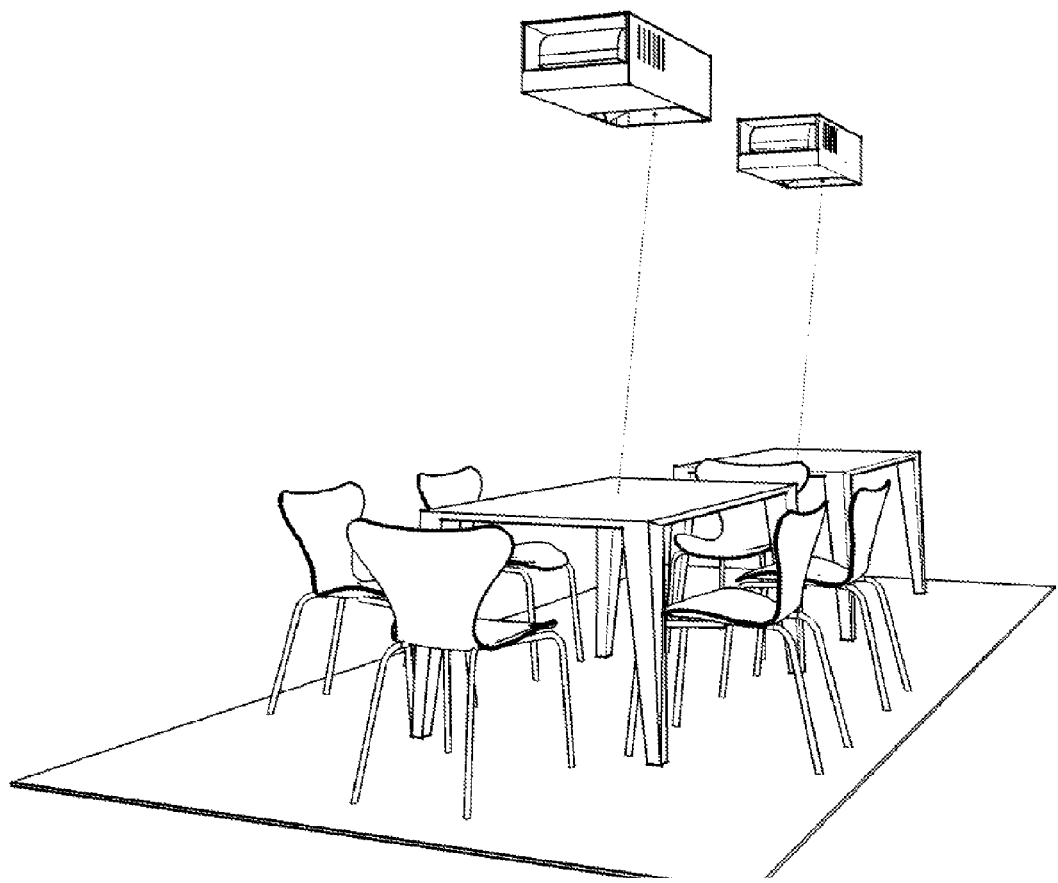
FIG. 29 shows an example of a projector and mirror unit. The angle of incidence on the mirror is approximately 45 degrees. The angle of reflection off the mirror is approximately 45 degrees. Hence the beam is turned through approximately 90 degrees upon reflection from the mirror.

In FIG. 29 there is shown an example of a projector and mirror unit, the configuration being called "45+45 degree". The angle of incidence on the mirror is approximately 45 degrees. The angle of reflection off the mirror is approximately 45 degrees. Hence the beam is turned through approximately 90 degrees upon reflection from the mirror, as shown in FIG. 29.

Figure 30:
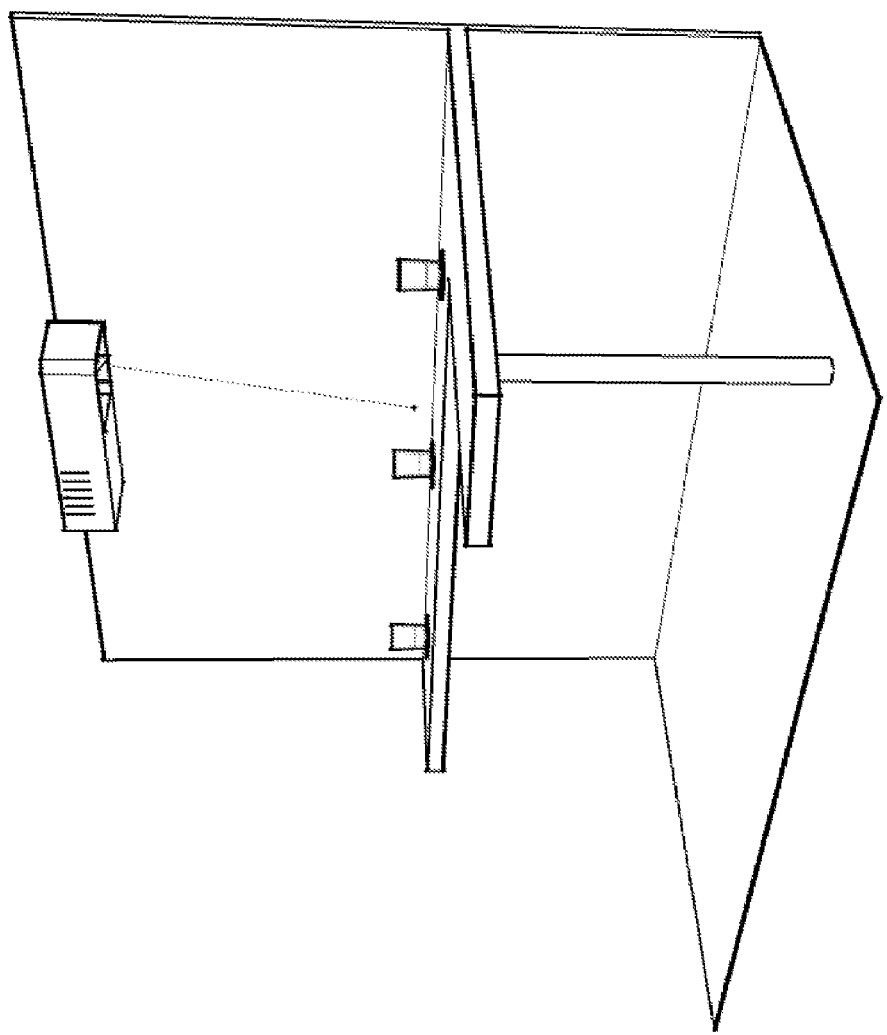
FIG. 30 shows an example of a wall mounted projector and mirror unit.

In FIG. 30 there is shown an example of a wall mounted projector and mirror unit, with a "45+45 degree" configuration.

Figure 31:
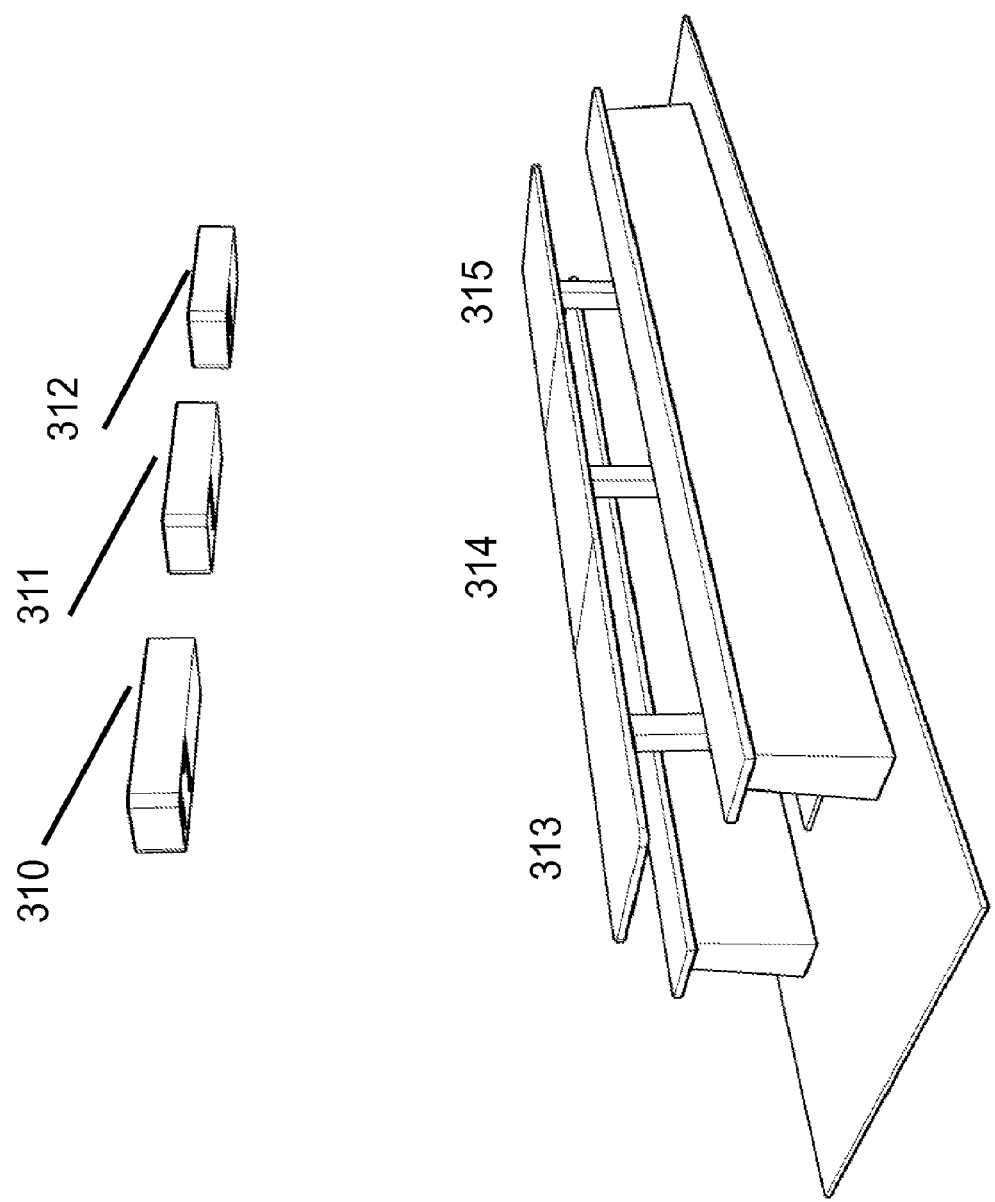
FIG. 31 illustrates three 16:9 aspect ratio projectors 310, 311, 312 over three tables 313, 314, 315.

Table division is possible: the example of FIG. 31 illustrates three 16:9 aspect ratio projectors 310, 311, 312 over three tables 313, 314, 315. These give complete seamless table projection for a multiperson party over the three tables. A single PC can control all three projectors.

Figure 32:
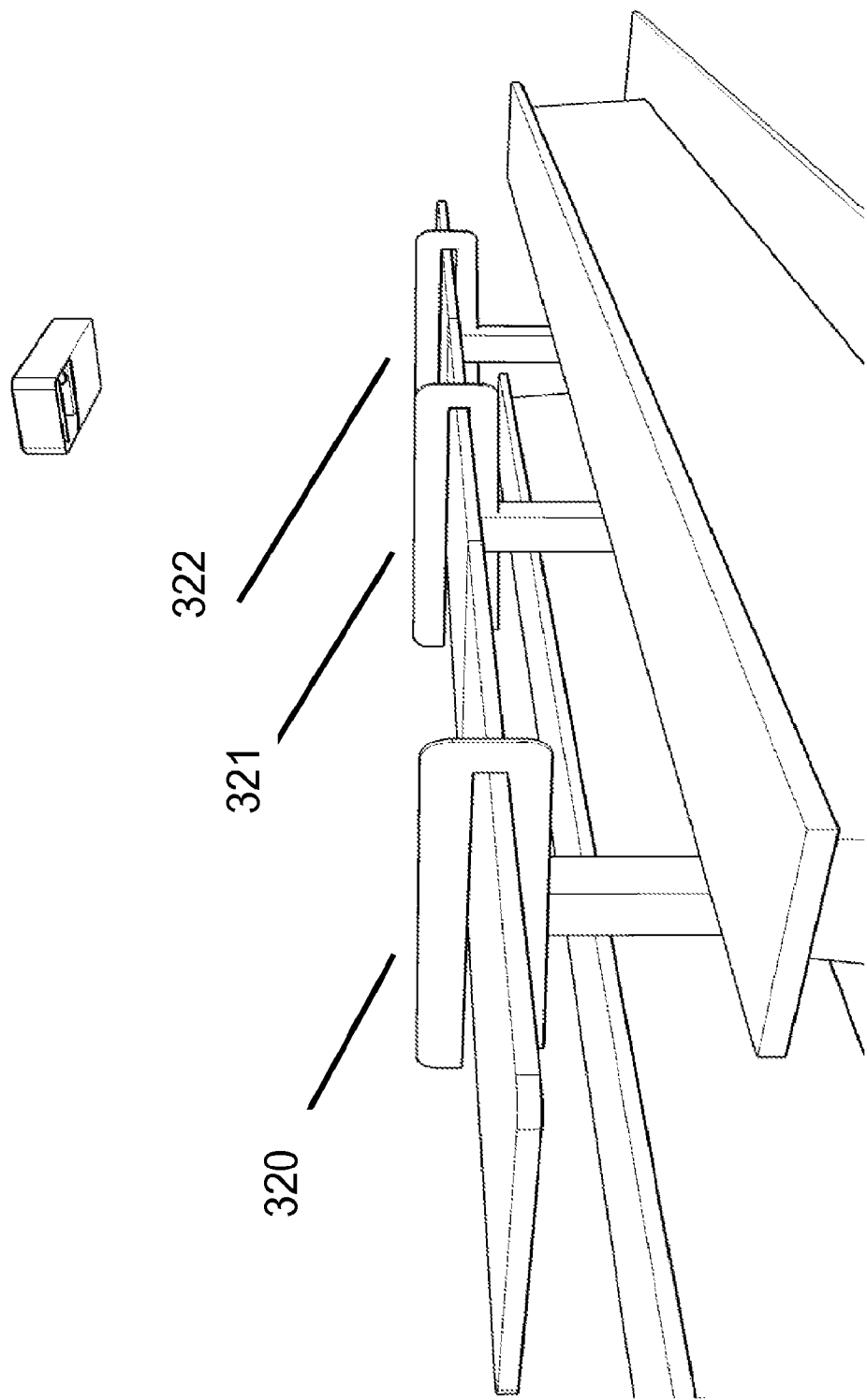
FIG. 32 shows how table division is possible with moveable physical dividers, for table dividers 320, 321, 322.

Table division is possible with movable physical dividers. The table dividers are recognized by the image recognition system; this can be facilitated by placing high contrast, strong edge images on the top of each divider, such as 2D barcodes. An example is shown in FIG. 32, for table dividers 320, 321, 322.

Figure 33:
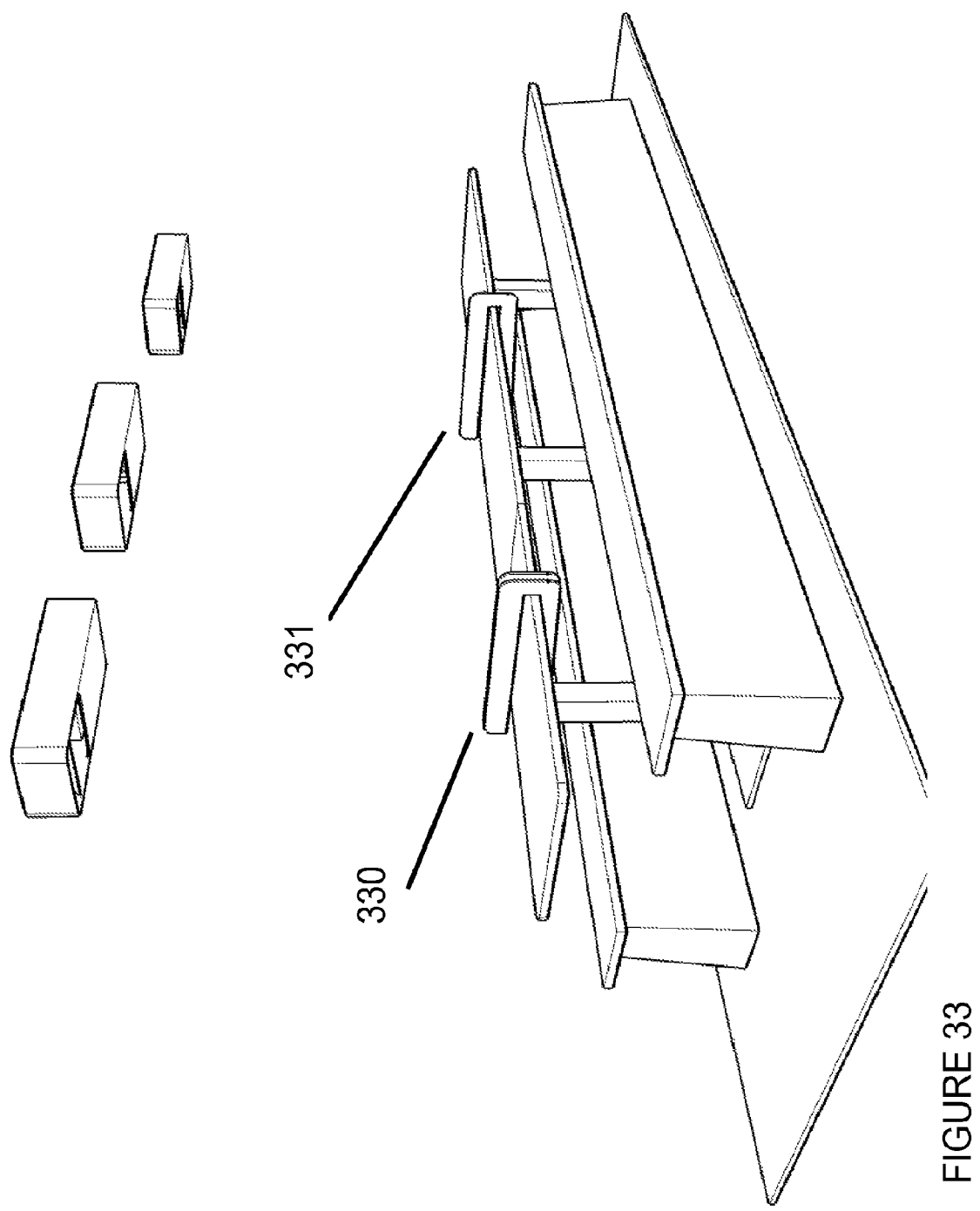
FIG. 33 shows an example of three individual groups seated as 3×4 persons, with dividers 330 and 331 present.

Table division dividers can be added to segment a table. FIG. 33 shows an example of three individual groups seated as 3×4 persons, with dividers 330 and 331 present.

Figure 34:
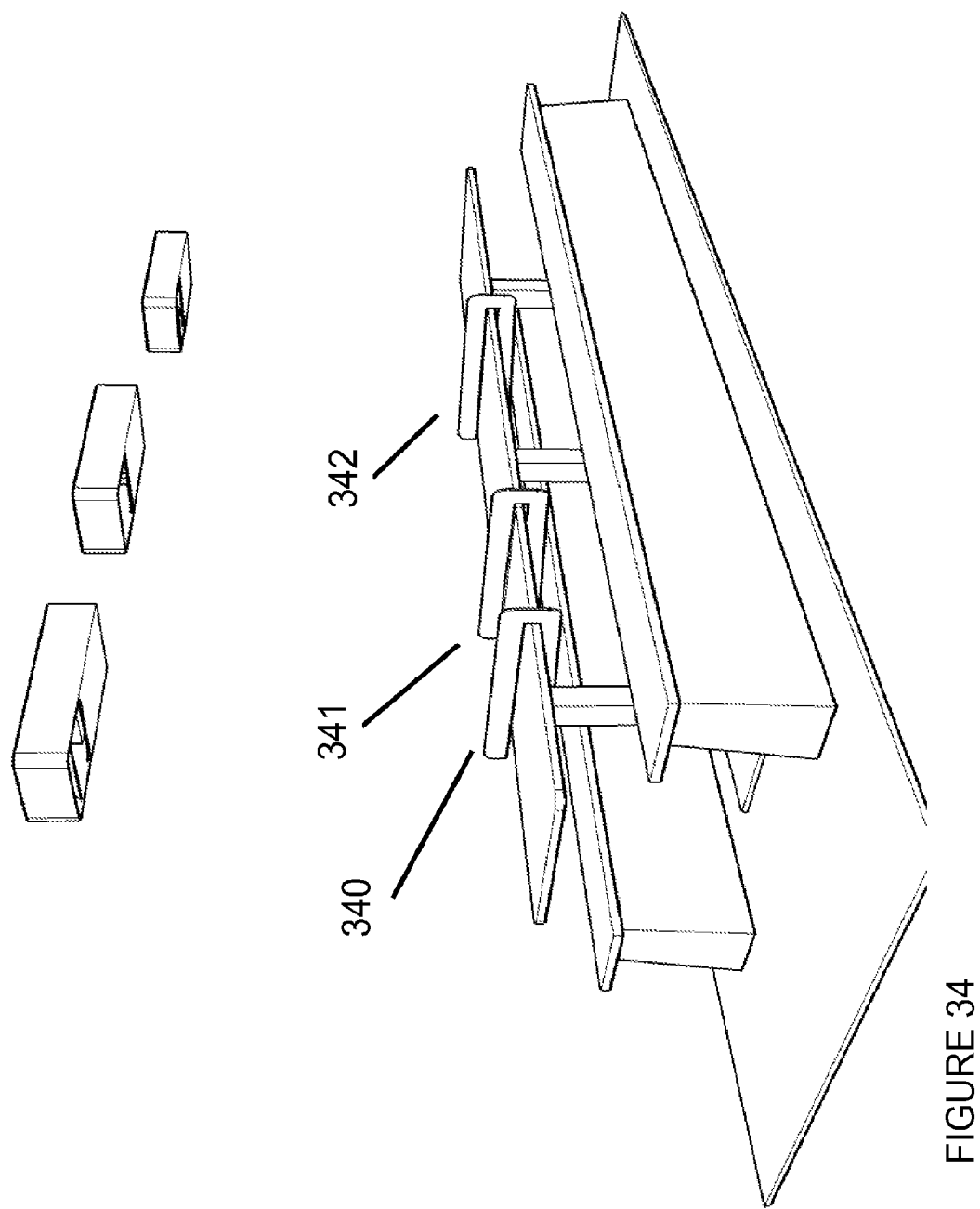
FIG. 34 shows how adjacent table sections can have entirely different images; billing is attributed to each section separately. The example is shown for dividers 340, 341, 342.

The position of each of the table dividers can be moved to give complete flexibility in seating arrangements. The projectors can respond automatically if web cameras or some other kind of system that can cause the projectors to project different images in the different table sections are used. Hence, adjacent table sections can have entirely different images; billing is attributed to each section separately. An example is shown in FIG. 34, for dividers 340, 341, 342.

Figure 35:
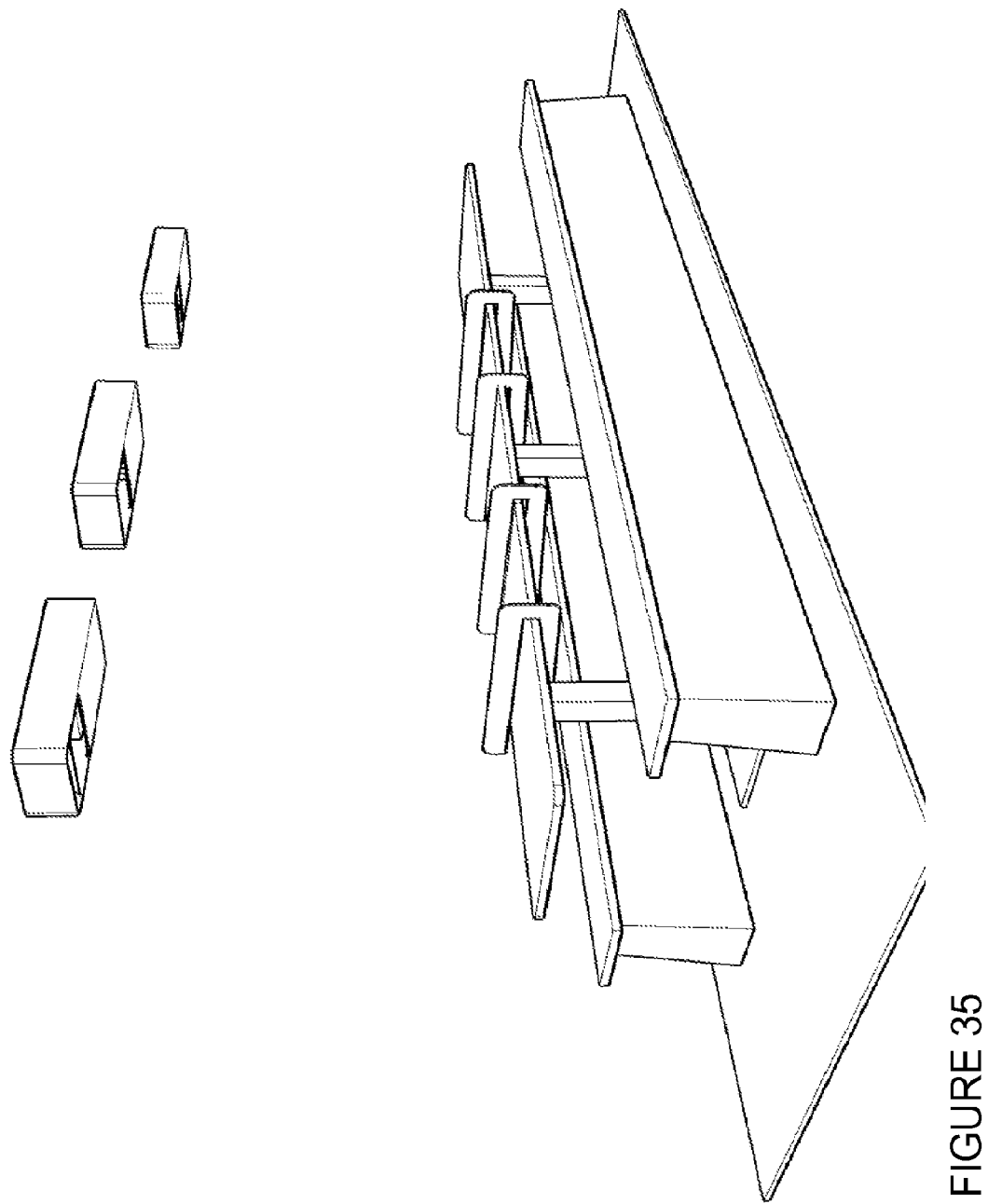
FIG. 35 shows that complete flexibility in table division is possible.

Complete flexibility in table division is possible. An example is shown in FIG. 35.

Figure 36:
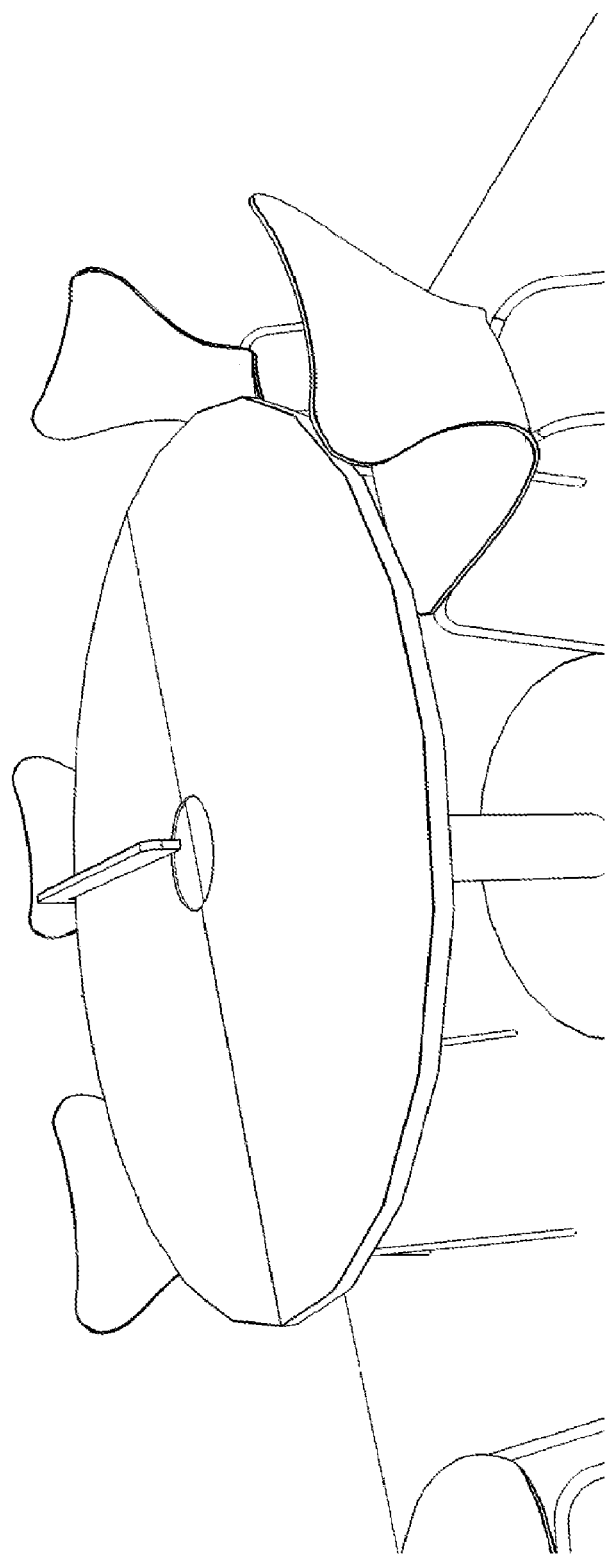
FIG. 36 shows for a circular table, a radial arm can be used as a divider.

Table division is possible for table shapes other than rectangular. For a circular table, a radial arm can be used as a divider. An example is shown in FIG. 36.

Figure 37:
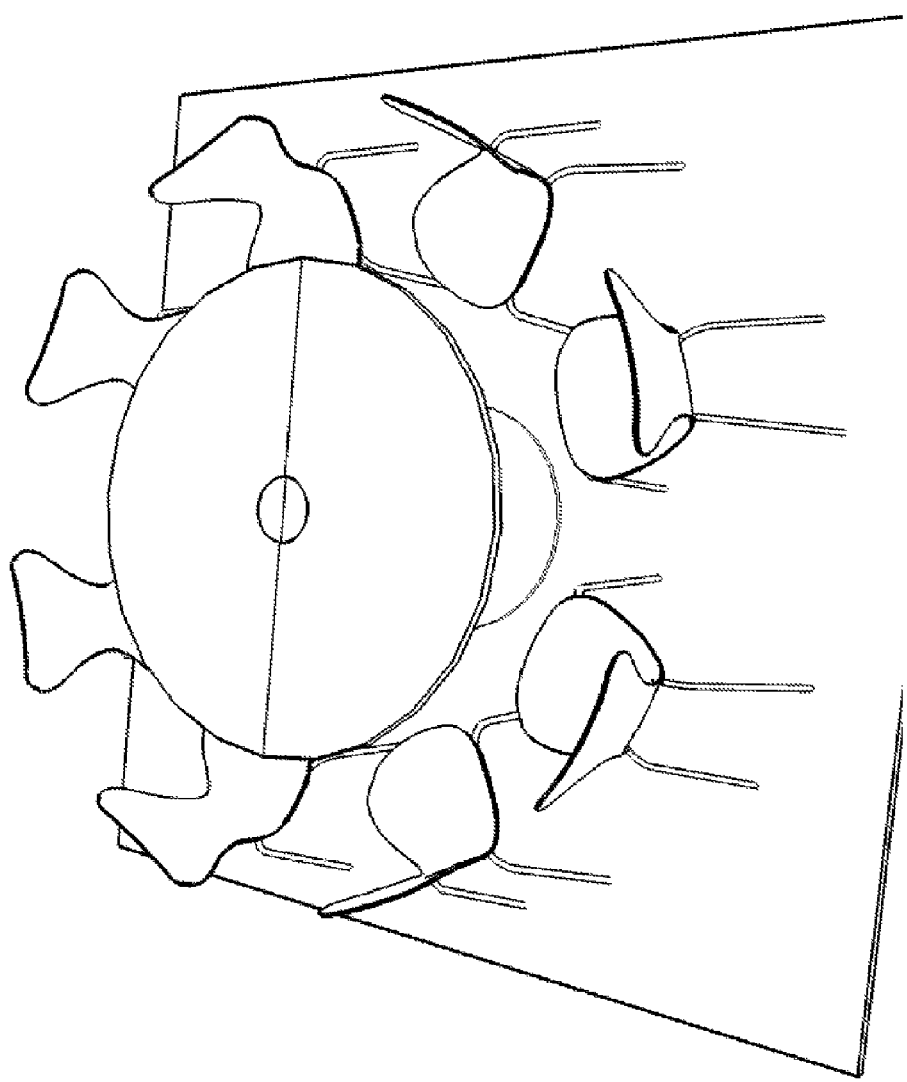
FIG. 37 shows an example of how a party of eight can be seated around a single table.

FIG. 37 shows an example of how a party of eight can be seated around a single table.

Figure 38:
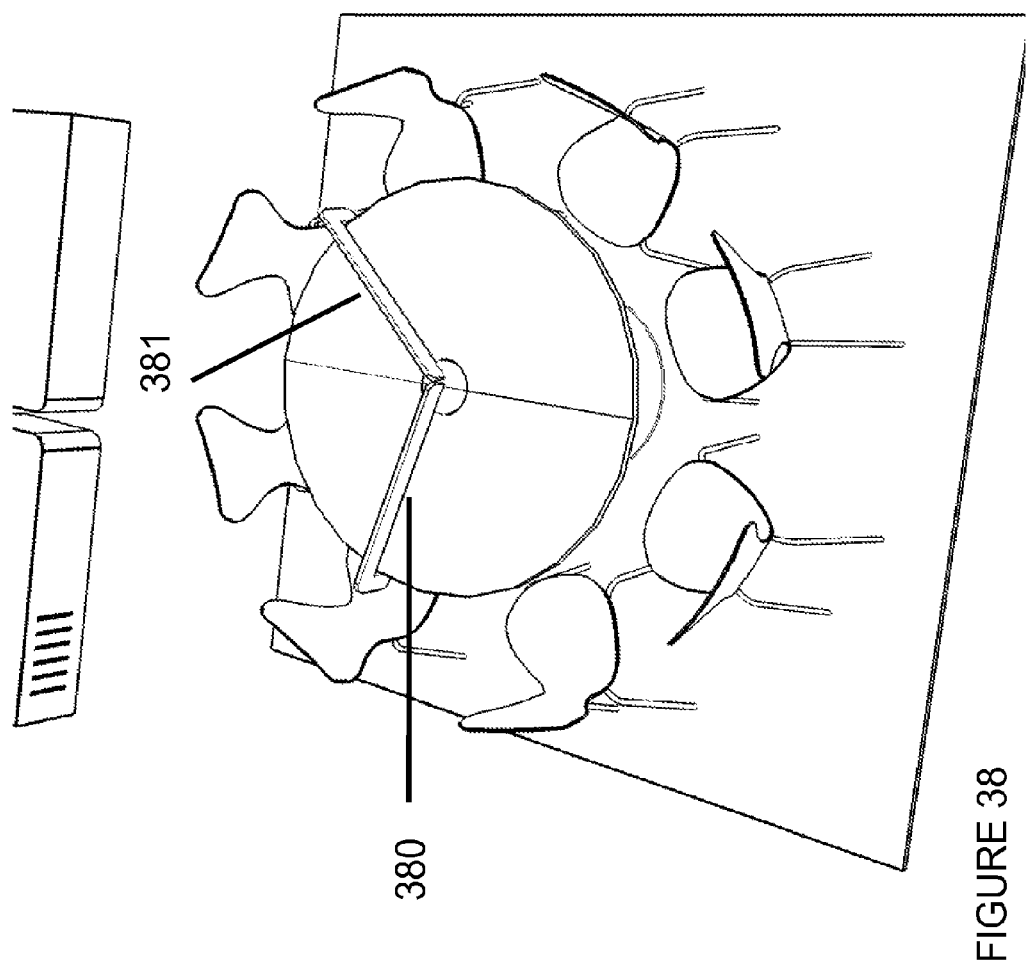
FIG. 38 shows an example of how dividers 380, 381 can be added to the example of FIG. 37 to segment the table—here to give a group of three diners their own individual section.

FIG. 38 shows an example of how dividers 380, 381 can be added to the example of FIG. 37 to segment the table—here to give a group of three diners their own individual section. The radial dividers can be placed in any arrangement around the table. This permits maximum utilization of table space.

Figure 39:
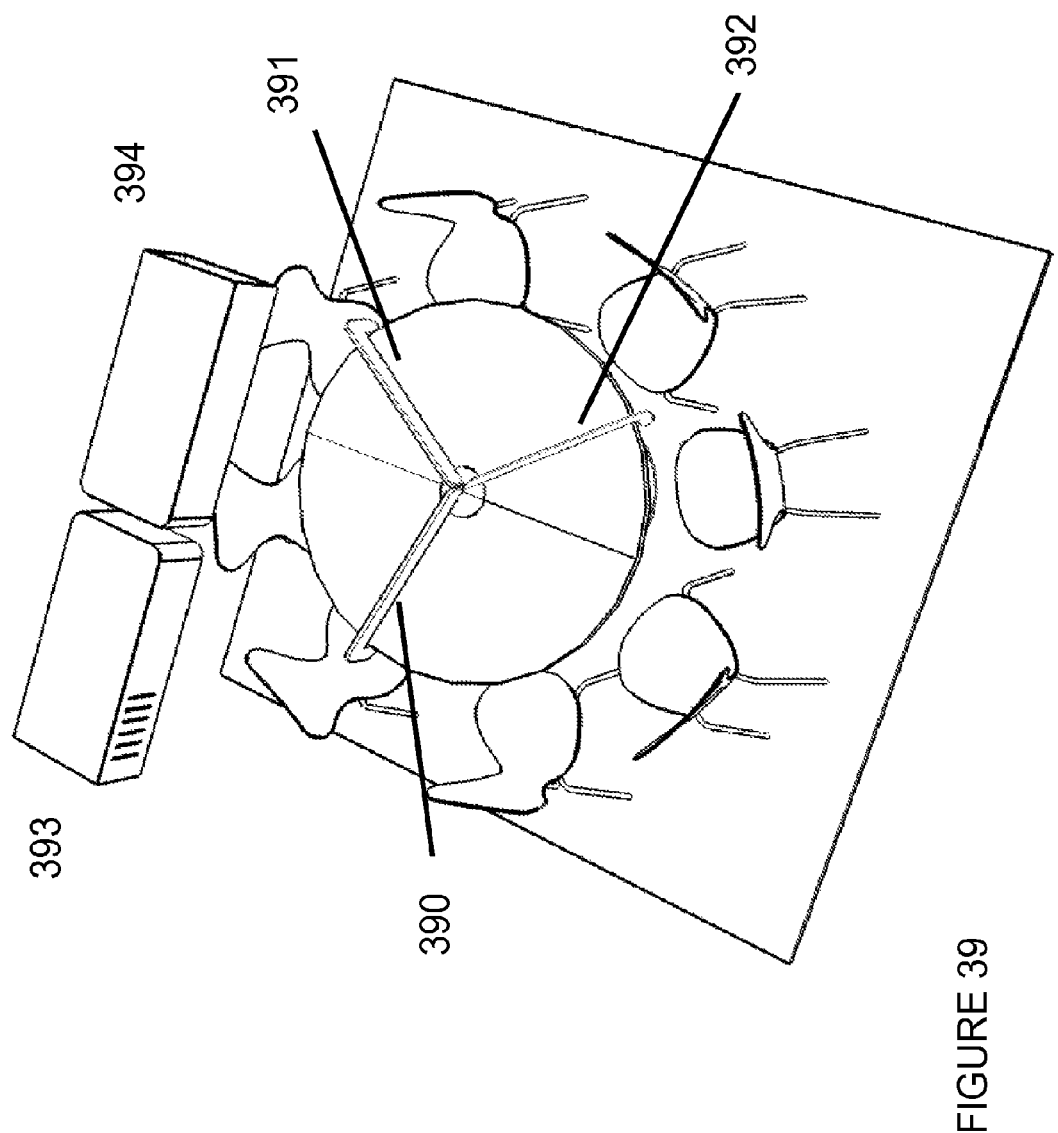
FIG. 39 shows how two projectors 393, 394 can be used to give complete projection coverage over the circular table.

In an example shown in FIG. 39, two projectors 393, 394 can be used to give complete projection coverage over the circular table. Here, we have one group of three (between dividers 390 and 391) and another group of two (between dividers 391 and 392), formed using dividers 390, 391 and 392.

Figure 40:
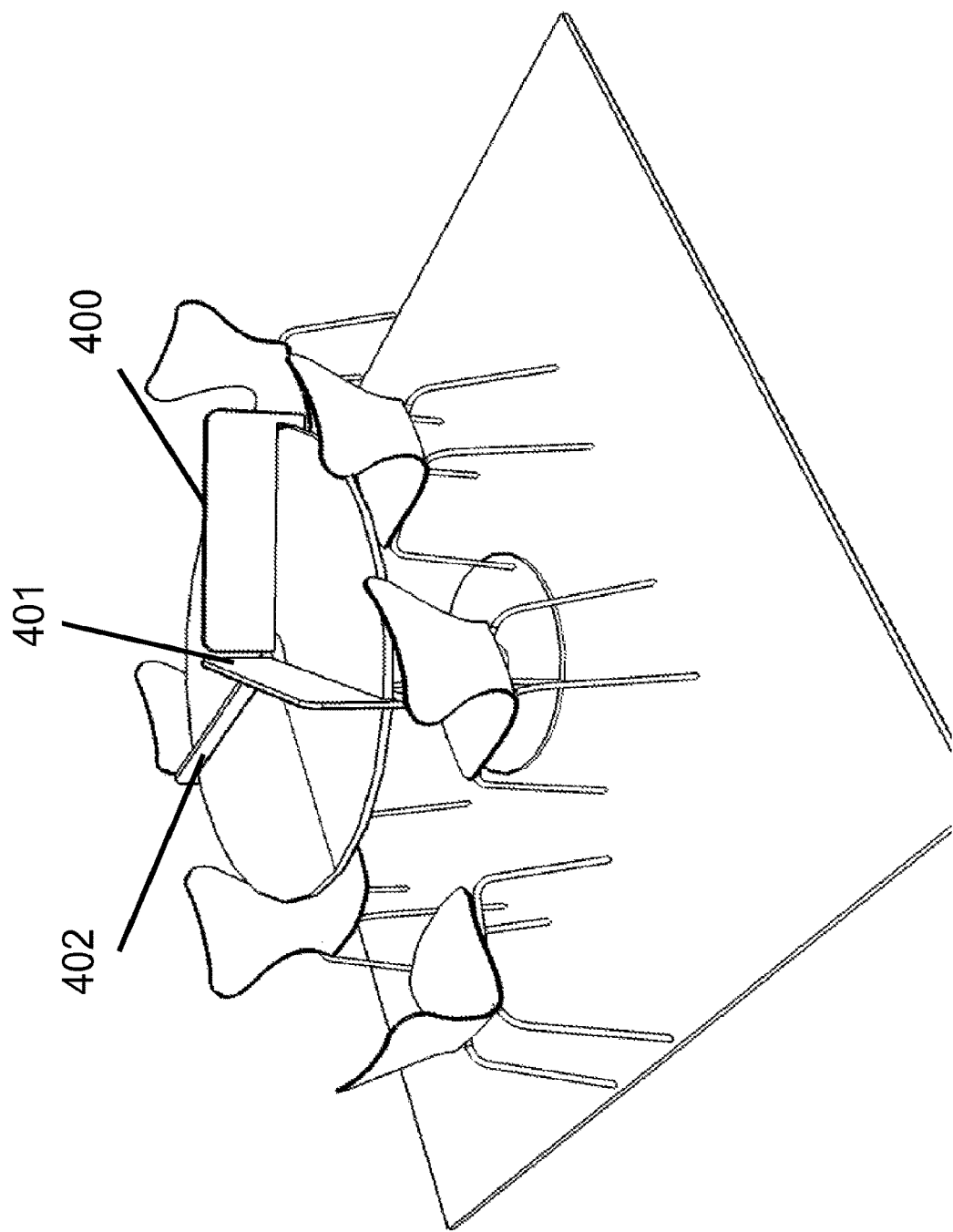
FIG. 40 shows an example of high dividers 400, 401 and a low divider 402 for a circular table.

Table dividers can be either very low, or substantially higher to act as privacy dividers. FIG. 40 shows an example of high dividers 400, 401 and a low divider 402.

Figure 41:
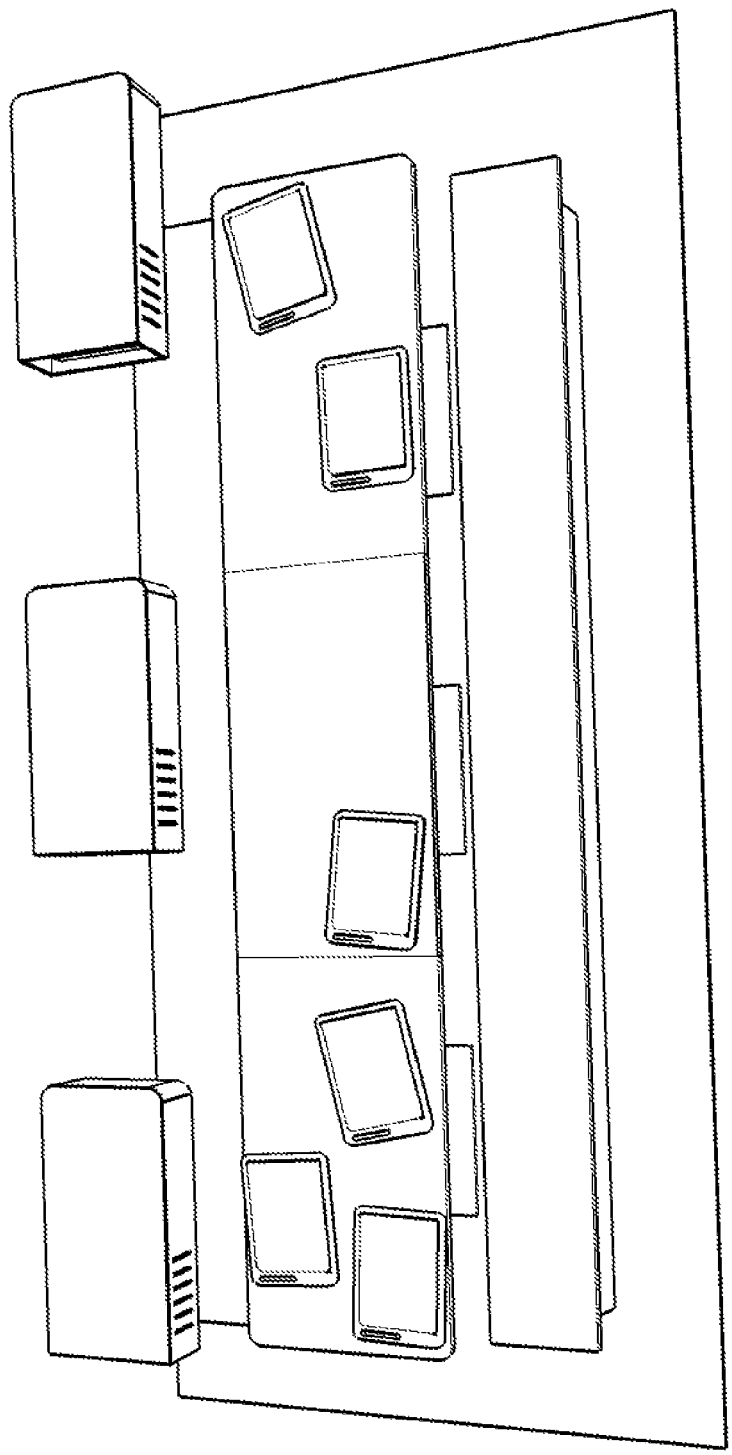
FIG. 41 shows how table division can use individual trays.

Table division can use individual trays: the trays are recognized by a camera and the menu images are projected into the trays. When a group of diners come to be seated, they are each given a tray; all trays for a particular group of diners are associated together. An example is shown in FIG. 41.

Figure 42:
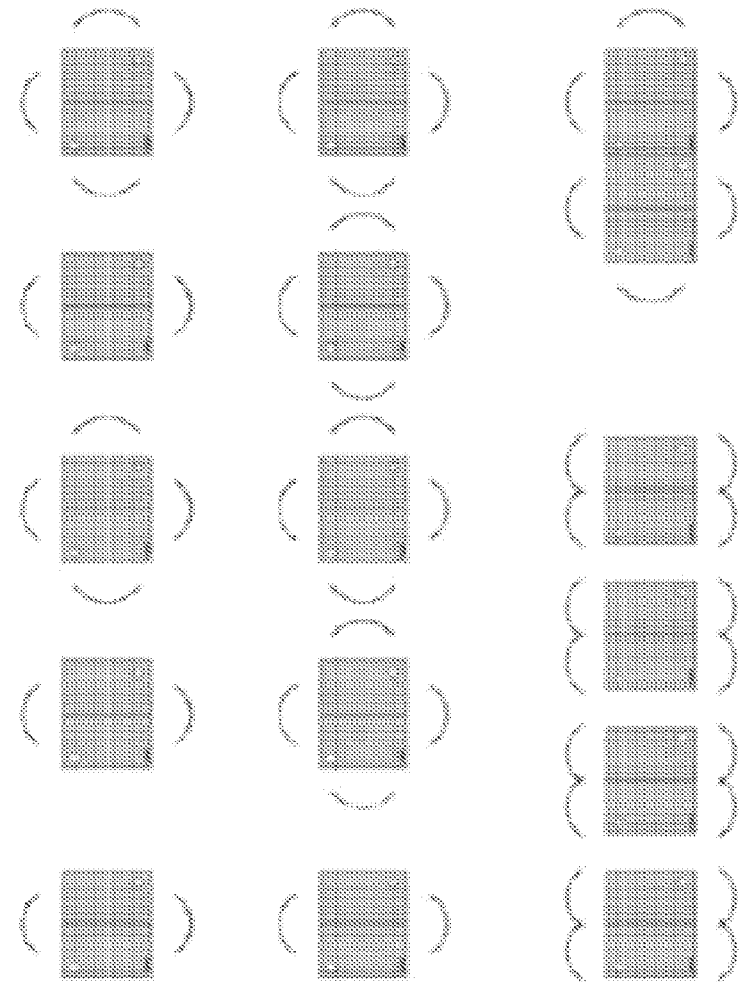
FIG. 42 shows how projectors with 4:3 aspect ratio layouts can be used to illuminate various tables.

The schematic of FIG. 42 shows how projectors with 4:3 aspect ratio layouts can be used to illuminate various tables.

Figure 43:
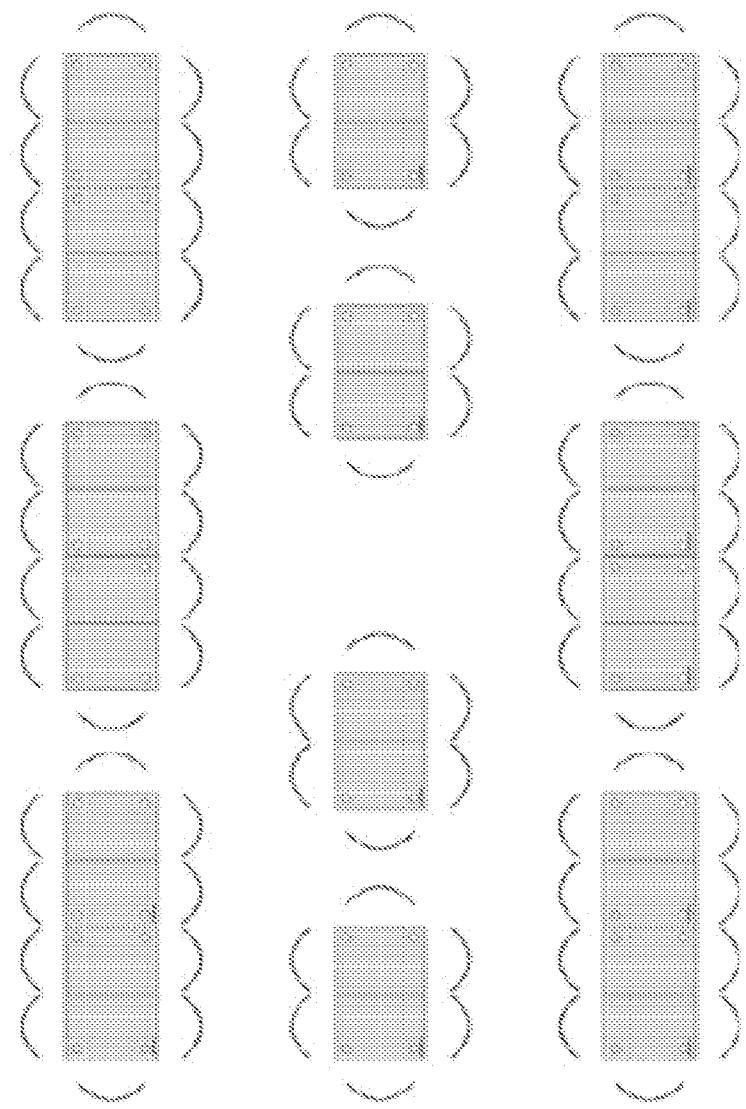
FIG. 43 shows how projectors with 16:10 aspect ratio layouts can be used to illuminate various tables.

The schematic of FIG. 43 shows how projectors with 16:10 aspect ratio layouts can be used to illuminate various tables.

Figure 44:
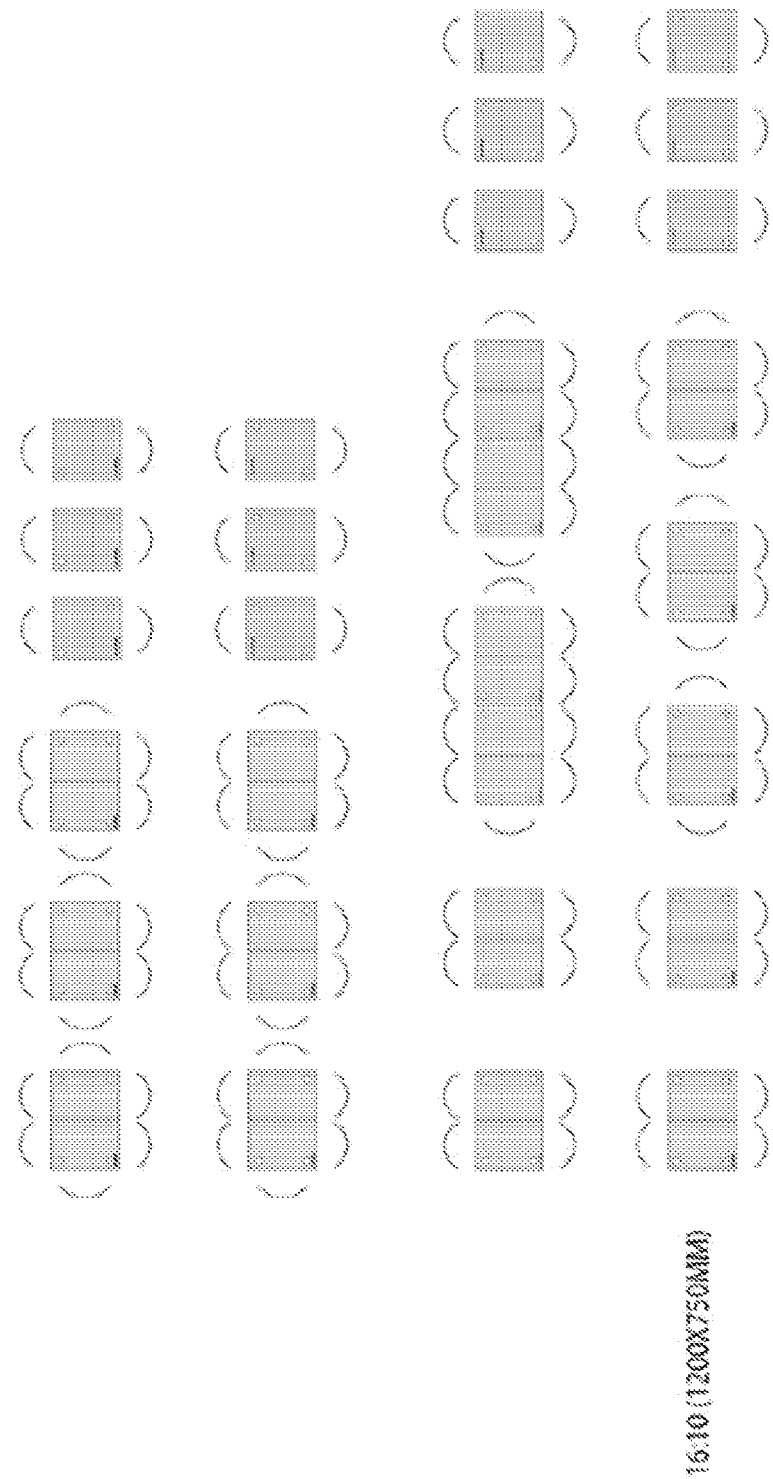
FIG. 44 shows how projectors with 16:10 aspect ratio layouts can be used to illuminate various tables.

The schematic of FIG. 44 shows how projectors with 16:10 aspect ratio layouts can be used to illuminate various tables.

Figure 45:
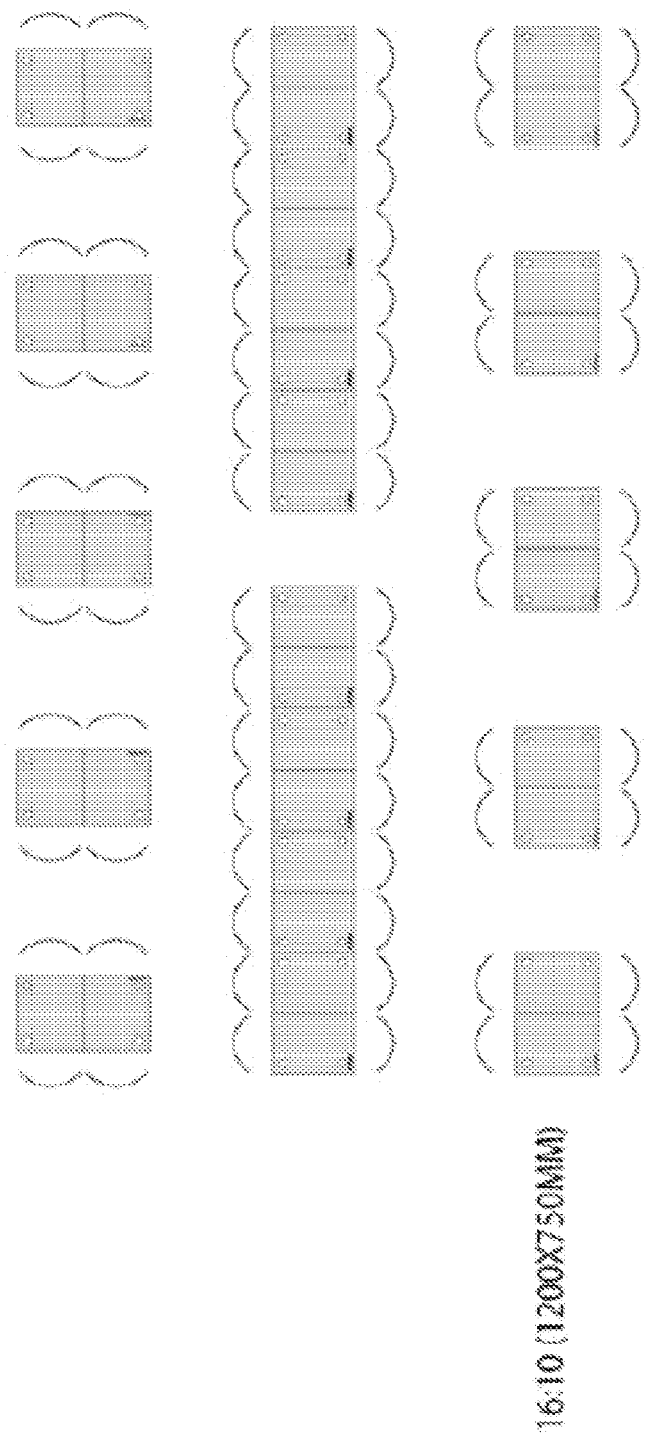
FIG. 45 shows how projectors with 16:10 aspect ratio layouts can be used to illuminate various tables.

The schematic of FIG. 45 shows how projectors with 16:10 aspect ratio layouts can be used to illuminate various tables.

Figure 46:
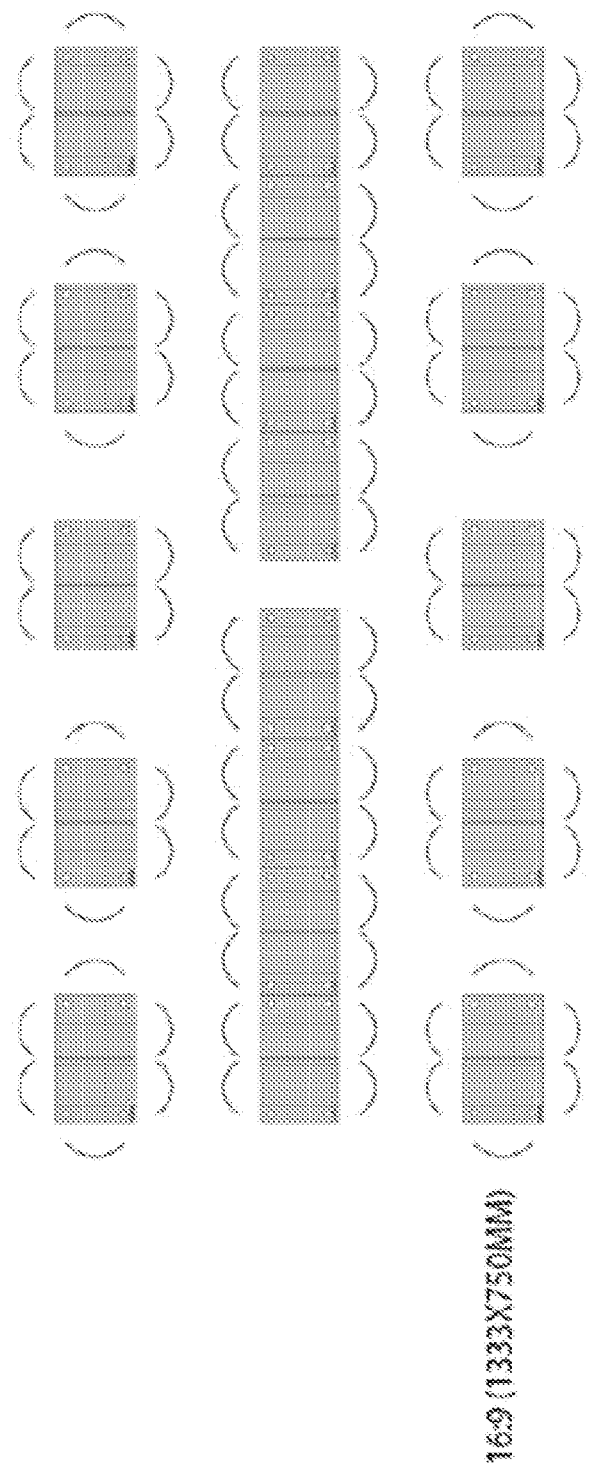
FIG. 46 shows how projectors with 16:9 aspect ratio layouts can be used to illuminate various tables.

The schematic of FIG. 46 shows how projectors with 16:9 aspect ratio layouts can be used to illuminate various tables.

Figure 47:
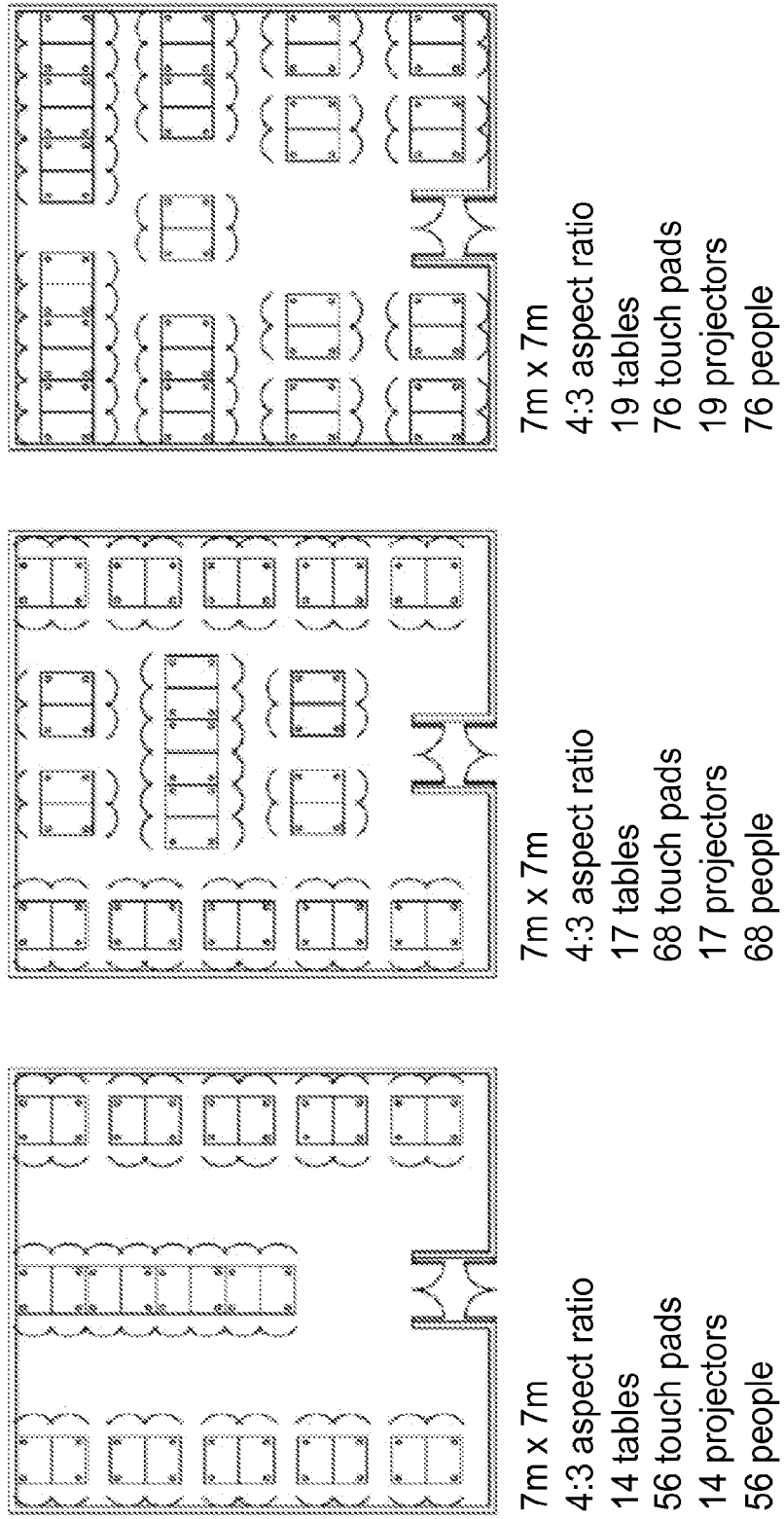
FIG. 47 shows examples of table layout which provide 7 m×7 m room yield, for a 4:3 projection aspect ratio.

FIG. 47 shows examples of table layout which provide 7 m×7 m room yield, for a 4:3 projection aspect ratio.

Figure 48:
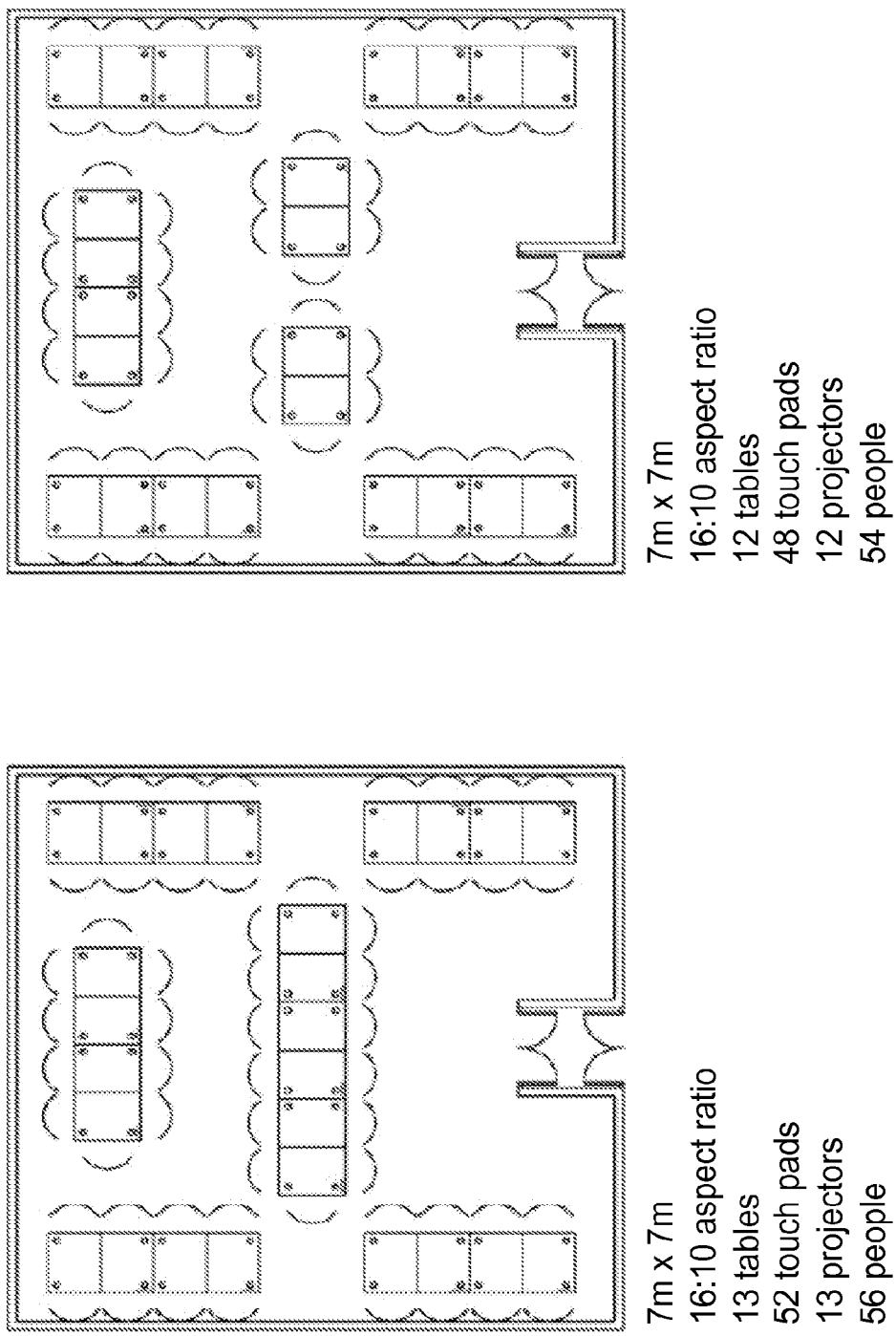
FIG. 48 shows examples of table layout which provide 7 m×7 m room yield, for a 16:10 projection aspect ratio.

FIG. 48 shows examples of table layout which provide 7 m×7 m room yield, for a 16:10 projection aspect ratio.

Figure 49:
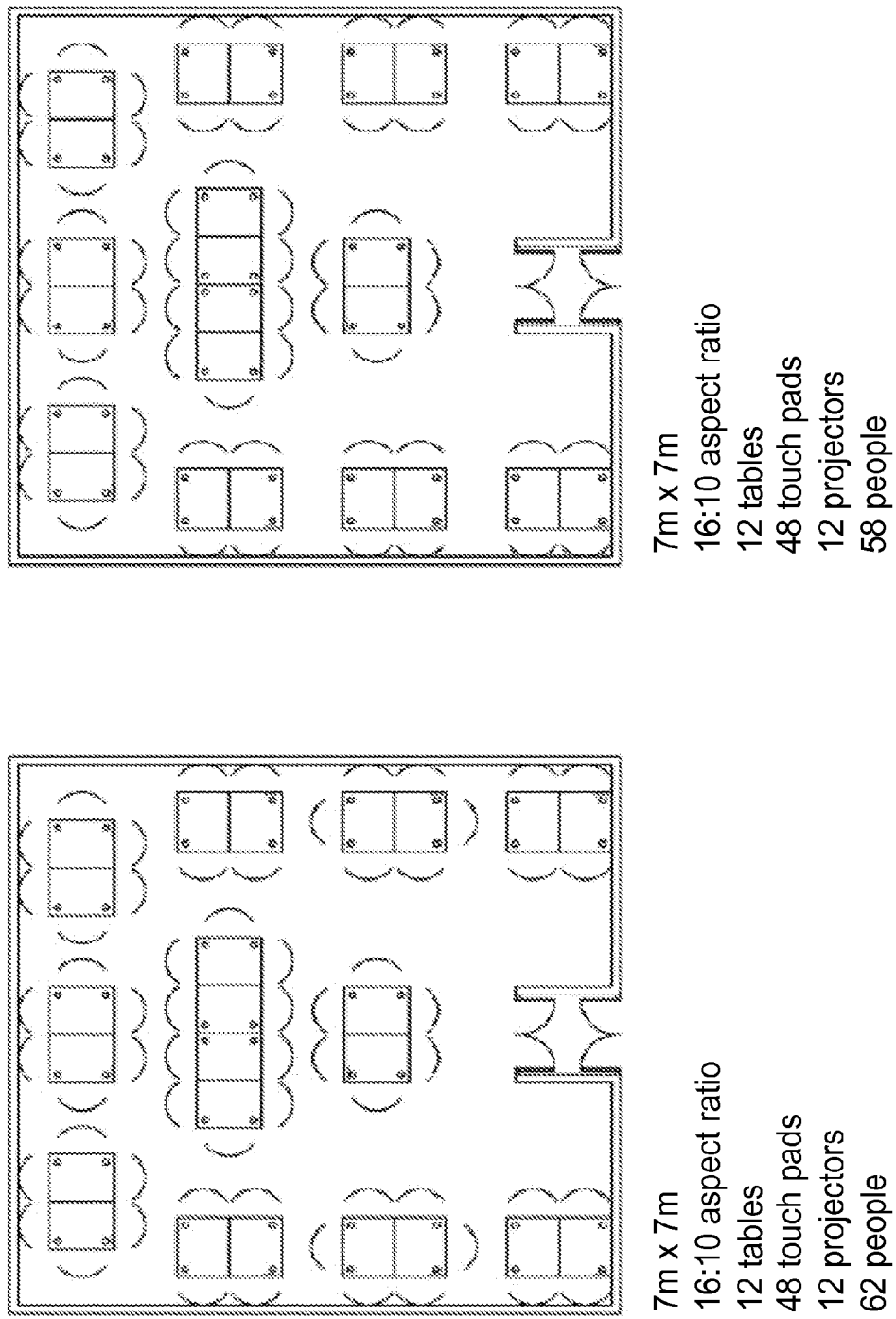
FIG. 49 shows examples of table layout which provide 7 m×7 m room yield, for a 16:10 projection aspect ratio.

FIG. 49 shows examples of table layout which provide 7 m×7 m room yield, for a 16:10 projection aspect ratio.

Figure 50:
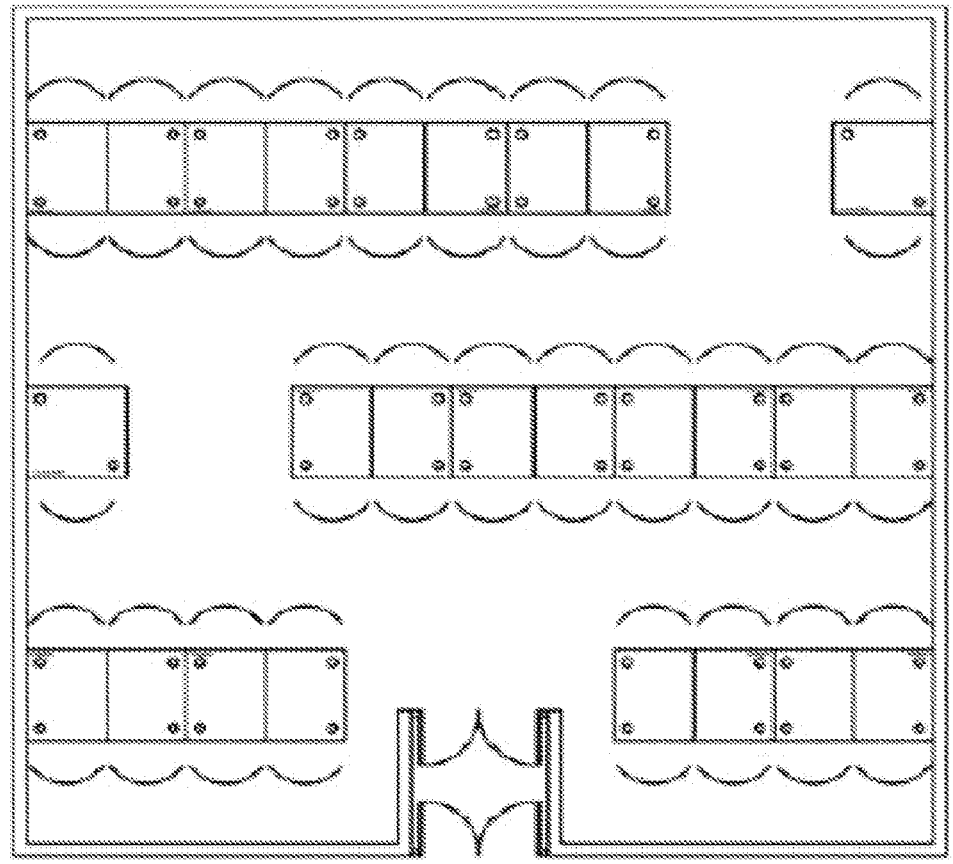
FIG. 50 shows an example of a table layout which provides 7 m×7 m room yield, for a 16:10 projection aspect ratio.

FIG. 50 shows an example of a table layout which provides 7 m×7 m room yield, for a 16:10 projection aspect ratio.

Figure 51:
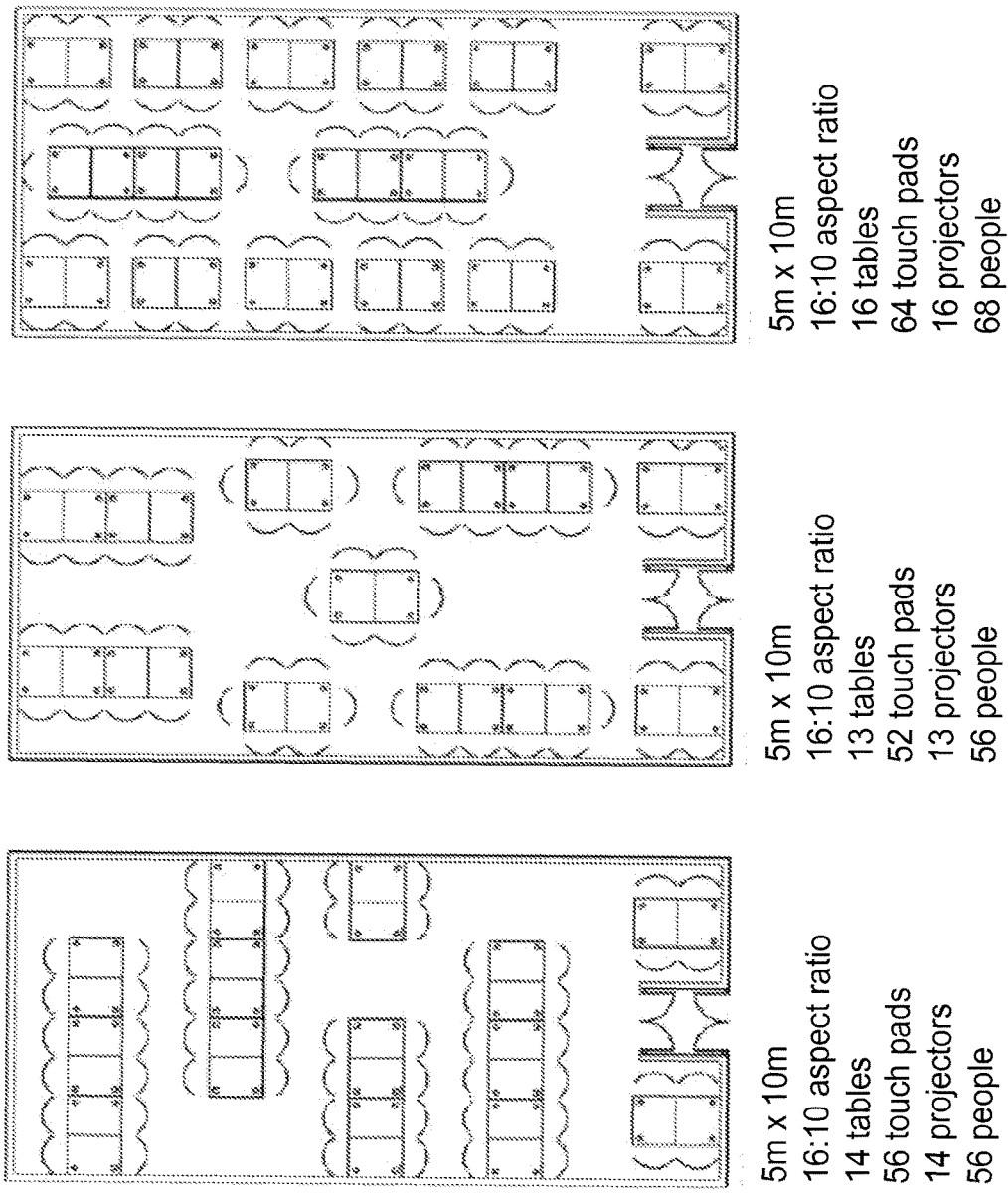
FIG. 51 shows examples of table layout which provide 10 m×5 m room yield, for a 16:10 projection aspect ratio.

FIG. 51 shows examples of table layout which provide 10 m×5 m room yield, for a 16:10 projection aspect ratio.

Figure 52C:
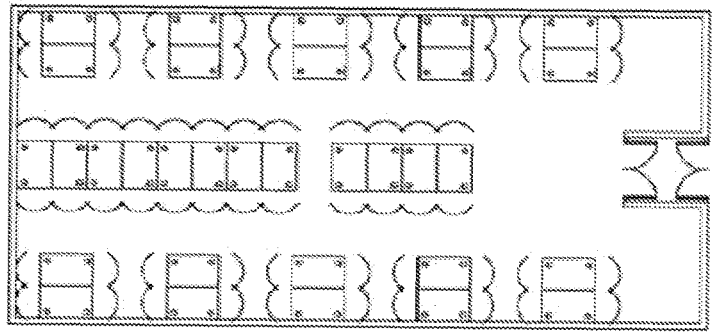
FIG. 52C shows an example of a table layout which provides 10 m×5 m room yield, for a 4:3 projection aspect ratio.
Figure 52B:
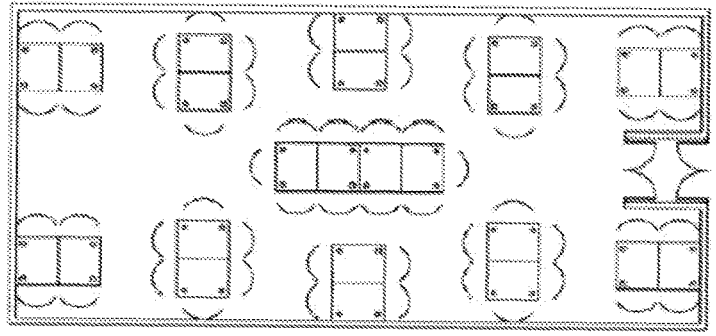
FIG. 52B shows an example of a table layout which provides 10 m×5 m room yield, for a 16:10 projection aspect ratio.
Figure 52A:
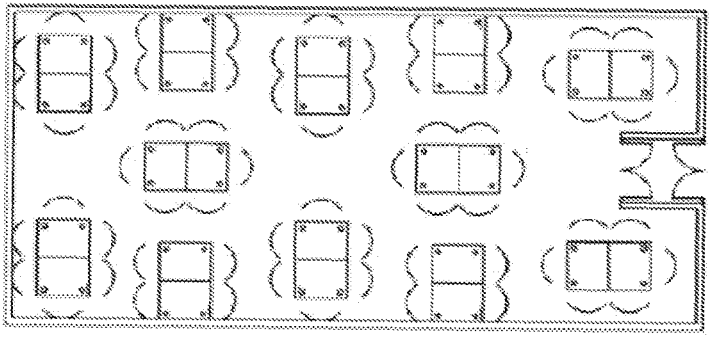
FIG. 52A shows an example of a table layout which provides 10 m×5 m room yield, for a 16:10 projection aspect ratio.

FIG. 52A shows an example of a table layout which provides 10 m×5 m room yield, for a 16:10 projection aspect ratio.

FIG. 52B shows an example of a table layout which provides 10 m×5 m room yield, for a 16:10 projection aspect ratio.

FIG. 52C shows an example of a table layout which provides 10 m×5 m room yield, for a 4:3 projection aspect ratio.

Figure 53:
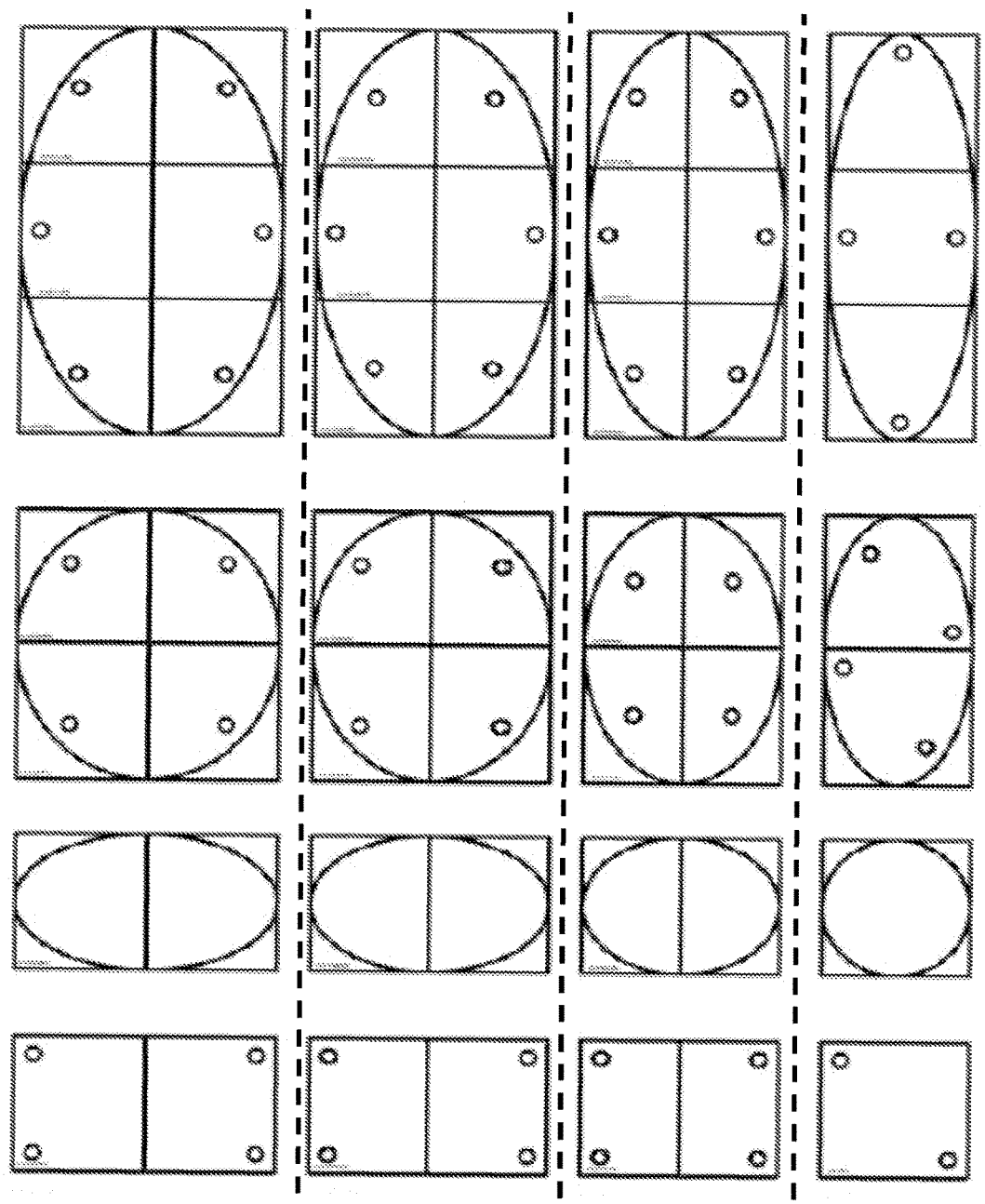
FIG. 53 shows an example of oval tables' illumination as a function of projection aspect ratio, which varies between the dashed lines in the Figure, as indicated at the base of the Figure.

FIG. 53 shows an example of oval tables' illumination as a function of projection aspect ratio, which varies between the dashed lines in the Figure, as indicated at the base of the Figure. A single PC could control the multiple projectors used for each table. In the top row of FIG. 53, three projectors are used for each table; two projectors are used for each table in the second row. Also, that single PC could control the projectors used for a single table (eg. as shown in the third and fourth rows of FIG. 53), or it could control the projectors used for several tables. The oval tables may be elliptical in shape.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

APPENDIX I: REVENUE STREAMS

The purpose of this section is to list specific ways that the WES system can be used to create new or optimised streams of revenue within the restaurant, bar, or various other environments.

Within a Restaurant Environment

There will be a faster turnover of customers compared to equivalently priced restaurants for several reasons:

Faster Bill Payment

In the case where Chip &PIN terminals are present on the tables, customers will not have to wait for someone to pay their bill. In the case of no Chip &PIN terminals, waiters will be alerted more clearly and instantly that the customer is ready to pay their bill eg. by the change of colour of the table.

No Waiting Period for Food and Drink Ordering

A customer's order once pressed goes straight to the bar or kitchen and there is no need to wait for a waiter to come to the table.

A Customer can See how Long his Food Will Take to Order Before he Orders it.

People wishing to have quick meals will be enticed by our restaurant hence increasing the average speed of dining.

Due to the Faster Turnover, a Waiter Will Get More Tips.

This obviously does not provide a direct revenue stream to the restaurant itself but increases staff satisfaction and hence circularly this will have an effect on the number of customers.

Customers Will Order More Items Because of the Automated Ordering System.

In an ordinary restaurant, customers often wish to order a beverage for especially when eating salty or spicy food but eventually choose not to because they fail to get a waiter's attention. This would not happen in a restaurant with the WES system. Customers often wish to order coffee before the bill but often give up because they fail to get a waiter's attention or because they expect that the waiter would take a while to arrive. This would not happen in a restaurant with the WES system. In both the above examples, the customer would also waste valuable table time attempting to get the waiter's attention. Using the projection system, customers can view exactly how the food and drink ordered will appear on their plate. As such there will be more impulse buying of food and drink.

A Customer can Order Taxis Through WES During his Meal.

Specific deals could be set up with local cab companies and the restaurant can take a fee from either the cab company or put a small fee on the bill for this service.

A Customer can View Details of Local Pubs, Clubs and Bars Through WES while Dining.

We would only recommend those places which we actually felt were good venues but within that context, marketing deals can be arranged whereby we get a small fee for every customer who they get through us or we could charge a direct fee for having a reserved place on the WES system. Equally we could look for them to promote us as a location.

This could also include a virtual tour of the local area where e.g. specific locations could be highlighted and full of colour and logos while others were just shapes with less substance.

We could Charge Customers on the Basis of Time Spent at the Table and this could be Administered Through Information Displayed by the WES System.

There are many possible ways in which this could generate a revenue stream, many of which would be of great potential benefit to customers. A fixed rate cover charge could be automatically charged to every customer per time period. This would have the benefit of rotating customers more quickly and hence increasing customer turnover and allowing more customers to visit the venue if regularly at capacity.

Customers could receive discounts based on how long they spend at the table. Eg a 10% discount for leaving within 45 minutes, 30% discount for leaving within 30 minutes.

Drinks and food can be charged on the basis of how full the restaurant is.

Drinks and food could be charged at happy hour prices.

A Customer can View TV or Stored Films Through the WES System

This could be charged on a pay per view basis. In the case of a projector beaming the WES directly onto the table this could be a very high quality cinematic experience. We could also allow regular customers to buy subscription to our various available channels. A deal of some sort could potentially be struck which would allow customers to buy a subscription to their channels through us with us taking a small commission on this OR with us charging for table time (as stated above).

A Customer can Register for "Club WES" Through the WES System or Our Website.

Through paid annual subscriptions various customisations and booking advantages could become available to the customer including extra features on the WES software, custom dish ratings etc.

Using WES the Customer can Book his Next Visit to the Restaurant.

A satisfied customer can immediately book another visit to the restaurant for any number of people. If a customer is impressed and, for example, wishes to bring a date to the restaurant, then occupancy of the restaurant will have been increased through the ease of booking.

A Customer can View Sports Reports, Newspapers and Sports Results Through WES.

This could be charged on a pay per view basis or as a subscription for registered customers.

A Customer can Choose how their Menu is Presented Through WES—Eg Calorie Controlled, Atkins Diet Approved Etc.

The creators of specific healthy diets of which we approved could in principle be charged a small fee to have our database correlated to what fits in with their dietary structure.

Singles Notice Board in WES System

Registered users of the WES system if choosing to put their photo in could have it viewed by other users. Other registered users could flag the people they like the look of and when two people flag each other and both happen to be in the restaurant on that day, they could be introduced by eg the Maitre d'. Customers could be charged in advance for this service or on the night the maitre d' could ask one of them if he wished to buy the other a drink and upon so doing the restaurant has increased its revenue stream.

Competitions and Events Run Through WES

Customers of any venue could be charged to participate in events run using the WES system. These events could include:

Singles/Dating Application Run Through the WES System

A Singles/Dating night at our venue could be a carefully specified special features of the WES system. This could use many of the features which may already be part of the system—e.g. messaging, photos etc.

A speed dating night at our venue could work differently from one at another venue—everyone could stay put in their chairs and converse with their prospective partners through streaming video.

The customer could be charged for this on a nightly basis or on the basis of a one off payment to come to speed dater evenings. Or a customer could be charged only if he met someone he liked on the night. A customer could also be charged an annual subscription fee to participate in the all events.

Footsie Application Run Through WES

Prices of food and drink fluctuate as people order like a stock exchange. A table of prices depicts movement up and down. There would be a minimum and maximum price for each product on offer—one which means we always get a reasonable profit, and the price never gets too ridiculous. We could have someone MC-ing this—starting and ending "trading", shouting out really special prices, or sudden prearranged "crashes" on certain items that makes them really cheap for 10 minutes, etc. Screens in the venue for this period display the fluctuating drinks prices. Enabling people not seated at tables but ordering at the bar to participate in the process. This would allow greater stock control for the restaurant but also would be a fun application with the potential to draw people into the venue.

Film Night & Cinema Shown Through WES

Either as a special event within a restaurant or other venue OR as a unique cinema venue. As a cinema each customer can watch the film at his own table with a group of friends and the customer could be charged for entry like any other cinema but could order food and drinks through the WES system during the movie. As a film night in a restaurant, the customer could be charged pay per view or on entry or by the time spent in the restaurant as above etc.

Digitised Pub Quiz Through the WES System

The quiz can take several formats, including customers against other customers and individual tables looking to win prizes from the establishment. People can be charged a small fee for entry into the pub quiz "Who Wants to Win a Free Meal?" Application in WES Certain nights/times run an optional quiz competition—perhaps hourly one evening a week for five minutes (30 seconds per question). You have to have placed an order (of a certain size?) to participate.

The more questions you try to answer the higher the prize you are set to win, but you have to risk all the previous winnings. Could offer a percentage off the total bill, meaning the more people spend the more they save as a result of the prize. People can win vouchers for money off next time they visit, drinks, food, up to a whole free meal for answering a ridiculously hard question.

Multiplayer Games: Scrabble, Chess, Draughts Etc.

Either as a unique gaming venue or as something to do during a night, people could be charged for entry, time spent at table or on a pay per game basis.

Website Integration

The website can be integrated into our WES system or bookings from the website and others can be personally relayed to the Maitre' D. Customers can be charged a deposit for booking online. Customers with WES membership can book their meal in advance for a specific time increasing efficiency and occupancy as well as turnover. This can also help stock control.

Betting Application

The screens can show football/rugby/etc and a direct link to e.g. Betfair.com with customer accounts through us—from which we take a percentage—either charging Betfair or the customer directly for this service.

It would also be possible to offer real-time specific in house bets only available to the people within that restaurant or gaming venue watching the sporting event and betting against each other or against us.

A unique gambling venue with Poker/Black jack/Roulette/other casino games played directly on the touchscreens or projected onto the tables could be arranged. This could also work well as a dining room within a casino.

Wine Tasting Application

We could have a wine/beer tasting application/theme night where a table gets presented with five unlabelled/covered labelled bottles of wine and they have to taste each bottle (A→E) and pick/guess on screen the grape, the vintage, the price, the alcohol content etc.

Correct guesses can win prizes e.g get the bottle of wine for free. People could be charged for entering the competition or there could be a gaming aspect to it—bet upon how sure you are about the bottle of wine.

A pub quiz style game using this concept could also work well where people pay per game and for the wine in the process.

People could also be charged for educational wine and spirit courses taught by the WES system.

Events Run Through the WES System

Corporate events or product launches are eminently doable (via our plasma screens on the walls) a single client could pay for the whole bill.

Alternatively people could be issued with some form of company card with which to pay for items.

Ego Tripping

Customers could pay to have their name displayed on all the WES to attempt to impress dates, friends etc.

Advertising Through WES

Specific advertising for companies can be displayed through the WES screens. Companies can be charged for this advertising space on a per screen, per table, or time basis.

There are many places within WES where this advertising could appear. Either as a screensaver, as a specific advertising screen within the WES system or as a constant place on the table.

Could have a box projected into the middle of the table within the rest of the WES software offering a percentage discount to the customer if they are willing to be presented with advertising in that box. The company advertising would be charged each time a customer accepted these terms and a profit would be made on each advert. This would also have quite unique market penetration.

Adverts could also be projected from the WES system on to chairs, flatware, floors, walls, ceilings, flowers, glasses, cutlery, china and tableware.

Ambience Control Using WES

A customer could be charged for implementing the ambience control (setting the specific hue of lighting within his restaurant space.) This is not something we would initially want to do but if a table of four was fighting over the shading at their table, after it had been set a couple of times by each person a message could appear saying that it would start to be charged to their bill.

Today's Special and Recommendations Through WES

A customer could be recommended a drink or dish to accompany certain other dishes which if they order increases our revenue stream. NB Such recommendations would be genuine and not just a form of stock control.

A customer could be offered today's special through the WES system. The WES system automatically detects which dishes we have lots of stock for and would be helpful to sell and offers the customer discounts on these dishes. This improves stock control and hence increases revenue.

Set Up and Sell Space on the WES System to Software Developers.

Early versions of games and applets can be trialled and tested on audiences either as freeware, shareware etc. and either the customer or the software developer can be charged for this.

Audio Books and Visual Books

Customers could pay to listen to an audio book or read an uploaded magazine through the WES system.

Video Conferencing

Customers could have a full video conference between themselves and a customer at any other Inamo restaurant through the WES system. Customers could be charged by the minute, the hour, as a single cover charge etc.

Customers can actually use WES system at the tables to talk to someone anywhere in the world on a mobile phone, internet phone, landline video phone or plain audio phone. We could charge the customers or the phone companies for this service.

Streamed Live Music

Live music at any one Inamo restaurant can be streamed to any Inamo restaurant live. People in London could view live music from Inamo New York or Inamo Tokyo or for that matter in principle from any live gig across the world. People could be charged by time or pay per view or it could be used simply to increase occupancy of the restaurant. A customer could also purchase a digital copy of this to take home with him that evening.

Drinking Games

While potentially irresponsible we note that it is possible to have automated drinking games whereby people failing specific tasks have drinks ordered for them by the system automatically dramatically increasing revenue stream. Customers would have to agree to the terms of the game in advance and limits could be set on the amount of booze that could be ordered within the game from each seat. This could all be arranged through the WES in such a way as to ensure more responsible drinking even within the game using booze limits and warning messages. The drinks could also get less strong in alcohol terms as the game went on.

Linking Laptops

In principle a customer could link his Laptop to the WES system and give, for example, a PowerPoint presentation directly onto the table for others seated with him and could be charged for the WES laptop interface. USB devices etc. could also be linked.

Auction Applications

Customers can bid for items which are for sale at a restaurant through the WES software. This could also be run as a unique auction venue whereby customers bid for all the objects that are for sale through WES at their seats/tables and can see the items displayed in front of them. This could be combined with or independent of a live auctioneer. People at other Inamo locations could log in to the auction venue through the WES software and either the customer or the auctioneer can be charged for this service.

APPENDIX II HARDWARE SYSTEM OVERVIEW

Figure 54:
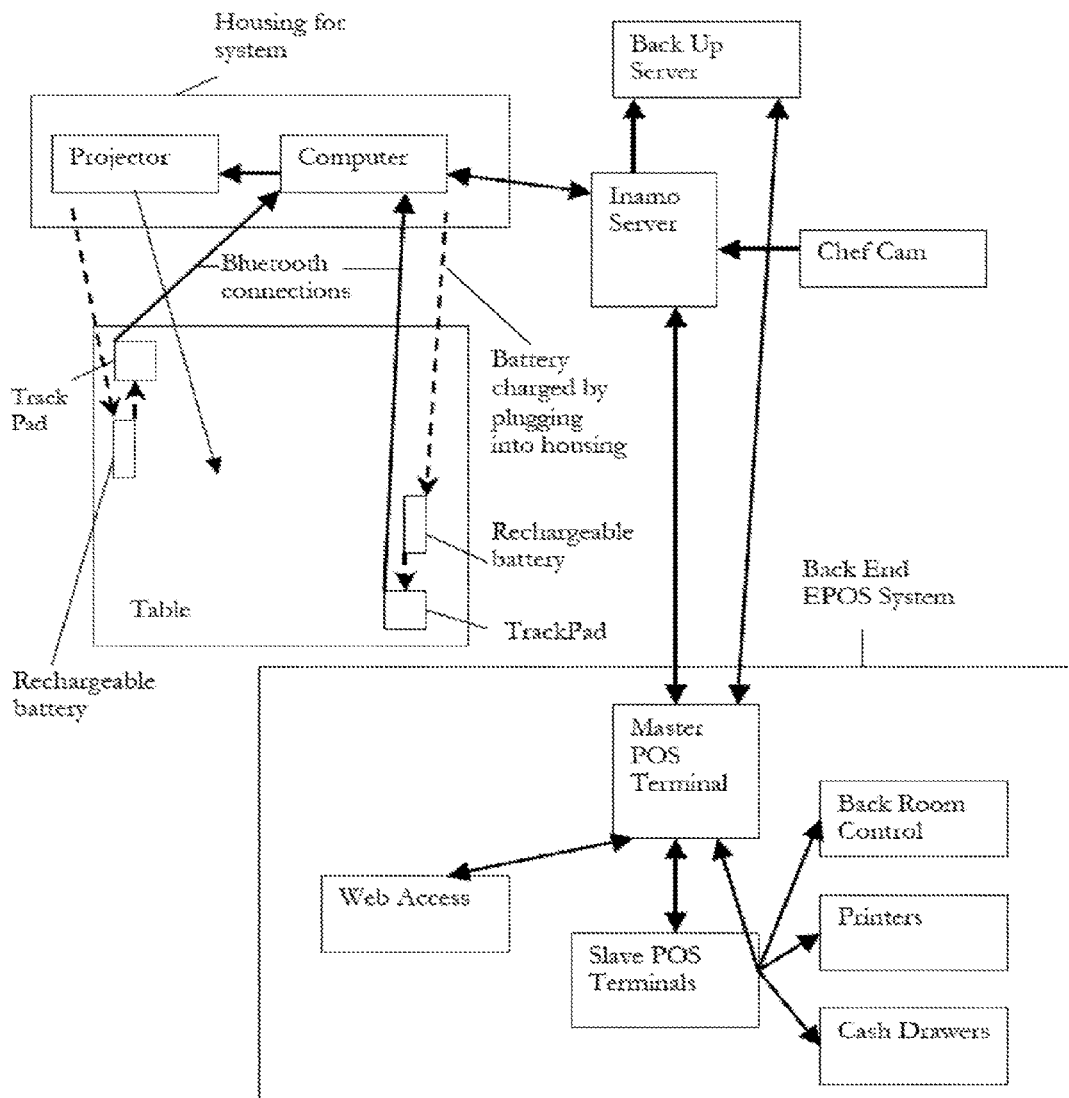
FIG. 54 shows a diagram of a typical restaurant table system which implements an example of the invention, and the connection of the restaurant table system via a server to other peripherals or networks.

FIG. 54 shows a diagram of a typical restaurant table system which implements an example of the invention, and the connection of the restaurant table system via a server to other peripherals or networks.

In FIG. 54, a restaurant table for two diners is shown. A TrackPad is shown for each diner. Each TrackPad is connected wirelessly to an overhead computer. The TrackPads are each powered by a rechargeable battery. Each battery is recharged via a cable which may be pulled down from overhead and connected to the battery, preferably while customers are not present in the restaurant. This saves having to provide power to the tables. A projector is shown mounted above the table for illuminating the table surface. The projector above the table is connected to the computer above the table, both of which are in the same housing. The computer above the table is connected to a server which controls the computer for each of 45 tables for two diners. The server is the Inamo Server.

In FIG. 54, the Inamo Server is connected to a backup server, the chef camera, and to a Master Point of Sale (POS) Terminal. The Master POS Terminal is connected to web access, Slave POS Terminals, which are in turn connected to a Back Room Control system, printers, and to cash drawers. The Back End electronic POS (EPOS) system comprises the Master POS Terminal, web access, Slave POS Terminals, Back Room Control, printers, and cash drawers. In FIG. 54, the computer (eg. Client PC) is connected to the Inamo server (running the WES software) which interacts with a POS server—eg. one supplied by Sharp but it could be any (e.g. Aloha Systems, Micros, Fourth etc.). It is the POS Terminal which interacts with the back end equipment. All devices (including track pads, client PCs, projectors, Inamo server, master POS terminal, slave POS terminals, back room control, printers, chef camera etc are networked devices, each with an IP address.

Concepts

There are multiple concepts, described as concepts 'A-F', in this disclosure. The following may be helpful in defining these concepts.

A. An Interactive Food and/or Drink Ordering System with a Shared Menu Zone

An interactive food and/or drink ordering system comprising a computer controlled projector apparatus and a horizontal surface, wherein images from the computer controlled projector apparatus are projected onto some or all of the surface, the images including a menu of food and/or drink selection options, the selection options being selectable by a first user operating an interface device operable to provide input to the computer and also by a second user operating an interface device operable to provide input to the computer, wherein the menu of food and/or drink selection options is projected into a zone on the surface that is shared by the first and second users.

the first user and the second user each operating their own interface device operable to provide input to the computer.

interface devices are connected to the computer.

each interface device is operable to select an option from the zone on the surface that is shared by the first and second users.

the orientation of the menu of food and/or drink selection options projected onto the surface being selected to be correct for each user.

projector apparatus projects a single image that is oriented so that both users can read the menu items the right way up.

zone on the surface is circular.

projector apparatus projects an image that is divided into a menu zone for the first user, and a different menu zone for the second user.

the menu zones have text and images appropriately oriented for each user.

Choices are recorded as those of the first and second users as a group.

First user and second user are seated opposite each other.

the selection options being selectable by a third user operating an interface device operable to provide input to the computer, wherein the menu of food and/or drink selection options is projected into a zone on the surface that is shared by the first, second and third users.

Third user seated opposite neither the first user nor the second user.

Projector apparatus comprises a single projector.

Projector apparatus comprises multiple projectors.

System comprises power and data cables routed through the floor.

System includes an input palette system comprising an input palette, a camera and a tracking computer, wherein a menu of food and/or drink selection options is projected onto the input palette situated on the surface, the selection options being selectable by the first user and also by the second user, the position of the menu of food and/or drink selection options projected onto the surface being selectable by a user according to user positioning of the input palette, wherein the tracking computer is operable to determine the position of the palette through image processing of an image of the palette obtained by the camera, and the computer controlled projector apparatus is operable to change the positioning of the menu in response to the input palette position determined by the tracking computer.

System includes an input pointer system comprising an input pointer, a camera and a tracking computer, wherein a menu of food and/or drink selection options is projected onto the surface, the selection options being selectable by the first user when holding the input pointer, wherein the tracking computer is operable to determine the position of the pointer through image processing of an image of the surface obtained by the camera, and the computer controlled projector apparatus is operable to provide selection of a menu option in response to the input pointer position determined by the tracking computer.

A method of ordering food and/or drink in an interactive food and/or drink ordering system, the system comprising a computer controlled projector apparatus and a horizontal surface, wherein images from the computer controlled projector apparatus are projected onto some or all of the surface, the images including a menu of food and/or drink selection options, the selection options being selectable by a first user operating an interface device operable to provide input to the computer and also by a second user operating an interface device operable to provide input to the computer, wherein the menu of food and/or drink selection options is projected into a zone on the surface that is shared by the first and second users, comprising the steps of:

(i) the first user or the second user operating an interface device to select an item of food or drink from the menu projected on the surface, and (ii) a record of the selection being made in an order record corresponding to the first and second users.

B. An Interactive Food and/or Drink Ordering System with a Plurality of Shared Menu Zones An interactive food and/or drink ordering system comprising a computer controlled projector apparatus and a horizontal surface, wherein images from the computer controlled projector apparatus are projected onto a first zone on the surface that is shared by first and second users in a first group of users, the images in the first zone including a menu of food and/or drink selection options, the selection options in the first zone being selectable by the first user operating an interface device operable to provide input to the computer and also by the second user operating an interface device operable to provide input to the computer, and wherein images from the computer controlled projector apparatus are projected onto a second zone on the surface that is shared by third and fourth users in a second group of users, the images in the second zone including a menu of food and/or drink selection options, the selection options in the second zone being selectable by the third user operating an interface device operable to provide input to the computer and also by the fourth user operating an interface device operable to provide input to the computer.

the first, second, third and fourth users each operating their own interface device operable to provide input to the computer.

interface devices are connected to the computer.

each interface device is operable to select an option from the zone on the surface that is shared by its respective user.

the orientation of the menu of food and/or drink selection options projected onto the surface are selected to be correct for each user.

For each zone, the projector apparatus projects a single image that is oriented so that the respective users can read the menu items the right way up.

Zones on the surface are circular.

For each zone, projector apparatus projects an image that is divided into a respective menu zone for each respective user.

the menu zones have text and images appropriately oriented for each user.

Respective choices are those of the group of users for each respective zone.

First user and second user are seated opposite each other; third user and fourth user are seated opposite each other.

the selection options being selectable by a fifth user operating an interface device operable to provide input to the computer, wherein the menu of food and/or drink selection options is projected into the first zone on the surface that is shared by the first, second and fifth users.

Fifth user seated opposite neither the first user nor the second user.

Zones are adjustable in response to the addition of one or more users to a group of users.

wherein images from the computer controlled projector apparatus are projected onto a third zone on the surface that is shared by two users in a third group of users, the images in the third zone including a menu of food and/or drink selection options, the selection options in the third zone being selectable by the first of the two users in the third group of users operating an interface device operable to provide input to the computer and also by the second of the two users in the third group of users operating an interface device operable to provide input to the computer.

Zones are adjustable in response to the addition of one or more users to a group of users.

Bench seating is provided for some users.

Projector apparatus comprises a single projector.

Projector apparatus comprises multiple projectors.

System comprises power and data cables routed through the floor.

Surface is a table surface, and table division is provided for by movable physical dividers, the system including an image recognition system operable to recognize the table dividers.

Table is circular or rectangular.

System includes an input palette system comprising a first input palette and a second input palette, a camera and a tracking computer, wherein a respective menu of food and/or drink selection options is projected onto a respective input palette situated on the surface, the respective selection options being selectable by a respective user and also by one or more respective additional users, a position of the respective menu of food and/or drink selection options projected onto the surface being selectable by a respective user according to user positioning of a respective input palette, wherein the tracking computer is operable to determine a respective position of a respective input palette through image processing of an image of the respective palette obtained by the camera, and the computer controlled projector apparatus is operable to change the position of the respective menu in response to the respective input palette position determined by the tracking computer.

Input palettes are provided in correspondence with groups of users, and when the palettes corresponding to a group of users are moved, the zone boundary corresponding to the group of users moves accordingly.

System includes an input pointer system comprising an input pointer, a camera and a tracking computer, wherein a menu of food and/or drink selection options is projected onto the surface, the selection options being selectable by a user holding the input pointer, wherein the tracking computer is operable to determine the position of the pointer through image processing of an image of the surface obtained by the camera, and the computer controlled projector apparatus is operable to provide selection of a menu option in response to the input pointer position determined by the tracking computer.

System wherein each input palette of the input palette system has a corresponding input pointer of the input pointer system.

A method of ordering food and/or drink in an interactive food and/or drink ordering system, the system comprising a computer controlled projector apparatus and a horizontal surface, wherein images from the computer controlled projector apparatus are projected onto a first zone on the surface that is shared by first and second users in a first group of users, the images in the first zone including a menu of food and/or drink selection options, the selection options in the first zone being selectable by the first user operating an interface device operable to provide input to the computer and also by the second user operating an interface device operable to provide input to the computer, and wherein images from the computer controlled projector apparatus are projected onto a second zone on the surface that is shared by third and fourth users in a second group of users, the images in the second zone including a menu of food and/or drink selection options, the selection options in the second zone being selectable by the third user operating an interface device operable to provide input to the computer and also by the fourth user operating an interface device operable to provide input to the computer, the method comprising the steps of:

(iii) the first user, the second user, the third user or the fourth user operating an interface device to select an item of food or drink from the menu projected on the surface in a menu zone corresponding to the user's group, (iv) a record of the selection being made in an order record corresponding to the user's group.

C. Input Palette System

Input palette system comprising an input palette, a camera and a tracking computer, the input palette system suitable for use with an interactive food and/or drink ordering system, the ordering system comprising a computer controlled projector apparatus and a horizontal surface, wherein a menu of food and/or drink selection options is projected onto the input palette situated on the surface, the selection options being selectable by a user and also by one or more additional users, the position of the menu of food and/or drink selection options projected onto the surface being selectable by a user according to user positioning of the input palette, wherein the tracking computer is operable to determine the position of the palette through image processing of an image of the palette obtained by the camera, and the computer controlled projector apparatus is operable to change the positioning of the menu in response to the input palette position determined by the tracking computer.

Palette breaks azimuthal symmetry the orientation of the menu of food and/or drink selection options projected onto the surface is selectable by a user according to user rotation of the input palette, wherein the tracking computer is operable to determine the azimuthal angle of the palette through image processing of an image of the palette obtained by the camera, and the computer controlled projector apparatus is operable to change the orientation of the menu in response to the input palette azimuthal angle determined by the tracking computer.

Input palette is portable
Input palette is a flat disc
disc includes a small hole at one section
palette is a tray
palette is the approximate size of a shared menu zone
palette resembles an oil painter's palette in shape
palette is detected and tracked by a web camera
position of the palette is provided to control the position at which the menu zone is projected
palette includes images or other visual features with sharp, well delineated edges that can be readily recognized using image recognition systems
the palette includes a 2D or 3D barcode
barcode visible only in the IR spectrum
a user can move the palette to any convenient position on the table and the shared menu zone will follow its movement, being continuously projected onto the palette
projector maintains a fixed background image on the table as the palette is moved
palette comprises a handle, and location of the handle is tracked and identified so that the shared menu zone orientation can vary as the palette is rotated
System includes an input pointer system comprising an input pointer, a camera and a tracking computer, the input pointer system suitable for use with the interactive food and/or drink ordering system, wherein a menu of food and/or drink selection options is projected onto the surface, the selection options being selectable by a user holding the input pointer, wherein the tracking computer is operable to determine the position of the pointer through image processing of an image of the surface obtained by the camera, and the computer controlled projector apparatus is operable to provide selection of a menu option in response to the input pointer position determined by the tracking computer.
Input palette system comprising a first input palette and a second input palette, a camera and a tracking computer, the input palette system suitable for use with an interactive food and/or drink ordering system, the ordering system comprising a computer controlled projector apparatus and a horizontal surface, wherein a respective menu of food and/or drink selection options is projected onto a respective input palette situated on the surface, the respective selection options being selectable by a respective user and also by one or more respective additional users, a position of the respective menu of food and/or drink selection options projected onto the surface being selectable by a respective user according to user positioning of a respective input palette, wherein the tracking computer is operable to determine a respective position of a respective input palette through image processing of an image of the respective palette obtained by the camera, and the computer controlled projector apparatus is operable to change the position of the respective menu in response to the respective input palette position determined by the tracking computer.
  Input palette system wherein when the first input palette is stacked on the second input palette, a single shared menu zone is projected onto the first palette.
  Input palette system wherein moving the first palette off the stack to a particular section of the surface is immediately tracked by the tracking computer, triggering a new menu zone to be displayed on the second palette by the projector apparatus.
  First and second input palettes break azimuthal symmetry
  the orientation of the respective menu of food and/or drink selection options projected onto the surface is selectable by a respective user according to user rotation of the respective input palette, wherein the tracking computer is operable to determine an azimuthal angle of the respective palette through image processing of an image of the respective palette obtained by the camera, and the computer controlled projector apparatus is operable to change the orientation of the respective menu in response to the respective input palette azimuthal angle determined by the tracking computer.
System includes an input pointer system comprising an input pointer, a camera and a tracking computer, the input pointer system suitable for use with the interactive food and/or drink ordering system, wherein a menu of food and/or drink selection options is projected onto the surface, the selection options being selectable by a user holding the input pointer, wherein the tracking computer is operable to determine the position of the pointer through image processing of an image of the surface obtained by the camera, and the computer controlled projector apparatus is operable to provide selection of a menu option in response to the input pointer position determined by the tracking computer.

D. Input Palette

Input palette, for use with a camera, a tracking computer and an interactive food and/or drink ordering system, the system comprising a computer controlled projector apparatus and a horizontal surface, wherein a menu of food and/or drink selection options is projected onto the input palette situated on the surface, the selection options being selectable by a user and also by one or more additional users, the position of the menu of food and/or drink selection options projected onto the surface being selectable by a user according to user positioning of the input palette, wherein the tracking computer is operable to determine the position of the palette through image processing of an image of the palette obtained by the camera, and the computer controlled projector apparatus is operable to change the positioning of the menu in response to the input palette position determined by the tracking computer.
  Palette breaks azimuthal symmetry
  Input palette is portable
  Input palette is a flat disc
  disc includes a small hole at one section
  palette is a tray
  palette is the approximate size of a shared menu zone
  palette resembles an oil painter's palette in shape
  palette includes images or other visual features with sharp, well delineated edges that can be readily recognized using image recognition systems
  the palette includes a 2D or 3D barcode
  barcode visible only in the IR spectrum E. Input Pointer System Input pointer system comprising an input pointer, a camera and a tracking computer, the input pointer system suitable for use with an interactive food and/or drink ordering system, the ordering system comprising a computer controlled projector apparatus and a horizontal surface, wherein a menu of food and/or drink selection options is projected onto the surface, the selection options being selectable by a user holding the input pointer, wherein the tracking computer is operable to determine the position of the pointer through image processing of an image of the surface obtained by the camera, and the computer controlled projector apparatus is operable to provide selection of a menu option in response to the input pointer position determined by the tracking computer.

Input pointer is a small circular pointer with a short handle
position of the pointer can be detected and tracked using
    a web-camera
when pointer is aligned over a specific image, that is
    interpreted as a selection action
specific image is of a button or icon
image projected onto the surface can include navigation
    functions as well as selection options
pointer is equipped with a light source
light source is an infrared LED
light source is activatable by a user using a switch on the
    pointer
infrared LED is detected and tracked using an infrared
    camera
Pointer has multi-touch functionality
multi-touch functionality is one or more of pinch, grab
    and zoom.
Pointer used in one or more of games, drawing, and
    background manipulation.
Input pointer comprises a personal, portable touch screen
    device.
Personal, portable touch screen device is incorporated
    into a puck-like object, to provide a puck.
Puck acts as a pointing device using either its touch-
    detecting ability, or an image can be displayed on its
    screen, or a combination of both functions can be used.
A graphical system displayed on the puck screen provides
    for controlled input to the interactive food and/or drink
    ordering system.
Puck has a 2D barcode, which is printed on the puck or
    displayed on the touch screen display.
Puck has a 2D barcode, which is printed on the puck in
    infra red ink
2D barcode is unique to a customer.
2D barcode codes for menu items or promotions.
Personal, portable touch screen device includes an accel-
    erometer.
Input pointer system comprising a first input pointer and
a second input pointer, a camera and a tracking computer,
the input pointer system suitable for use with an interactive
food and/or drink ordering system, the ordering system
comprising a computer controlled projector apparatus and a
horizontal surface, wherein a menu of food and/or drink
selection options is projected onto the surface, the selection
options being selectable by a respective user holding a
respective input pointer, wherein the tracking computer is
operable to determine the positions of the first and second
input pointers simultaneously through image processing of
an image of the surface obtained by the camera, and the
computer controlled projector apparatus is operable to pro-
vide selection of a respective menu option in response to a
respective input pointer position determined by the tracking
computer.
F. Input Pointer
Input pointer suitable for use with a camera, a tracking
computer, and an interactive food and/or drink ordering
system, the ordering system comprising a computer con-
trolled projector apparatus and a horizontal surface, wherein
a menu of food and/or drink selection options is projected
onto the surface, the selection options being selectable by a
user holding the input pointer, wherein the tracking com-
puter is operable to determine the position of the pointer
through image processing of an image of the surface
obtained by the camera, and the computer controlled pro-
jector apparatus is operable to provide selection of a menu
option in response to the input pointer position determined
by the tracking computer.

Input pointer is a small circular pointer with a short handle
pointer is equipped with a light source
light source is an infrared LED
light source is activatable by a user using a switch on the
    pointer
infrared LED is detected and tracked using an infrared
    camera
Pointer has multi-touch functionality
multi-touch functionality is one or more of pinch, grab
    and zoom.
Pointer used in one or more of games, drawing, and
    background manipulation.

The invention claimed is:

1. An interactive food and/or drink ordering system comprising a computer controlled projector apparatus and a horizontal surface,
    wherein images from the computer controlled projector apparatus are projected onto some or all of the surface, the images including a menu of food and/or drink selection options,
    the selection options being selectable by a first user operating an interface device operable to provide input to the computer and also by a second user operating an interface device operable to provide input to the computer,
    wherein the menu of food and/or drink selection options is projected onto the surface to form a single shared menu zone, shared by the first and second users, and the computer controlled projector apparatus is operable such that the single shared menu zone can be flexibly positioned on the surface,
    depending on a seating arrangements of the users, the first and second users comprising a group of users, and wherein the single shared menu zone enlarges in response to an addition of one user to the group of users and in which a single projector apparatus projects more than one single shared menu zone, and
    in which each shared menu zone is used by two or more users and the layout or appearance of each shared menu zone depends on the seating arrangement for those two or more users.

2. The ordering system of claim 1 in which the menu selection options in the single, shared menu zone are oriented or arranged to provide an experience that is shared between the users, so that the order of food and/or drink is not for each individual user but for both users.

3. The ordering system of claim 1 in which the shared menu zone is a single circular or elliptical shape.

4. The ordering system of claim 1 in which a single projector apparatus projects more than one single shared menu zone, and in which each shared menu zone is used by two or more users.

5. The ordering system of claim 4, where the position of each shared menu zone depends on a size of the group of users.

6. The ordering system of claim 4, where the position of each shared menu zone depends on the seating arrangement.

7. The ordering system of claim 1, in which the computer controlled projector apparatus is operable to change the position of the shared menu zone.

8. The ordering system of claim 1, in which the computer controlled projector apparatus is operable to cause two or more shared menu zones to be displayed on the surface, each shared menu zone being associated with a different group of users, all sharing the same table.

9. The ordering system of claim 1, in which the system includes a tracking system and the output of the tracking system is used to control the position of the shared menu zone.

10. The ordering system of claim 9, wherein the tracking system is operable to determine the position of a movable palette designed to be reliably and rapidly tracked through image processing of an image of the palette obtained by the tracking system, and the computer controlled projector apparatus is operable to project the shared menu zone onto the palette even as the palette is moved.

11. The ordering system of claim 10, wherein the tracking system is operable to track the orientation of the palette as it is altered, and to cause the menu options to automatically swivel as the palette is altered.

12. The ordering system of claim 10, in which input palettes are provided in correspondence with groups of users, and when the palettes corresponding to a group of users are moved, the zone boundary corresponding to the group of users moves accordingly.

13. The ordering system of claim 1, the ordering system including an input pointer system comprising an input pointer, a camera and a tracking computer, wherein a menu of food and/or drink selection options is projected onto the surface, the selection options being selectable by the first user when holding the input pointer, wherein the tracking computer is operable to determine the position of the pointer through image processing of an image of the surface obtained by the camera, and the computer controlled projector apparatus is operable to provide selection of a menu option in response to the input pointer position determined by the tracking computer.

14. The ordering system of claim 1, in which the surface is a table surface, and table division is provided for by movable physical dividers, the system including an image recognition system operable to recognize the table dividers.

15. The ordering system of claim 14, in which the computer is operable to position one or more shared menu zones depending on the position of the table dividers.

* * * * *